(12) United States Patent
Yamanaka et al.

(10) Patent No.: US 6,452,653 B1
(45) Date of Patent: Sep. 17, 2002

(54) REFLECTOR, METHOD OF FABRICATING THE SAME, REFLECTIVE DISPLAY DEVICE COMPRISING REFLECTOR, AND METHOD OF FABRICATING THE SAME

(75) Inventors: Yasuhiko Yamanaka, Hirakata; Naohide Wakita; Takeshi Karasawa, both of Suita; Mariko Kawaguri, Moriguchi; Seiji Nishiyama, Hirakata, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/619,655

(22) Filed: Jul. 19, 2000

(30) Foreign Application Priority Data

Jul. 19, 1999 (JP) ............................................ 11-204153
Aug. 31, 1999 (JP) ............................................ 11-246656

(51) Int. Cl.$^7$ ........................ G02F 1/1335; G03B 21/60
(52) U.S. Cl. ...................................... 349/113; 359/459
(58) Field of Search ................... 349/95, 113; 359/449, 359/459

(56) References Cited

U.S. PATENT DOCUMENTS

| | | | | |
|---|---|---|---|---|
| 4,519,678 A | * | 5/1985 | Komatsubara et al. | 350/338 |
| 5,559,617 A | * | 9/1996 | Mitsui et al. | 359/73 |
| 5,619,356 A | * | 4/1997 | Kozo et al. | 349/99 |
| 5,691,791 A | * | 11/1997 | Nakamura | 349/113 |
| 6,219,114 B1 | * | 4/2001 | Lyu | 349/43 |

FOREIGN PATENT DOCUMENTS

| | | |
|---|---|---|
| JP | 04-243226 | 8/1992 |
| JP | 05-232465 | 9/1993 |
| JP | 06-027481 | 2/1994 |
| JP | 08-184846 | 7/1996 |
| JP | 09-292504 | 11/1997 |

* cited by examiner

Primary Examiner—William L. Sikes
Assistant Examiner—Tarifur R. Chowdhury
(74) Attorney, Agent, or Firm—Parkhurst & Wendel, LLP

(57) ABSTRACT

A reflector comprises a substrate provided with a plurality of projecting and depressed structures which are groups of columnar portions each serving as a basic unit and composed of a plurality of minute columnar portions, which are separate from each other or at least partially connected to each other, and with a light reflecting thin film provided over the projecting and depressed structures. This allows incident light to be scattered and reflected in a forward direction or the like, not in the regular reflection direction, and provides a reflector having a superior contrast property and a superior paper-white property, a fabrication method therefor, and a reflective display device comprising the reflector. The reflective display device has a liquid crystal layer provided between a pair of substrates. One of the pair of substrates is provided with projecting and depressed portions covered with a metal film and with a support portion for supporting the counter substrate, which are molded integrally. The arrangement reduces reflection in the regular reflection direction and enhances brightness and whiteness, while reducing the occurrence of uneven display by providing a uniform cell gap.

43 Claims, 37 Drawing Sheets

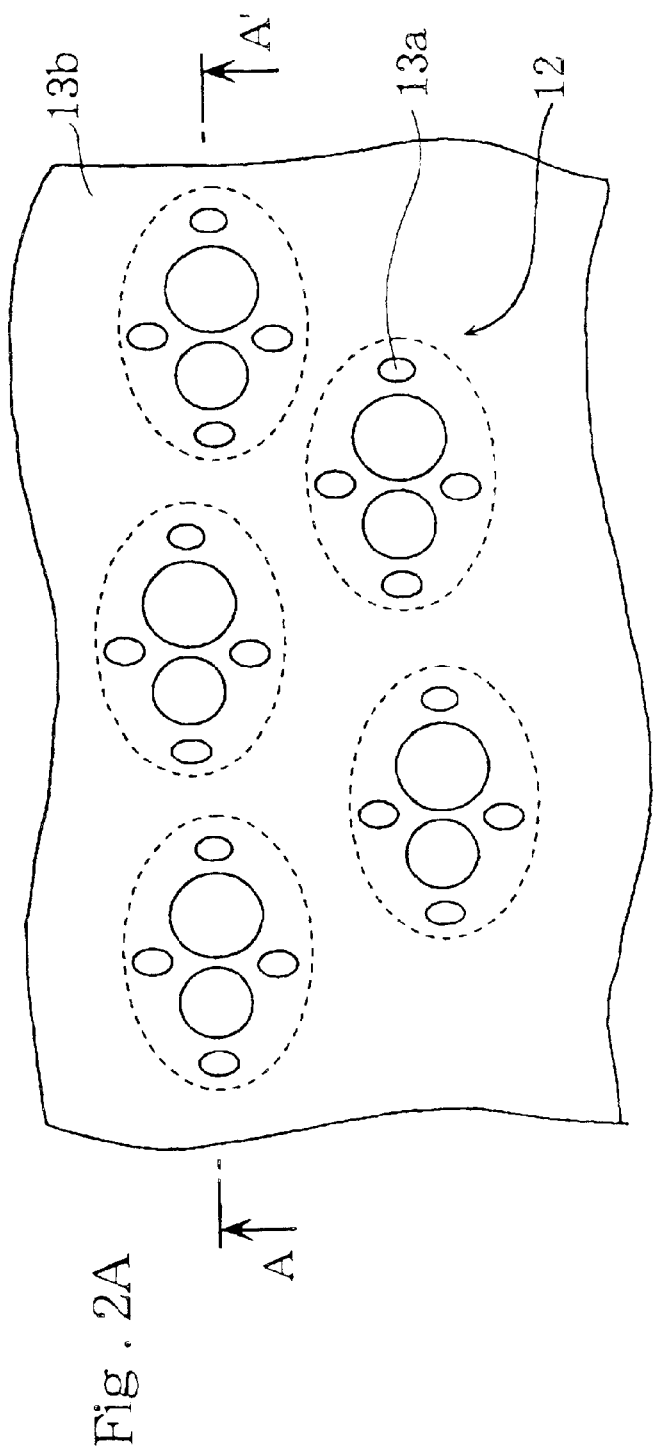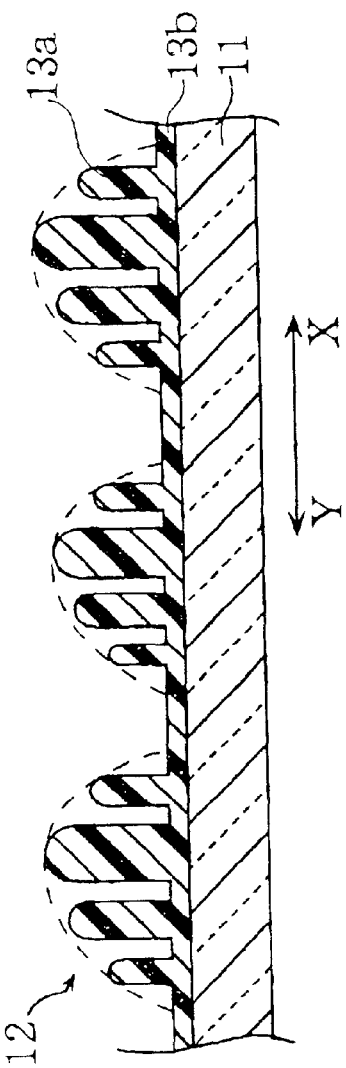
Fig. 2A
Fig. 2B

PRIOR ART

REFLECTOR, METHOD OF FABRICATING THE SAME, REFLECTIVE DISPLAY DEVICE COMPRISING REFLECTOR, AND METHOD OF FABRICATING THE SAME

FIELD OF THE INVENTION

The present invention relates to a reflector for use in a reflective liquid crystal display device which displays an image by reflecting external light when used in OA equipment, a personal computer, a mobile phone, a mobile data terminal, or the like, to a method of fabricating the same, to the reflective display device, and a method of fabricating the same.

BACKGROUND OF THE INVENTION

As AV equipment and data equipment has been scaled down to have a reduced thickness in recent years, there has been growing demand for a liquid crystal display device as a light-receiving display device. For the data equipment, a liquid crystal display device that can be mounted on a notebook personal computer with higher portability has been in increasing demand with the advent of a multimedia society. In the field of mobile data terminals, a liquid crystal display device which is lower in profile, weight, and power consumption has been required.

Such liquid crystal display devices are subdivided into a transmissive type having a backlight disposed on the rear surface of a liquid crystal panel and a reflective type having a reflector disposed therein and using external light as illuminating light. There is also a semitransmissive type comprising a half mirror, which uses ex al light reflected by a reflector as illuminating light in a bright environment, while using a backlight in combination in a dark environment. Since a reflective liquid crystal display device and a semitransmissive liquid crystal display device use a mode of displaying an image by reflecting external light and normally do not need a light source such as a backlight unit, they can be reduced particularly in power consumption, profile, and weight compared with a conventional transmissive liquid crystal display device. In a typical reflective liquid crystal display device, a scattering reflector made of aluminum or silver is disposed behind a liquid crystal panel. In a monochrome display device used in a wrist watch, a scattering reflector with a sheet polarizer is bonded to the outside of glass. As a display mode of the reflective liquid crystal display device, a TN (Twisted Nematic) mode, a STN (Super Twisted Nematic) mode, a GH (Guest-Host) mode involving the use of a dichroic dye have been used predominantly.

To achieve brighter and more satisfactory display in the reflective liquid crystal display device, it is required to reflect and scatter incident light in the normal viewing angle direction which is perpendicular to a display screen and thereby increase the intensity of the light. In addition to reflecting and scattering, in the normal viewing angle direction, external light incident at a specified angle from a specified direction, it is also desirable to similarly reflect and scatter, in the normal viewing angle direction, external light incident at arbitrary angles from different directions. As a result, it becomes necessary to fabricate a reflector having optimum reflecting properties which allow external light incident from an arbitrary direction to be used efficiently as display light. The optimum reflecting properties used here indicate the properties of the reflector with which incident light is reflected in a wide range and with a high reflectance.

In the case of using a conventional reflector such as one having a specular metal film formed on a substrate, incident light is reflected only in the direction of regular reflection so that the reflectance is low in a direction other than the regular reflection direction. This causes the problem that a screen displayed is extremely dark in a direction of visual recognition of a viewer, such as the normal viewing angle direction, which significantly degrades the display quality.

To solve the problem, a reflective liquid crystal display panel comprising a scattering reflector having a rough configuration is disclosed in, e.g., Japanese Unexamined Patent Publication No. HEI 4-243226. The scattering reflector disclosed in the publication is fabricated in accordance with the following method such that a reflecting surface thereof has a uniform configuration and is formed with high reproducibility. That is, as shown in FIG. 33A, a resist film 202 is coated on a glass substrate 201. Then, as shown in FIG. 33B, the resist film 202 is covered with a photomask 203 patterned into a specified configuration and exposed to light. Subsequently, the exposed resist film 202 is developed with a developing solution, whereby numerous projecting portions 204 as shown in FIG. 33C are formed. Since the projecting portions 204 have generally right-angled edges in cross section, the edges of the projecting portions 204 should be rounded off. By performing a heat treatment, therefore, a configuration as shown in FIG. 33D is obtained. Further, Ag is vapor-deposited over the glass substrate 201 formed with the projecting portions 204 to form a metal reflective film 206 (FIG. 33E). By the foregoing process, the scattering reflector has been fabricated.

To solve the foregoing problem, a pixel electrode having reflecting properties with which reflection of incident light in the region of regular reflection is reduced is also disclosed in, e.g., Japanese Unexamined Patent Publication No. HEI 6-27481. According to the publication, a reflector 210 comprises: a substrate 211 formed with a plurality of projecting portions 212a and 212b; a polymer resin film 214 provided over the substrate 211; and a pixel electrode 215 disposed on the polymer resin film 214, as shown in FIG. 34. The surface of the pixel electrode 215 has a continuously undulating configuration.

To form the reflector 210, the following method has been used (FIGS. 35). First, as shown in FIG. 35A, a resist film 212 made of a photosensitive resin is coated on the substrate 211 by spin coating and pre-baked at a specified processing temperature. Subsequently, the resist film 212 is exposed to light by using a photomask 213 positioned thereabove, as shown in FIG. 35B. Then, development is performed by using a developing solution to form the projecting portions 212a and 212b having different heights on the substrate 211, as shown in FIG. 35C. Subsequently, a heat treatment is performed by heating the projecting portions 212a and 212b for one hour at a specified temperature, as shown in FIG. 35D. The heat treatment rounds off the respective angular edge portions of the projecting portions 212a and 212b to form projecting portions 212a and 212b with rounded edge portions. Then, as shown in FIG. 35E, a polymer resin is spin-coated on the substrate 211 after the heat treatment to form the polymer resin film 214. Finally, the pixel electrode 215 is formed by sputtering on the polymer resin film 214 (FIG. 35F).

On the other hand, Japanese Unexamined Patent Publication No. HEI 9-292504 disclosed that, if the angle formed between an extremely small surface at the surface of a pixel electrode having a projecting and depressed configuration and a substrate surface is defined as a slope angle, the reflecting properties of a reflector, i.e., the reflectance and brightness thereof in a direction normal to a substrate, are determined by the slope angle distribution.

However, since the conventional reflector has formed the projecting and depressed configuration by forming the projecting portions by using the photoresist and melting and rounding the projecting portions with the application of heat, the configuration is determined by the roundness of the projecting portions shaped naturally by the heat-melting process so that it is difficult to precisely control the configuration. It is therefore evident that the slope angle distribution of the projecting portions has not been produced actually such that specified reflecting properties are provided. As a result, the light reflected by the conventional reflector in the regular reflection direction is increased so that brightness in the viewing angle direction is insufficient and a satisfactory paper-white property is not provided in a wide range. The conventional reflector also has the problem of seemingly metallic display because of its large dependence on an exit angle. Moreover, since the projecting portions are formed by photolithography, an extra step is added to a normal fabrication process, which causes the problem of a larger number of process steps.

To provide a uniform cell gap, a liquid crystal display device comprises spacers each having a given size or height between a pair of substrates. Specifically, it is common to use not only ball-shaped (spherical) spacers in the cell of a display element but also ball-shaped or fiber-like spacers which are blended in a seal resin coated into a frame-like configuration on the periphery of the substrate. If the spacers are scattered on the substrate of the conventional reflective liquid crystal display device comprising the scattering reflector, however, it is difficult to provide a uniform cell gap with accuracy in a specified range since the scattering reflector has a projecting and depressed configuration.

If a switching element 216 such as a thin-film transistor (hereinafter referred to as TFT) or a thin-film diode (hereinafter referred to as TFD) is provided on the conventional scattering reflector, it is required to provide an electric connection between the pixel electrode 215 and the switching element 216, so that a contact hole 217 is formed (FIG. 36E). In accordance with the following conventional method, however, the contact hole 217 may be clogged or have an aperture area smaller than required and intended during the formation thereof. That is, as shown in FIGS. 36A to 36C, the contact hole 217 is formed simultaneously with the formation of the projecting portions 212a and 212b. However, there are cases where the contact hole 217 has a smaller opening or is clogged due to thermal deformation during a heat treatment performed in the process of forming the projecting portions 212a and 212b, as shown in FIG. 36D. This increases contact resistance between the pixel electrode 215 and the switching element 216 and causes a serious problem such as the degradation of the display quality of the reflective liquid crystal display device comprising the reflector.

The present invention has been achieved in view of the foregoing problems and it is therefore a first object of the present invention to provide a reflector having superior reflecting properties such as a contrast property and a paper-white property, a fabrication method therefor, and a reflective liquid crystal display device comprising the reflector.

A second object of the present invention is to provide a reflector having superior reflecting properties, a fabrication method therefor, and a reflective liquid crystal display device comprising the reflector wherein a uniform cell gap is provided.

A third object of the present invention is to provide a method of fabricating a reflector wherein a contact hole for providing an electrical connection between a pixel electrode and a switching element has a sufficiently large opening irrespective of the provision of the reflector.

SUMMARY OF THE INVENTION

The present invention may be broadly subdivided into first and second groups based on closely related aspects thereof In the first group of the invention, a description will be given to a reflector comprising a plurality of projecting and depressed structures each having projecting and depressed portions and serving as a basic unit. In the second group of the invention, a description will be given to a reflector having projecting and depressed portions covered with a metal film and a support portion serving as a spacer, which are formed integrally.

First Group of the Invention

To solve the foregoing problems, a reflector in the first group of the present invention comprises: a substrate provided with a plurality of projecting and depressed structures each having a plurality of projecting and depressed portions and serving as a basic unit: and a light reflective thin film provided over the projecting and depressed structures.

The light reflecting thin film is provided over the projecting and depressed structures so that the surface configuration of the light reflecting thin films is conformal to the configuration of the projecting and depressed structures. Since each of the projecting and depressed structures has the plurality of projecting and depressed portions, the plan and cross-sectional configurations of the projecting and depressed structure can be controlled easily by varying, e.g., the distribution of the projecting and depressed portions. This allows light incident from an arbitrary direction to be reflected and scattered in the forward direction of the reflector or the like, not in the regular reflection direction.

In the foregoing arrangement, the projecting and depressed structures provided on the substrate may be arranged randomly and dispersively in an arbitrary direction.

In the arrangement, the projecting and depressed structures as the basic units are not observed repetitively with a given period so that light interference is suppressed and a phenomenon of, e.g., colored reflected light is suppressed.

In the foregoing arrangement, the projecting portions of the projecting and depressed structures may have top portions at different heights and the depressed portions of the projecting and depressed structures have bottom portions at different depths.

This allows the light reflecting thin film provided over the projecting and depressed structures to be formed with an inclined surface. By increasing or reducing a level difference between the adjacent top portions or the adjacent bottom portions, the angle formed between the inclined surface and the substrate surface (hereinafter referred to as a slope angle) can be adjusted larger or smaller. As a result, the surface of the light reflecting thin film is capable of scattering and reflecting light in directions within an anisotropic range and light can be reflected brightly in directions in a given angular range, not in the regular reflection direction. If three or more top portions are provided in the projecting and depressed structure, the top portions have different heights so that the slope angle distribution is controlled and an asymmetric cross-sectional configuration is provided. If the three or more top portions are arranged such that the heights thereof become progressively higher and that different level differences are provided between the adjacent top portions, a distribution of slope angles is produced. By varying the level difference, a desired slope angle distribution is obtained. If the three or more top portions are arranged discontinuously such that the heights thereof become progressively higher, reach a peak somewhere, and become progressively lower, the projecting and depressed structure has an asymmetric cross-sectional configuration.

In the foregoing arrangement, the projecting and depressed structures may be groups of columnar portions each composed of a plurality of minute columnar portions having different heights, the columnar portions being separate from each other or at least partially connected to each other.

In the arrangement, the plurality of minute columnar portions are formed to have different heights arranged in a specified distribution such that the slope angle distribution of the light reflecting thin film provided over the groups of columnar portions is controlled precisely. This provides a reflector having reflecting properties including a superior paper-white property.

In the foregoing arrangement, the projecting and depressed structures are staircase structures each having a plurality of stepped portions.

In the arrangement, each of the projecting and depressed structures is formed as the staircase structure having the stepped portions at different heights such that the slope angle distribution is controlled precisely. This provides a reflector having reflecting properties including a superior paper-white property.

In the foregoing arrangement, a height distribution of each of the projecting and depressed structures has a peak at a position deviated in a specified direction from a center portion of the structure and tends to decrease with distance from the peak toward a periphery thereof and the light reflecting thin film covering the projecting and depressed structures has a curved surface having a curvature larger in the specified direction than in a direction opposite to the specified direction.

In the foregoing arrangement, at least one polymer resin layer is provided between the projecting and depressed structures and the light reflecting thin film.

In the arrangement, even if the clearance between the adjacent projecting and depressed structures is large, a flat portion parallel to the substrate surface can be formed to have a gently curved configuration. Consequently, a flat region parallel to the substrate is not formed so that light reflected in the regular reflection direction is reduced. If each of the projecting and depressed structures is a group of columnar portions and a deep valley portion is formed between the adjacent columnar portions, the polymer resin layer is buried in the valley portion so that a gently curved configuration with a continuously changing height distribution is provided. If each of the projecting and depressed structures is a staircase structure, a gently curved configuration with a continuously changing height distribution can be provided such that the stepped configuration is not reflected in the surface configuration of the light reflecting thin film.

In the foregoing arrangement, the reflector may be a grating reflector for reflecting and diffracting light, the grating reflector having the plurality of projecting and depressed structures provided periodically on the substrate.

In the foregoing arrangement, each of the projecting and depressed structures in plan view has a size in the range of 1 $\mu$m to 100 $\mu$m.

To solve the foregoing problems, a reflector according to the present invention comprises: a substrate provided with a nonlinear element; a photosensitive resin layer provided on the substrate, the photosensitive resin layer having projecting and depressed structures in specified regions; and a pixel electrode with a light reflecting property provided on the photosensitive resin layer, the pixel electrode being electrically connected to the nonlinear element via a contact hole formed in the photosensitive resin layer, wherein a light reflecting film is provided on a bottom portion of the contact hole.

In the arrangement, the light reflecting thin film is provided at the position at which the contact hole is to be formed so that light is reflected by the vicinity of the light reflecting film during exposure. This achieves a higher exposure dose at the position at which the contact hole is to be formed than in the other exposed region. As a result, a contact hole having a generally trapezoidal cross section is formed by development so that, even if a thermal deformation is caused by, e.g., a heat treatment step, the bottom portion of the contact hole is prevented from being clogged. This implements a reflector in which an increase in contact resistance and faulty operation are suppressed.

In the foregoing arrangement, a degree of crosslinking in the photosensitive resin layer is higher in a surrounding portion of an inner wall surface of the contact hole than in the other portion thereof.

In the arrangement, irradiation of a surrounding portion of the inner wall surface of the contact hole with, e.g., UV light at a shorter wavelength or an electron beam at a shorter wavelength advances cross-linking in the irradiated region, so that it is cured. As a result, a thermal deformation resulting from a heat treatment can be prevented more positively.

To solve the foregoing problems, a reflector according to the present invention comprises: a substrate provided with a nonlinear element; a photosensitive resin layer provided on the substrate, the photosensitive resin layer having projecting and depressed structures in specified regions; and a pixel electrode with a light reflecting property provided on the photosensitive resin layer, the pixel electrode being electrically connected to the nonlinear element via a contact hole formed in the photosensitive resin layer, wherein a thin film having a surface energy higher than that of the photosensitive resin layer is provided on a bottom portion of the contact hole.

In the arrangement, the frame-shaped thin film having the surface energy higher than that of the photosensitive resin layer is provided at the position at which the contact hole is to be formed. Even if a thermal deformation is caused by, e.g., a heat treatment step, the photosensitive resin layer is prevented from flowing and clogging the bottom portion of the contact hole. This implements a reflector in which an increase in contact resistance and faulty operation are suppressed.

To solve the foregoing problems, a reflector according to the present invention comprises: a substrate provided with a nonlinear element, a photosensitive resin layer provided on the substrate, the photosensitive resin layer having projecting and depressed structures in specified regions; and a pixel electrode with a light reflecting property provided on the photosensitive resin layer, the pixel electrode being electrically connected to the nonlinear element via a contact hole formed in the photosensitive resin layer, wherein the contact hole is provided such that a degree of crosslinking is higher in a surrounding portion of an inner wall surface of the contact hole than in the other portion thereof.

In the arrangement, irradiation of surrounding portion of the inner wall surface of the contact hole with, e.g., UV light at a shorter wavelength or an electron beam at a shorter wavelength advances cross-linking in the irradiated region. As a result, a thermal deformation resulting from a heat treatment can be prevented more positively.

To solve the foregoing problems, a reflective display device according to the present invention comprises: a counter substrate with transparency; a reflector disposed in opposing relation to the counter substrate, the reflector including a substrate provided with a plurality of projecting and depressed structures each having a plurality of projecting and depressed portions and serving as a basic unit and a light reflecting thin film provided over the projecting and depressed structures; and a liquid crystal layer held between the counter substrate and the reflector.

The arrangement provides a reflective liquid crystal display device comprising a reflector having a superior contrast property and a superior paper-white property.

To solve the foregoing problems, a method of fabricating a reflector according to the present invention comprises. a step of forming a photosensitive resin layer on a substrate; an exposing step of irradiating the photosensitive resin layer with light via a photomask having light shielding portions patterned into specified configurations; a developing step of developing the photosensitive resin layer irradiated with the light to form a plurality of resist columns; a heat treatment step of performing a heat treatment with respect to the substrate formed with the plurality of resist columns and thereby forming groups of columnar portions each composed of a plurality of minute columnar portions having different heights, the columnar portions being separate from each other or at least partially connected to each other; and a step of forming a light reflecting thin film over the groups of columnar portions, wherein, as the photomask, a mask formed with a plurality of unit components each composed of a plurality of minute shielding portions having different heights is used.

In accordance with the method, the photosensitive resin layer formed on the substrate is initially exposed and then developed to form the resist columns having heights in a uniform distribution. The resist columns are then thermally deformed by performing the heat treatment with respect to the substrate formed with the resist columns, thereby forming the plurality of minute columns having different heights. The columnar portions have different heights because the resist columns have different plan configurations prior to the heat treatment step in response to the configurations and sizes of the light shielding portions. If a photosensitive resin material in which the area occupied by the plan configuration of the resist column and the height of the resist column thermally deformed (i.e., the height of the columnar portion) satisfy a linearly functional relationship is used and the processing temperature is set within a specified range, the resist column occupying a larger area can form a higher columnar portion. By varying the area, therefore, the columnar portion can be formed to have a controlled height so that a reflector is produced in which the light reflecting thin film provided over the group of columnar portions has a precisely controlled slope angle distribution.

To solve the foregoing problems, a method of fabricating a reflector according to the present invention comprises: a step of forming a photosensitive resin layer on a substrate; an exposing step of irradiating the photosensitive resin layer with light via a photomask having light shielding portions each having a progressively varying light shielding rate; a developing step of developing the photosensitive resin layer irradiated with the light to form a plurality of staircase resist columns; a heat treatment step of performing a heat treatment with respect to the substrate formed with the plurality of staircase resist columns to round off respective angular edges of the resist columns and thereby forming staircase structures each having a plurality of stepped portions; and a step of forming a light reflecting thin film over the staircase structures.

In accordance with the method, the photosensitive resin layer is irradiated with light based on the light shielding rates of the light shielding portions of the photomask. Accordingly, optical decomposition and cross-linking proceed to different degrees in different regions so that resist columns each having a staircase cross-sectional configuration are formed after the development step. By further performing the heat treatment step, the staircase structures each having the plurality of stepped portions can be formed. By thus varying the light shielding rate in the photomask, the staircase structures having the stepped portions at controlled heights are formed so that the light reflecting thin film provided over the staircase structures has a precisely controlled slope angle distribution.

To solve the foregoing problems, a method of fabricating a reflector according to the present invention comprises: a step of forming a photosensitive resin layer on a substrate; a step of preparing a plurality of photomasks each having light shielding portions patterned into specified configurations, each of the light shielding portions of the different photomasks covering a light shielding range which is different in size from one photomask to another, each of the light shielding portions of any of the photomasks covering a larger shielding range and each of the light shielding portions of the photomask covering a next smaller shielding range having a relationship therebetween such that the next smaller light shielding range is included in the larger light shielding range; an exposing step of irradiating the photosensitive resin layer with light by successively using the photomasks in the order of decreasing size of the light shielding range of the shielding portion; a developing step of developing the photosensitive resin layer irradiated with the light to form a plurality of staircase resist columns; a heat treatment step of performing a heat treatment with respect to the substrate formed with the staircase resist columns to round off respective angular edges of the resist columns and thereby forming staircase structures each having a plurality of stepped portions; and forming a light reflecting thin film over the staircase structures.

In accordance with the method, the cumulative exposure dose is controlled for each of the regions by performing at least two or more exposing steps and using the photomask covering a light shielding range which decreases as the exposing steps are performed one after another. As a result, optical decomposition and cross-linking proceed to different degrees from one region to another so that the staircase resist columns are formed by the developing step. This allows formation of the staircase structures each having the plurality of stepped portions.

To solve the foregoing problems, a method of fabricating a reflector according to the present invention is a method of fabricating a reflector having a substrate provided with a nonlinear element, a photosensitive resin layer provided on the substrate and having projecting and depressed structures in specified regions, and a pixel electrode with a light reflecting property provided on the photosensitive resin layer, the pixel electrode being electrically connected to the nonlinear element via a contact hole formed in the photosensitive resin layer, the method comprising: a step of forming the nonlinear element on the substrate; a lightreflecting-film forming step of forming, at a position at which the contact hole is to be formed, a light reflecting film patterned into a specified configuration; a coating step of coating a photosensitive resin material over the substrate and the light reflecting film; an exposing step of irradiating the photosensitive resin material with light via a photomask having light shielding portions patterned into specified configurations; a developing step of developing the photosensitive resin material irradiated with the light to form the photosensitive resin layer comprising the contact hole and a plurality of resist columns formed in specified regions; a heat treatment step of performing a heat treatment with respect to the photosensitive resin layer and thereby thermally deforming and rounding off respective edge portions of the plurality of resist columns; a post-baking step of performing a heat treatment with respect to the photosensitive resin layer and thereby curing the photosensitive resin layer; and a pixel-electrode forming step of forming the pixel electrode with the light reflecting property on the photosensitive resin layer.

In accordance with the method, the light reflecting film is formed preliminarily at the position at which the contact hole is to be formed so that light is reflected by the vicinity of the light reflecting film when light is radiated in the exposing step. Accordingly, the exposure dose in the vicinity of the light reflecting film is higher than in the other region. In addition, the developing step allows formation of the contact hole having a generally trapezoidal cross section. The configuration and size of the opening portion of the contact hole nearly correspond to the pattern configuration of the photomask and become larger with approach toward the bottom portion thereof.

Subsequently, the heat treatment is performed with respect to the plurality of resist columns each formed in the specified region to deform the respective edge portions thereof. Although the opening portion and inner wall surface of the contact hole are thermally deformed, there can be formed a contact hole having an unclogged bottom portion because of the trapezoidal cross-sectional configuration. This allows formation of a reflector in which an increase in contact resistance and faulty operation are suppressed.

To solve the foregoing problems, a method of fabricating a reflector according to the present invention is a method of fabricating a reflector having a substrate provided with a nonlinear element, a photosensitive resin layer provided on the substrate and having projecting and depressed structures in specified regions, and a pixel electrode with a light reflecting property provided on the photosensitive resin layer, the pixel electrode being electrically connected to the nonlinear element via a contact hole formed in the photosensitive resin layer, the method comprising: a step of forming the nonlinear element on the substrate; a thin-film forming step of forming, at a position at which the contact hole is to be formed, a frame-shaped thin film having a surface energy higher than that of the photosensitive resin layer; a coating step of coating a photosensitive resin material over the substrate and the thin film; an exposing step of irradiating the photosensitive resin material with light via a photomask having light shielding portions patterned into specified configurations; a developing step of developing the photosensitive resin material irradiated with the light to form the photosensitive resin layer comprising the contact hole and a plurality of resist columns formed in specified regions; a heat treatment step of performing a heat treatment with respect to the photosensitive resin layer and thereby thermally deforming and rounding off respective edge portions of the plurality of resist columns; a post-baking step of performing a heat treatment with respect to the photosensitive resin layer and thereby curing the photosensitive resin layer; and a pixel-electrode forming step of forming the pixel electrode with the light reflecting property on the photosensitive resin layer.

In accordance with the method, the thin film having the surface energy higher than that of the photosensitive resin layer has been formed preliminarily at the position at which the contact hole is to be formed. Even if the opening portion and inner wall surface of the contact hole are thermally deformed, they are prevented from flowing as a result of the thermal deformation. This prevents the bottom portion of the contact hole from being clogged and allows formation of a reflector in which an increase in contact resistance and faulty operation are suppressed. The thin film has been formed into a frame-shaped configuration to provide an electric connection between the switching element and the pixel electrode.

To solve the foregoing problems, a method of fabricating a reflector according to the present invention is a method of fabricating a reflector having a substrate provided with a nonlinear element, a photosensitive resin layer provided on the substrate and having projecting and depressed structures in specified regions, and a pixel electrode with a light reflecting property provided on the photosensitive resin layer, the pixel electrode being electrically connected to the nonlinear element via a contact hole formed in the photosensitive resin layer, the method comprising: a step of forming the nonlinear element on the substrate; a thin-film forming step of forming, on a drain electrode of the nonlinear element, a thin film having a surface energy higher than that of the photosensitive resin layer; a coating step of coating a photosensitive resin material over the substrate and the thin film; an exposing step of irradiating the photosensitive resin material with light via a photomask having light shielding portions patterned into specified configurations; a developing step of developing the photosensitive resin material irradiated with the light to form the photosensitive resin layer comprising the contact hole and a plurality of resist columns formed in specified regions; a heat treatment step of performing a heat treatment with respect to the photosensitive resin layer and thereby thermally deforming and rounding off respective edge portions of the plurality of resist columns; a removing step of removing the thin film by ashing; a post-baking step of performing a heat treatment with respect to the photosensitive resin layer and thereby curing the photosensitive resin layer; and a pixel-electrode forming step of forming the pixel electrode with the light reflecting property on the photosensitive resin layer.

In accordance with the method, even if the thin film which is not frame-shaped is formed, an electric connection is provided between the nonlinear element and the pixel electrode and the bottom portion of the contact hole is prevented from being clogged if the thin film is removed by ashing. This allows formation of a reflector in which an increase in contact resistance and faulty operation are suppressed.

To solve the foregoing problems, a method of fabricating a reflector according to the present invention is a method of fabricating a reflector having a substrate provided with a nonlinear element, a photosensitive resin layer provided on the substrate and having projecting and depressed structures in specified regions, and a pixel electrode with a light reflecting property provided on the photosensitive resin layer, the pixel electrode being electrically connected to the nonlinear element via a contact hole formed in the photosensitive resin layer, the method comprising: a step of forming the nonlinear element on the substrate; a coating step of coating a photosensitive resin material on the substrate; an exposing step of irradiating the photosensitive resin material with light via a photomask having light shielding portions patterned into specified configurations; a developing step of developing the photosensitive resin material irradiated with the light to form the photosensitive resin layer comprising the contact hole and a plurality of resist columns formed in specified regions; a light irradiating step of irradiating a surrounding portion of the contact hole with light at a shorter wavelength; a heat treatment step of performing a heat treatment with respect to the photosensitive resin layer and thereby thermally deforming and rounding off respective edge portions of the plurality of resist columns; a post-baking step of performing a heat treatment with respect to the photosensitive resin layer; and a pixel-electrode forming step of forming the pixel electrode with the light reflecting property on the photosensitive resin layer, wherein a degree of crosslinking is higher in a surrounding portion of an inner wall surface of the contact hole.

In accordance with the method, irradiation of a surrounding portion of the contact hole that has been formed by the exposing and developing steps with light at a shorter wavelength advances cross-linking in the opening portion and inner wall surface of the contact hole, so that curing proceeds to a higher degree than in the other portion. Even if the heat treatment step is performed, therefore, the surrounding portion of the contact hole is inhibited from being thermally deformed. This prevents the bottom portion of the contact hole from being clogged and allows formation of a reflector in which an increase in contact resistance and faulty operation are suppressed.

The foregoing arrangement further comprises, after the heat treatment step, a light irradiating step of irradiating the surrounding portion of the contact hole with light at a shorter wavelength.

By thus performing again the light irradiating step after the heat treatment step, thermal deformation during the post-baking step is suppressed and an increase in contact resistance and faulty operation are further suppressed.

To solve the foregoing problems, a method of fabricating a reflector comprises: a step of forming a photosensitive resin layer on a substrate; an exposing step of irradiating the photosensitive resin layer with light via a first photomask having light shielding portions patterned into specified configurations; a developing step of developing the photosensitive resin layer irradiated with the light to form a plurality of resist columns; an irradiating step of irradiating respective specified regions of the plurality of resist columns with light at a shorter wavelength via a second photomask having openings patterned into specified configurations; a heat treatment step of performing a heat treatment with respect to the resist columns and thereby thermally deforming respective edge portions of the plurality of resist columns to form projecting and depressed structures each having an asymmetrical cross-sectional configuration; a post-baking step of performing a heat treatment with respect to the photosensitive resin layer; and a pixel-electrode forming step of forming a pixel electrode with a light reflecting property on the photosensitive resin layer.

In accordance with the method, irradiation of the respective specified regions of the resist columns that have been formed by performing the exposing and developing steps with the Light at a shorter wavelength advances cross-linking in the irradiated regions, so that curing proceeds to a higher degree than in the other portion. As a result, unirradiated regions undergo significant thermal deformation, while the cured portions undergo a lower degree of thermal deformation. This allows formation of the projecting and depressed structures each having an asymmetric cross-sectional configuration and fabrication of a reflector capable of scattering and reflecting light in directions within an anisotropic range. If conditions for irradiation in the light irradiating step are determined properly, the projecting and depressed structures each having the asymmetric cross-sectional configuration and a desired slope angle can be formed with ease and controllability.

The foregoing arrangement further comprises, after the heat treatment step, a light irradiating step of irradiating the plurality of projecting and depressed structures with light at a shorter wavelength.

By thus performing again the light irradiating step after the heat treatment step, the projecting and depressed structures each having an asymmetric cross-sectional configuration are prevented from being thermally deformed in the post-baking step and there can be fabricated a reflector having desired reflecting properties.

Second Group of the Invention

To solve the foregoing problems, a reflective display device according to the present invention is a reflective display device having a liquid crystal layer provided between a pair of substrates, wherein one of the pair of substrates is provided with projecting and depressed portions covered with a metal film and with a support portion for supporting the other of the pair of substrates, the projecting and depressed portions and the support portion being molded integrally.

In the case where one of the substrates is provided with the projecting and depressed portions, as in the foregoing arrangement, if spacers are scattered to provide a specified cell gap between the pair of substrates, the cell gap therebetween becomes nonuniform over a surface of the substrate so that uneven display is recognized visually. However, if the projecting and depressed portions and the support portion for supporting the other of the substrates are formed integrally, there is no need to scatter the spacers and a uniform cell gap is provided. This reduces the occurrence of uneven display and provides a high display quality.

In the foregoing arrangement, the projecting and depressed portions may be pyramidal or conical.

In the foregoing arrangement, if an angle formed between an inclined surface of the pyramidal projecting and depressed portions and a horizontal surface or an angle formed between a generating line of the conical projecting and depressed portions and a horizontal surface is assumed to be a slope angle, the projecting and depressed portions may be dispersively arranged at different slope angles and the slope angles are in the range of 4° to 16°.

The foregoing arrangement may further comprises a polymer resin layer molded integrally with the projecting and depressed portions and with the support portion for supporting the other of the substrates, the polymer resin layer being provided on one of the substrates.

In the foregoing arrangement, a plurality of nonlinear elements may be provided on one of the substrates and a contact hole for providing an electric connection between the nonlinear elements and the metal film is provided in the polymer resin layer.

In the foregoing arrangement, a resin film molded integrally with the projecting and depressed portions and with the support portion for supporting the other of the substrates may be laminated on one of the substrates.

In the foregoing arrangement, the resin film may be made of a photosensitive resin.

In the foregoing arrangement, one of the substrates may be a plastic substrate molded with the projecting and depressed portions and with the support portion for supporting the other of the substrates.

To solve the foregoing problems, a reflective display device according to the present invention is a reflective display device having a photosensitive resin layer provided on a substrate and a metal film provided on the photosensitive resin layer, wherein the photosensitive resin layer is formed by exposing, to light, a photosensitive resin coated on the substrate via a photomask and developing the exposed photosensitive resin, the photosensitive resin layer having a projecting and depressed surface formed by exposing the photosensitive resin to the light via the photomask having a light shielding pattern composed of groups of minute halftone dots smaller than a resolution limit of an exposing device used for the exposure and a resolution limit of the photosensitive resin, a mean light transmittance of the light shielding pattern being nonuniform over a surface of the photomask.

In the foregoing arrangements, the projecting and depressed portions are formed in the photosensitive resin layer by using the photomask having the light shielding pattern capable of half-tone representation which cannot be implemented with a conventional chromium mask or the like and finely controlling the configuration of the projecting and depressed portions. This permits light incident from an arbitrary direction to be scattered and reflected in the forward direction of the reflective display device or the like, not in the regular reflection direction, and enables bright image display with excellent whiteness.

To solve the foregoing problems, a method of fabricating a reflective display device according to the present invention is a method of fabricating a reflective display device comprising a light modulating layer between a pair of substrates, the method comprising the steps of forming a polymer resin layer on one of the pair of substrates; pressing a platen provided with a projecting and depressed pattern composed of a group of minute projecting and depressed patterns and a hole against the polymer resin layer; curing the polymer resin layer and mold releasing the platen from the polymer resin layer; forming a metal film on the polymer resin layer; and thereby shaping the polymer resin layer into the projecting and depressed pattern to integrally mold minute projecting and depressed portions in a surface of the polymer resin layer with a support portion for supporting the other of the pair of substrates.

In the conventional reflector, the projecting and depressed configurations have been formed by forming the projecting portions by using a photoresist, heat-melting the projecting portions, and thereby rounding off the respective angular edges thereof. Therefore, it has been difficult to control the curved configurations of the projecting and depressed portions. However, the foregoing method allows formation of the projecting and depressed portions having precisely controlled curved configurations in the polymer resin layer because it performs shaping by using the platen provided with the projecting and depressed pattern composed of the group of minute projecting and depressed patterns and the hole. This reduces reflection in the regular reflection direction and allows fabrication of a reflective display device with excellent brightness and whiteness. Moreover, since the projecting and depressed portions and the support portion for supporting the counter substrate are formed integrally, there is no need to scatter spacers and a uniform cell gap is provided. This reduces the occurrence of uneven display and provides a reflective display device with a high display quality.

In the foregoing method, if the polymer resin layer formed on one of the substrates is a photosensitive resin layer, a platen with transparency is used as the platen and the polymer resin layer may be cured by irradiating the photosensitive resin layer with light via the platen.

In the foregoing method, if the polymer resin layer formed on one of the substrates is a thermoplastic resin layer, the platen may be pressed against the thermoplastic resin layer with the application of heat.

In the foregoing method, a nonlinear element is provided on one of the substrates and a platen having a projecting portion for forming a contact hole at a position corresponding to an output terminal portion of the nonlinear element may be used as the platen.

In the foregoing method, a bottom portion of the contact hole in the polymer resin layer may be etched immediately after the platen is mold released from the polymer resin layer till the output terminal portion of the nonlinear element is exposed. This satisfactorily exposes the output terminal portion of the nonlinear element even if the contact hole to be formed by shaping has an insufficient opening area and suppresses an increase in contact resistance. As a result, there can be fabricated a reflective display device with a particularly high display quality in a motion picture display.

To solve the foregoing problems, a method of fabricating a reflective display device according to the present invention is a method of fabricating a reflective display device comprising a light modulating layer between a pair of substrates, the method comprising the steps of: pressing a platen provided with a projecting and depressed pattern composed of a group of minute projecting and depressed patterns and a hole against one of the pair of substrates; curing one of the substrates and mold releasing the platen from one of the substrates; forming a metal film on one of the substrates; and thereby shaping one of the substrates into the projecting and depressed pattern to integrally mold minute projecting and depressed portions in a surface of one of the substrates with a support portion for supporting the other of the substrates.

In the fabrication of a substrate, the step of pressing a platen with satisfactory flatness against the substrate has been performed conventionally to smooth the surface thereof. The foregoing method achieves a reduction in the number of process steps and lower cost by shaping the substrate into the projecting and depressed pattern with the use of the platen provided with the projecting and depressed pattern and smoothing the substrate.

In the foregoing method, if one of the substrates is made of a photosensitive resin, a platen with transparency is used as the platen and one of the substrates may be cured by irradiating one of the substrates with light via the platen.

In the foregoing method, if one of the substrates is made of a thermoplastic resin, the platen may be pressed against one of the substrates with the application of heat.

To solve the foregoing problems, a method of fabricating a reflective display device according to the present invention is a method of fabricating a reflective display device comprising a light modulating layer between a pair of substrates, the method comprising the steps of: forming a polymer resin layer over a mold provided with a projecting and depressed pattern composed of a group of minute projecting and depressed patterns; bonding the mold to one of the pair of the substrates such that the polymer resin layer faces the substrate and releasing the mold from the polymer resin layer to laminate the polymer resin layer on one of the substrates; forming a metal film over the polymer resin layer; and thereby shaping the polymer resin layer into the projecting and depressed pattern to form minute projecting and depressed portions in a surface of the polymer resin layer.

If a polymer resin is coated on the substrate and the polymer resin is shaped into the projecting and depressed pattern by using the platen, e.g., the substrate may be damaged in pressing the platen against the substrate. However, if the polymer resin layer that has been shaped into the projecting and depressed pattern by using the platen provided with the projecting and depressed pattern is prepared in advance and formed on the substrate, the substrate will not be broken. This allows fabrication of a reflective display device with an improved production yield. The foregoing method also achieves a reduction in fabrication cost since the process of forming the polymer resin layer over the platen can be performed in a shorter time than the process of shaping the polymer resin formed on the substrate by pressing the platen thereagainst.

In the foregoing method, a base film made of a polymer resin may be used as the mold.

In the foregoing method, a mold having, at a specified position, a hole for forming a support portion for supporting the other of the pair of substrates may be used as the mold.

To solve the foregoing problems, a method of fabricating a reflector comprises the steps of: coating a photosensitive resin layer on a substrate; exposing the photosensitive resin layer to light via a photomask; developing the exposed photosensitive resin layer to form projecting and depressed portions in the photosensitive resin layer; and forming a reflective film over the projecting and depressed surface, wherein the photomask has a light shielding pattern composed of groups of minute half-tone dots smaller than a resolution limit of an exposing device used in the exposing step and a resolution limit of the photosensitive resin layer and a mean light transmittance of the light shielding pattern is nonuniform over a surface of the photomask.

Since the foregoing method uses the photomask having the light shielding pattern composed of the groups of minute halftone dots smaller than the resolution limit of the exposing device and the resolution limit of the photosensitive resin layer, it can implement halftone representation that has been impossible with a conventional photomask and the ability to represent details is improved remarkably. As a consequence, the projecting and depressed portions having, e.g., a gently inclined surface can be formed and fine control of the configurations of the projecting and depressed portions can be effected properly. Since a normal exposing device or the like can be used, there is no need to introduce new equipment.

Since the light shielding pattern has a nonuniform mean transmittance over a surface of the photomask, projecting and depressed portions having different heights and depth can be formed in a variety.

In the foregoing method, a nonlinear element is provided on the substrate and a mask having a light shielding portion or a light non-shielding portion provided at a portion corresponding to an output portion of the non-linear element may be used as the photomask.

The method allows formation of a contact hole in the portion of the photosensitive resin layer corresponding to the output portion of the nonlinear element. If the photomask is provided with the light shielding portion, a photosensitive resin layer composed of a negative resist can be used as the photosensitive resin layer. If the photomask is provided with a light non-shielding portion, a photosensitive resin layer composed of a positive resist can be used as the photosensitive resin layer.

BRIEF DESCRIPTION OF THE DRAWINGS

These and other objects and features of the present invention will become apparent from the following description of preferred embodiments thereof taken in conjunction with the accompanying drawings, in which:

FIG. 2A is a plan view of groups of columnar portions in the reflector of EMBODIMENT 1 and FIG. 2B is a cross-sectional view taken along the line A–A' of FIG. 2A;

FIGS. 13 are plan views schematically showing pattern configurations of respective shielding portions of photomasks used in the process of fabricating the reflector, of which

FIGS. 15 are plan views schematically showing photomasks used in the process of fabricating the reflector, of which

FIGS. 25 are views illustrating a structure of a grating reflector, of which

FIGS. 35A to 35E are cross-sectional views illustrating a method of fabricating the conventional reflector, of which FIG. 35A is a cross-sectional view of a resist film coated on a substrate, FIG. 35B is a cross-sectional view illustrating exposure of the resist film, FIG. 35C is a cross-sectional view illustrating the development of the exposed resist film, FIG. 35D is a cross-sectional view illustrating a heat treatment performed with respect to projecting portions, FIG. 35E is a cross-sectional view illustrating the step of forming a polymer resin film over the projecting portions after the heat treatment.

DESCRIPTION OF THE EMBODIMENTS

First Group of the Invention

Figure 1:
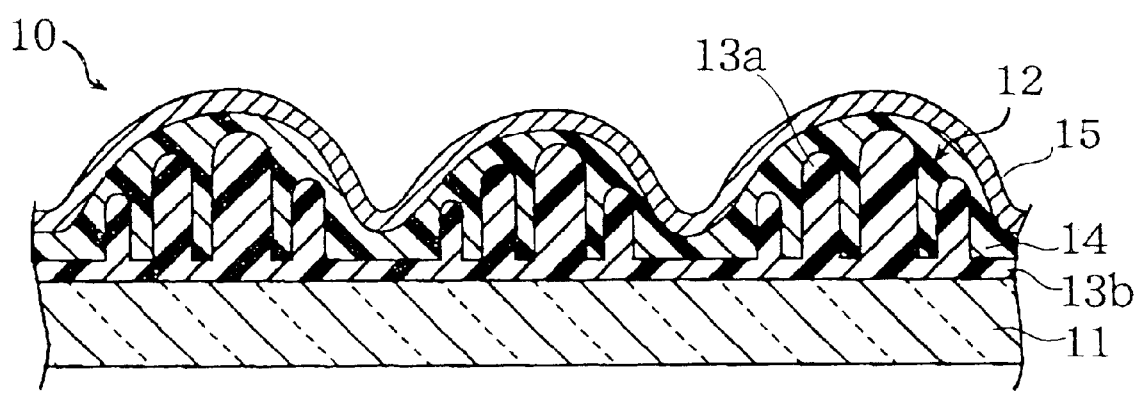
FIG. 1 is a cross-sectional view showing a structure of a reflector according to EMBODIMENT 1 of the present invention.
Figure 3:
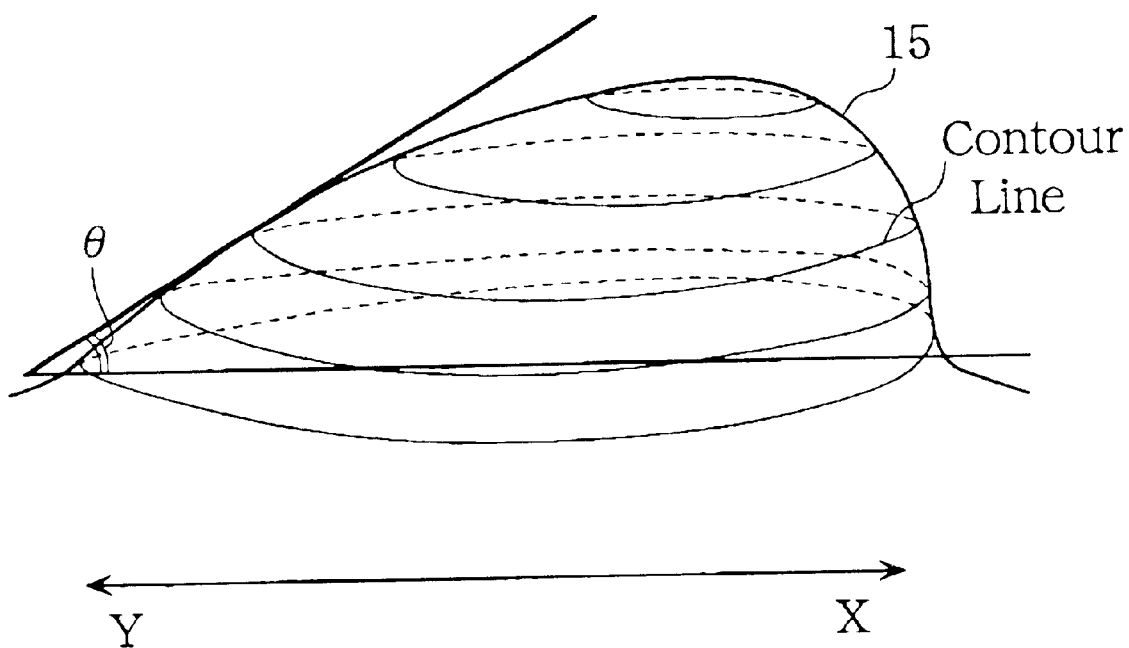
FIG. 3 is a perspective view of a light reflecting thin film in the reflector according to EMBODIMENT 1.

Referring now to the drawings, the embodiments of the present invention will be described.

EMBODIMENT 1

An embodiment of the present invention will be described with reference to FIGS. 1 to 8. FIG. 1 is a cross-sectional view illustrating a reflector according to the present embodiment. As shown in the drawing, a reflector 10 is composed of plural groups 12 of columnar portions (projecting and depressed structures); a polymer resin layer 14; and a light reflecting thin film 15, which are stacked successively on a substrate 11.

The substrate 11 is composed of an insulating substrate made of, e.g., glass (under the trade name 1737, which is commercially available from Corning Co.). The substrate 11 has a thickness of, e.g., 1.1 mm.

Each of the groups 12 of columnar portions is composed of a plurality of minute columnar portions (projecting portions) 13a to form a basic unit for determining the reflective properties of the reflector 10. As shown in the drawing, the groups 12 of columnar portions are positioned irregularly on the substrate 11 in parallel relation to each other. What results is a structure in which the groups 12 of columnar portions as the basic units are not observed repetitively with a given period. This suppresses interference of light which occurs due to a repetitive pattern in which the projecting and depressed structures are arranged regularly and suppresses a phenomenon of colored reflected light. The groups 12 of columnar portions may also be contiguous to each other without having clearance therebetween in a portion or in a plurality of portions. If the clearance is excessively large, on the other hand, a flat surface parallel to a substrate surface is formed undesirably to increase light reflected in the regular reflection direction.

If a plan configuration of a region in which columnar portions 13a are distributed is regarded approximately as those of the groups 12 of columnar portions, the groups 12 of columnar portions are formed to have elliptical plan configurations, as indicated by the dot circles in FIG. 2A. Accordingly, the plan configuration and size of each of the groups 12 of columnar portions can be adjusted freely and accurately as required by changing the distribution of the plurality of columnar portions 13a isotropically or anisotropically in such a manner as to impart a specified directionality to the distribution. The size of the group 12 of columnar portions can be changed appropriately provided that the lengths of the long and short axes thereof are in the range of 1 μm to 100 μm. Compared with a conventional reflector (as disclosed in Japanese Unexamined Patent Publication No. HEI 9-292504) having such a structure that projecting portions are provided between a substrate and a metal thin film, the group 12 of columnar portions as a basic unit has a size comparable to that of the projecting portion of the conventional reflector. Preferably, the maximum width of the columnar portion 13a in plan view is in the range of 0.5 μm to 20 μm. If the maximum width is smaller than 0.5 μm, it is difficult to form the columnar portion of this size since an exposure limit is exceeded. If the maximum width is larger than 20 μm, on the other hand, the level difference between the projecting and depressed portions is increased to aggravate the nonuniformity of a cell gap so that uneven display is visually recognized undesirably.

Each of the groups 12 of columnar portions is composed of the plurality of minute columnar portions 13 having different heights which are collectively placed on a residual film 13b. By forming the columnar portions 13a having different heights at specified positions, therefore, the height distribution of the groups 12 of columnar portions can be varied finely This enables precise control of the slope angle distribution of the light reflecting thin film 15 formed over the groups 12 of columnar portions. In the present embodiment, the heights has a peak deviated, in the direction indicated by the arrow X, from a center portion of the region in which the columnar portions 13a are distributed. The columnar portions 13a having different heights are arranged such that the heights thereof tend to decrease gradually with distance from the peak toward the periphery. Preferably, the height of the columnar portion 13a is in the range to 1 μm to 5 μm. The height of the column portion 13a is a level difference between the residual film 13b and a top of the columnar portion 13a. If the height is smaller than 1 μm, the level difference between the projecting and depressed portions on the surface of the light reflecting thin film 15 is reduced to undesirably increase light reflected in the regular reflection direction. If the height is larger than 5 μm, on the other hand, the nonuniformity of the cell gaps is aggravated so that uneven display is visually recognized undesirably to degrade the display quality. The number of columnar portions 13a distributed per unit area of 1 mm² is appropriately in the range of about 100 to 500000. If the number of the columnar portions 13a distributed per unit area is smaller than 100/mm² the scattering property deteriorates. If the number of the columnar portions 13a distributed per unit area is larger than 500000/mm², on the other hand, regularity is produced undesirably to form a repetitive structure. The respective peak heights of the groups 12 of columnar portions may be the same or different from each other.

The columnar portions 13a are made of, e.g., a photosensitive resin, example of which are a positive resist, an electron beam resist, and the like. The present embodiment has used a low-γ positive resist (under the trade name PC409, which is commercially available from JSR Corporation). The columnar portion 13a is configured as a column having a circular or elliptical cross section in a direction parallel to a substrate surface and a roundly curved tip portion. This allows the Light reflecting thin film 15 provided over the columnar portions 13a to have a smooth, curved surface. In accordance with the present invention, the cross-sectional configuration in the direction parallel to the substrate surface is not limited to a circle or an ellipse and may be a polygon or the like.

The residual film 13b is composed of the same material as composing the columnar portions 13a. The residual film 13b is a film undeveloped and left in forming the columnar portions 13a by the developing step in the photolithographic process.

The polymer resin layer 14 is composed of, e.g., a resist. The same material composing the columnar portions 13a may also be used to compose the polymer resin layer 14. By providing the polymer resin layer 14, a gently curved surface configuration can be imparted to a flat portion parallel to the substrate surface if the clearance between the groups 12 of columnar portions is large. Since the flat region parallel to the substrate 11 is not formed, light reflected in the regular reflection direction is suppressed. Even if deep valley portions are formed between the columnar portions 13a due to a large level difference between the top portions of the columnar portions 13a and the residual film 13b, the polymer resin layer 14 is filled in the valley portions to provide a gently curved surface configuration in which the height distribution varies continuously. The polymer resin layer 14 is not limited to a single-layer structure. In consideration of the film thickness, the polymer layer 14 may also have a multi-layer structure in which a plurality of layers are stacked.

The light reflecting thin film 15 has a light reflecting function and is composed of a metal thin film made of aluminum (Al) or the like. The light reflecting thin film 15 has an anisotropic scattering surface which scatters and reflects light in directions within an anisotropic range. Specifically, the light reflecting thin film 15 has a projecting and depressed surface which does not have a flat region parallel to a surface of the substrate 11. The surface configuration of the light reflecting thin film 15 is curved to have a curvature which is locally larger in the X-direction than in the Y-direction opposite to the X-direction. That is, a deflection is produced in a cross-sectional configuration of the slope angle distribution in the X-to-Y direction, so that an asymmetrical structure is provided. As a result, light incident from a certain direction can be reflected not in the regular reflection direction but in a direction of visual recognition of the viewer, such as a direction perpendicular to the reflector 10. The surface configuration of the light reflecting thin film 15 is determined by the height distribution of the columnar portions 13a composing the groups 12 of columnar portions and the two-dimensional distribution thereof. Therefore, the magnitude of the slop angle, the slope angle distribution, and the surface configuration of the light reflecting thin film 15 can be controlled precisely by controlling the height distribution of the columnar portions 13a. If slight reflection of light in the regular reflection direction is permitted, the proportion of the flat region to the entire region may be at least about 20% or lower. As the material of the light reflecting thin film 15, there can be listed silver (Ag), chromium (Cr), nickel (Ni), or a multilayer film consisting of a plurality of stacked metal thin films in addition to Al mentioned above.

Figure 4:
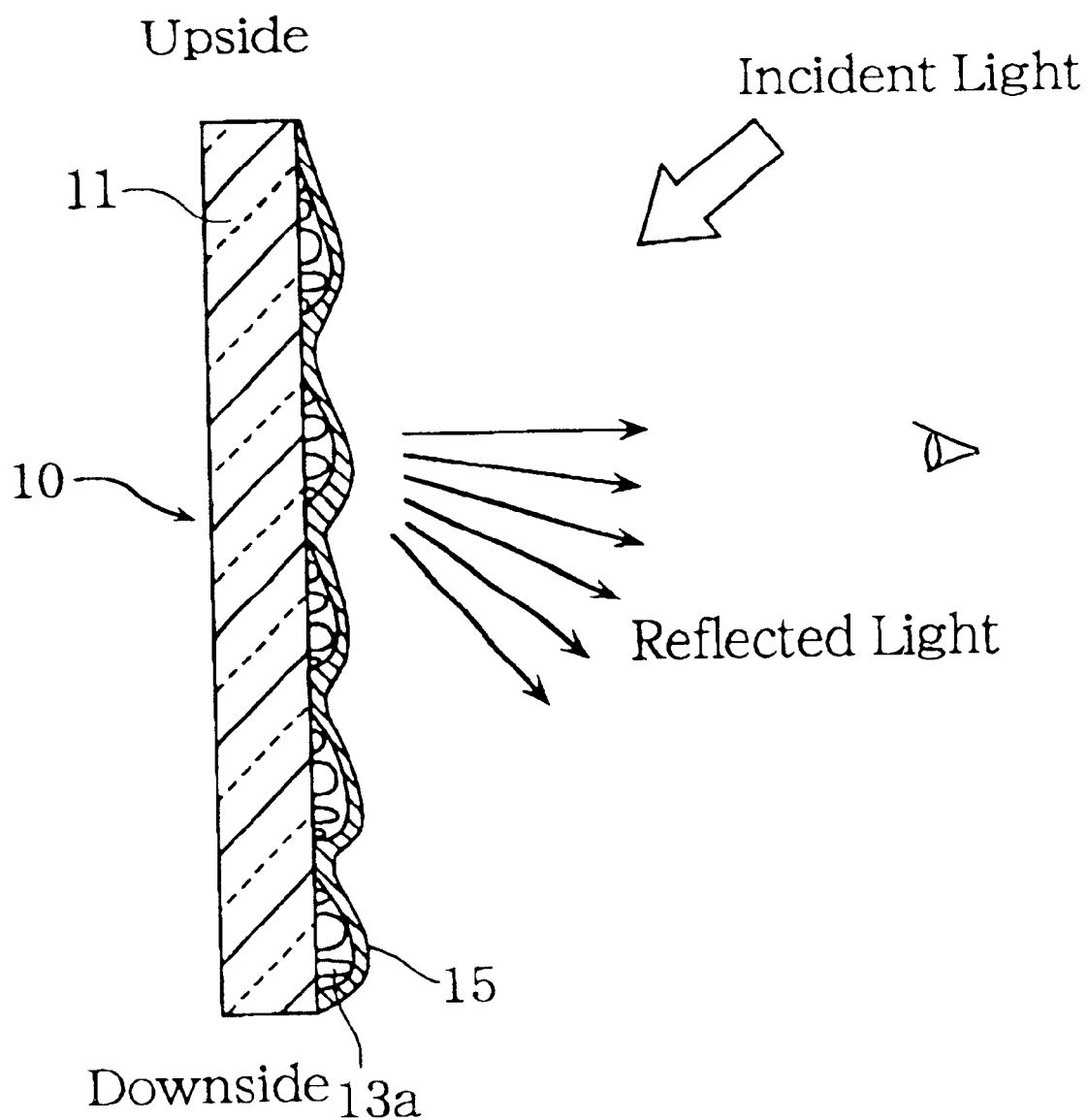
FIG. 4 illustrates the scattering and reflection of light by the reflector according to EMBODIMENT 1.

As shown in FIG. 4, the reflector 10 according to the present embodiment thus structured is disposed to have a curved surface with a lower curvature facing upward such that it has a high reflectance in a wide range and scattering and reflecting properties including a superior paper-white property.

A description will be given below to a method of fabricating the reflector 10 according to the present embodiment. FIGS. 5 are cross-sectional views illustrating the process of fabricating the reflector 10.

Figure 5A:
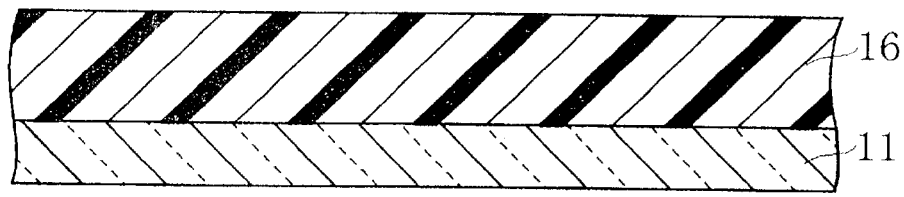
FIGS. 5A–5D are cross-sectional views illustrating the process of fabricating the reflector according to EMBODIMENT 1.

First, as shown in FIG. 5A, a photosensitive resin material (under the trade name PC409, which is a low-γ positive resist commercially available from JSR Corporation) is coated by spin coating on the substrate 11 (under the trade name 1737, which is available from Corning Co.) (coating step). For example, spin coating is performed at a revolution speed of 700 rpm for 30 seconds such that a coated film with a thickness of 3.6 $\mu$m is formed. The substrate 11 having a coating of the photosensitive resist material is then pre-baked at 105° C. for 90 seconds such that a solvent in the coated film is evaporated, whereby the photosensitive resin layer 16 is formed.

Figure 5B:
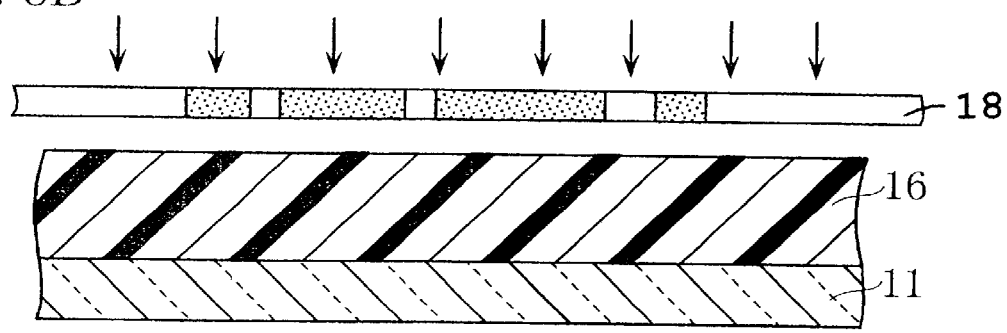
Figure 5C:
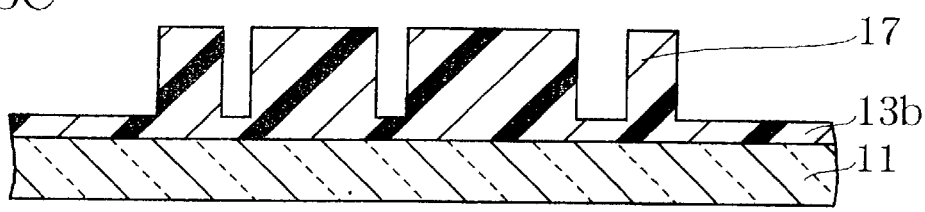
Figure 6:
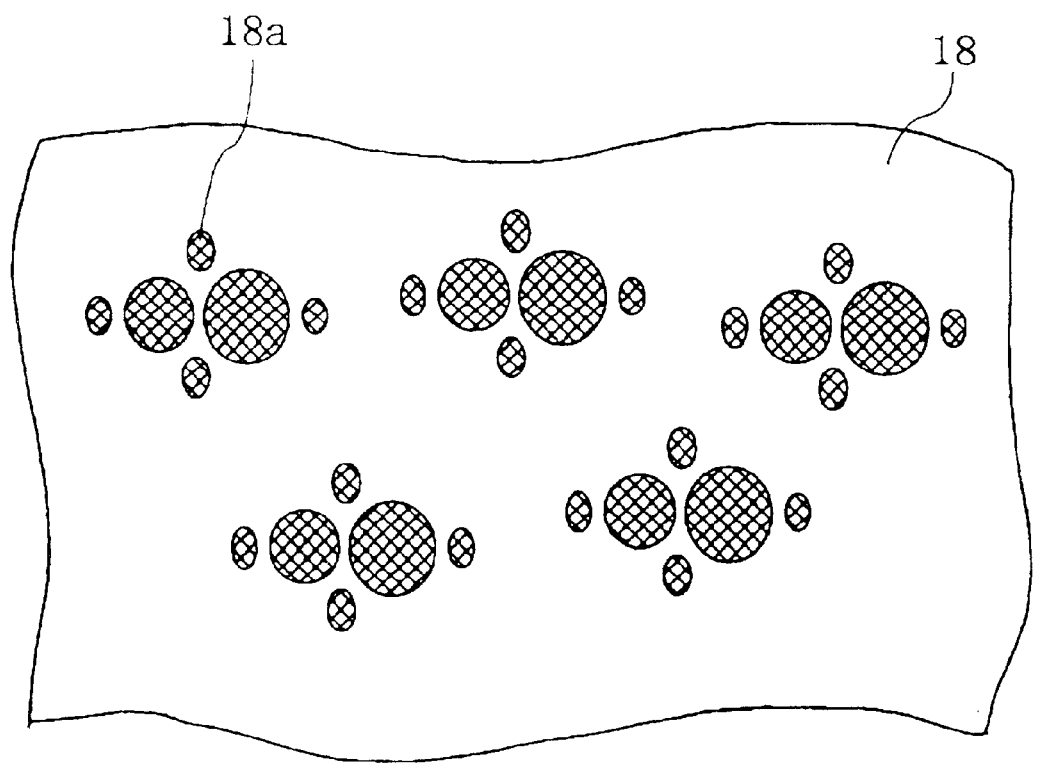
FIG. 6 is a plan view schematically showing a pattern configuration of a shielding portion of a photomask used in the process of fabricating the reflector.

Next, as shown in FIG. 5B, a photomask 18 is positioned above the photosensitive resin layer 16 such that the photosensitive resin layer 16 is exposed to UV light via the photomask 18 (exposing step). As shown in FIG. 6, the photomask 18 has circular or elliptical shielding portions 18a formed irregularly to occupy specified areas. More specifically, the shielding portions are formed so as to occupy larger areas at portions where higher columnar portions are to be formed (a detailed description will be given later to the reason for this). For example, the UV light is radiated at an intensity of 10 to 300 mJ/cm$^2$ for an exposure time of 1 to 30 seconds. As for pattern data for implementing the pattern configuration shown in FIG. 6, it has been predetermined by simulation or the like such that the columnar portions 13a of different sizes have a specified height distribution Subsequently, development is performed by using an aqueous solution containing 0.4% of NMD-3™ (commercially available from Tokyo Ohka Kogyo Co., Ltd.) as a developing solution and an unwanted portion is dissolved away (developing step). The development time is, e.g., about 60 seconds. By the developing step, resist columns 17 and the residual film 13b are formed on the substrate 11, as shown in FIG. 5C. In plan view, the resist columns 17 occupy different areas depending on the sizes of the shielding portions 18a of the photomask 18. The resist columns 17 have a uniform height (which is a height measured on the basis of the resist film 13b), since the developing speeds are nearly the same.

Figure 5D:
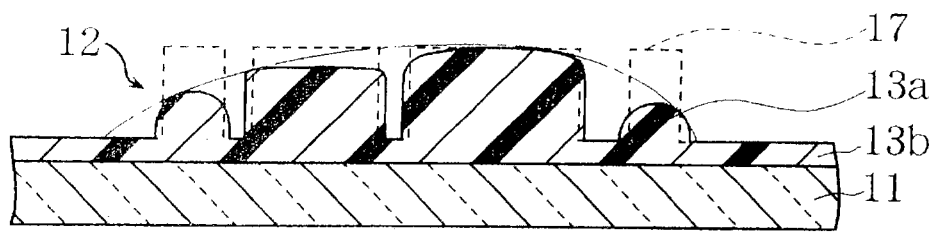

Next, a heat treatment is performed by heating the substrate 11 formed with the resist columns 17 and the like at a temperature of, e.g., 120° C. for 5 minutes. As a consequence, the respective angular edges of the tip portions of the resist columns 17 are heat-melted, which allows the formation of the columnar portions 13 having smoothly curved configurations and the groups 12 of columnar portions composed of the group of the columnar portions 13a, as shown in FIG. 5D.

Figure 7:
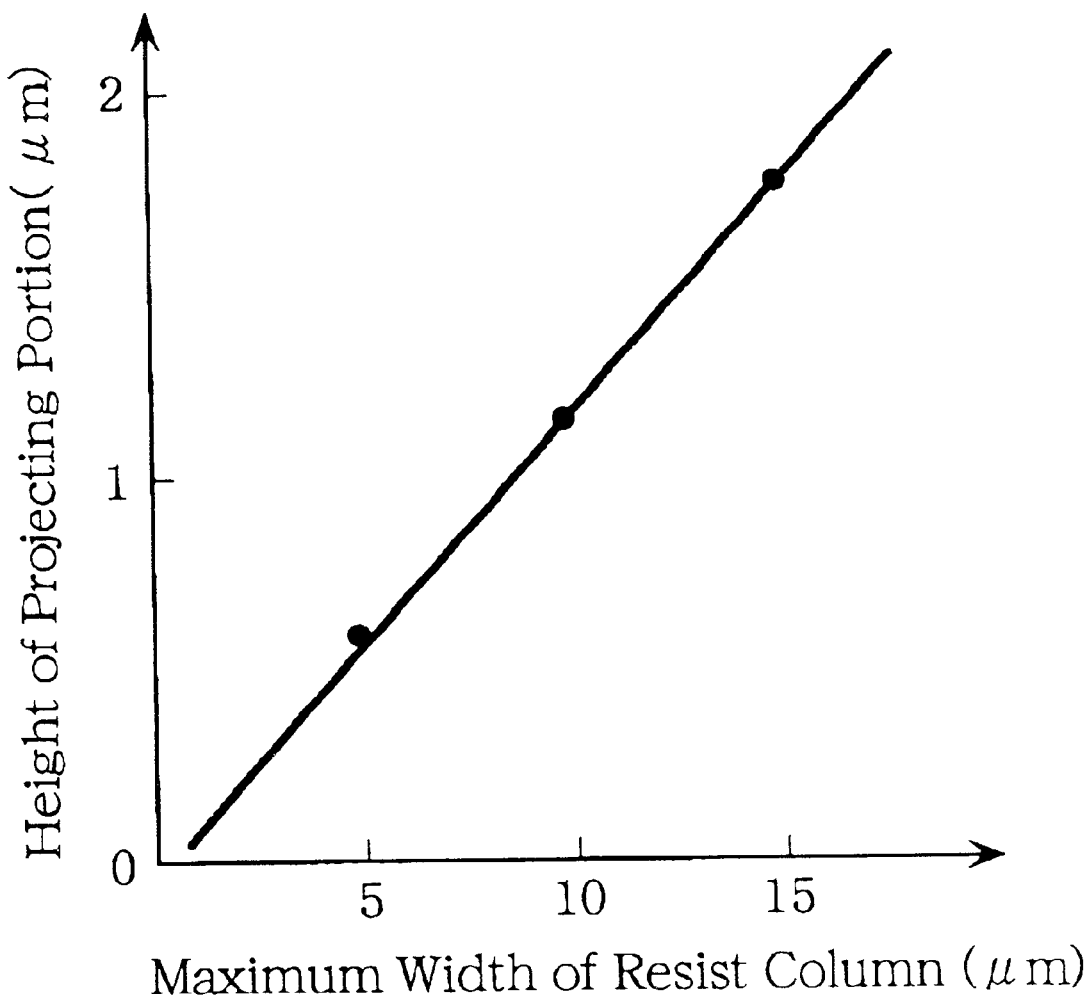
FIG. 7 is a graph showing the relationship between the maximum width of a resist column and the height of a projecting portion.

The columnar portions 13a composing the groups 12 of columnar portions are formed to have different heights which are measured from the residual film 13b. This is because the present embodiment has used a photosensitive resin material such that the maximum widths ($\mu$m) of the resist columns and the heights ($\mu$m) of the columnar portions formed by heat-melting the resist column satisfy such a linearly functional relationship as shown in FIG. 7. The drawing shows the result of measuring, from the residual film, the heights of the columnar portions formed by heat-melting the resist columns having different maximum widths in plan view. In plan view, the resist columns in use have a geometrically similar relationship therebetween and nearly equal heights. As will be understood from the drawing, the heights of the columnar portions after the heat-melting process are larger as the maximum widths of the resist columns are increased, i.e., as the areas occupied by the resist columns in plan view are increased. By properly setting the maximum widths of the resist columns 17, therefore, the heights of the individual columnar portions 13a can be controlled, which allows precise control of the height distribution of the groups 12 of columnar portions. Depending on the temperature range set in the heating step, however, there are cases where the resist columns that are melted and softened are apt to elongate in a direction vertical to the substrate 11 due to the affinity between the photosensitive resin material and the substrate 1. In other words, there are cases where the relationship between the maximum widths ($\mu$m) of the resist columns and the heights ($\mu$m) of the columnar portions formed after the heat-melting process are represented by a curve protruding upwardly and having an inflexion point.

The overall height of the columnar portions 13a and the thickness of the residual film 13b can be controlled by adjusting the thickness and material of the photosensitive resin layer 16, the cumulative exposure dose, the exposure time, and the development time. Specifically, a larger thickness increases the overall height of the resist columns 17 so that the overall height of the columnar portions 13a is also increased. The heights of the resist columns 17 can be controlled by varying the exposure time since the cumulative exposure dose is varied thereby. If the cumulative exposure dose is increased by, e.g., increasing the exposure time, the heights of the resist columns 17 are increased. This increases the heights of the columnar portions 13a and planarizes the depressed portions between the adjacent columnar portions 13a or reduces the thickness of the residual film 13b. It is also possible to reduce the overall height of the resist columns 17 by increasing the development time. Moreover, the present embodiment has used the low-$\gamma$ positive resist PC409, which is such a photosensitive resin material as to reduce the thickness of the residual film on a linear function basis as the cumulative exposure dose increases. If a normal photosensitive resin material is used, the thickness of the residual film presents a fixed value till a certain cumulative exposure dose is reached. However, the film thickness reduces drastically if the cumulative exposure dose is exceeded. If such a normal photosensitive resin material is used, it is difficult to control the thickness of the residual film, i.e., the heights of the columnar portions 13. Hence, it is preferable to use a photosensitive resin material having such physical properties as shown in the present embodiment in terms of controllability over the heights of the columnar portions 13a.

Further, the same photosensitive resin material (under the trade name PC409, which is a positive resist commercially available from JSR Corporation), as composing the columnar portions 13a and the residual film 13b is coated thereon by spin coating.

Next, the coated film is cured by, e.g., applying heat at a specified temperature for a given time, thereby forming a polymer resin layer 14. Further, aluminum is vapor-deposited on the polymer resin layer 14, whereby the light reflecting thin film 15 having a thickness of about 2000 Å is formed (light-reflecting-thin-film forming step).

Figure 8:
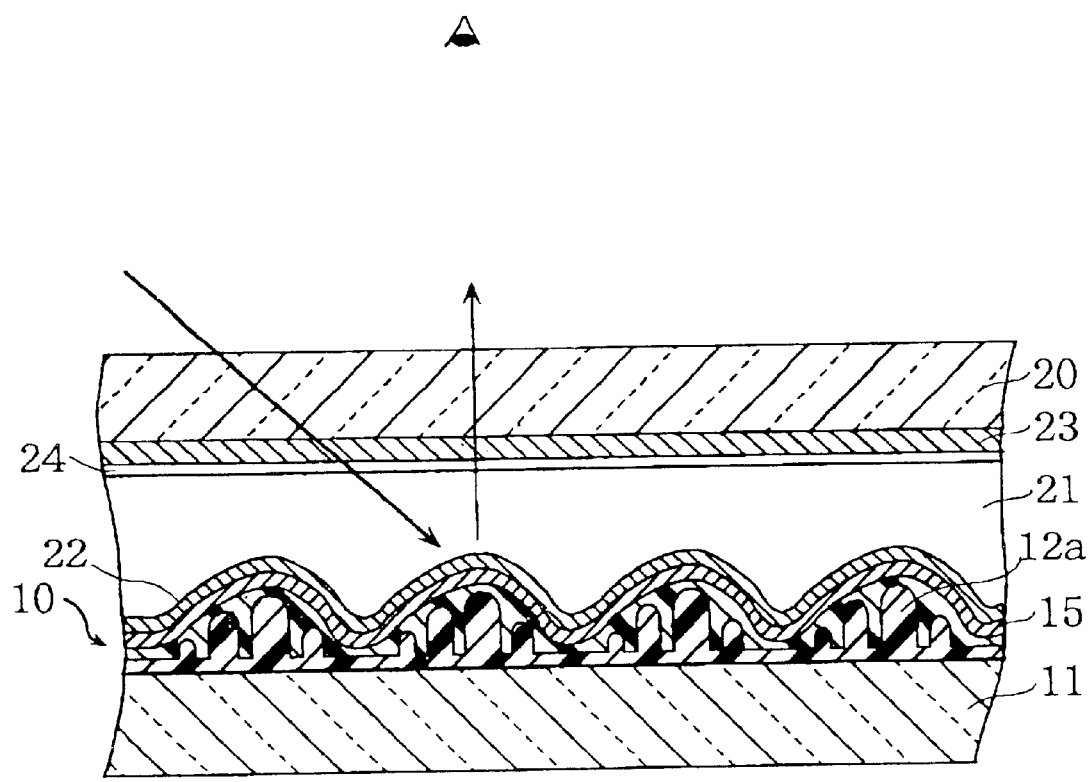
FIG. 8 is a cross-sectional view showing a structure of a reflective liquid crystal display device comprising the reflector according to EMBODIMENT 1.

By the foregoing process, the reflector 10 according to the present embodiment can be formed. A description will be given next to a reflective liquid crystal display device comprising the reflector 10 thus fabricated. FIG. 8 is a cross-sectional view of the reflective liquid crystal display device.

As shown in the drawing, the reflective liquid crystal display device has: the reflector 10; a counter substrate 20 (the display surface side); and a liquid crystal layer 21 held between the reflector 10 and the counter substrate 20. An alignment film 22 for orienting adjacent liquid crystal molecules in a specified direction is formed on the reflector 10. In this case, the light reflecting thin film 15 functions as a pixel electrode.

A transparent electrode 23 made of ITO (Indium Tin Oxide) is provided on the counter substrate 20. An alignment film 24 is further provided on the transparent electrode 23. The counter substrate 20 is composed of a light transmitting substrate.

The liquid crystal layer 21 is composed of a guest-host liquid crystal containing a black dichroic dye dissolved in a liquid crystal. The alignment films 22 and 24 are made of; e.g., a polyimide resin and have been oriented in opposite directions. Between the substrates, the liquid crystal molecules are aligned to twist by about 360 degrees.

As a result of examining the display condition on the reflective liquid crystal display device thus structured, anisotropy was observed in the range in which the reflected light was scattered. The display obtained had a particularly excellent paper-white property in a direction of visual recognition of the viewer, remarkable brightness, and superior contrast.

Although the present embodiment has described the case where the groups 12 of columnar portions are formed directly on the substrate 11, the photosensitive resin layer may also be formed preliminarily on the substrate 11. For example, the photosensitive resin layer may be formed prior to the formation of the photosensitive resin layer 16 composed of the low-$\gamma$ positive resist PC409 by coating the same material on the substrate 11 and performing a heat treatment with respect to the coated film. Alternatively, another photosensitive resin layer may also be formed of a material different from PC409. This varies the affinity between the substrate 11 and the photosensitive resin layer 16 and the heat treatment performed with respect to the resist columns 17 allows the heights of the columnar portions 13a to be controlled during the formation thereof.

Although the present embodiment has described the case where the groups 12 of columnar portions are formed on the substrate 11, there may also be used a depressed structure which can be formed by exposing the photosensitive resin layer 16 via a photomask having a circular or elliptical opening. From a different viewpoint, a structure which is a continuity of projecting and depressed structures in which a plurality of gaps at different depths are provided may also be used. In this case, the projecting portions mean the portions which are higher in level than the lowermost portion in the depressed structure. The depth of the structure can be controlled by varying the cumulative exposure dose.

EMBODIMENT 2

A reflector according to EMBODIMENT 2 is different from the reflector according to EMBODIMENT 1 in that it has staircase structures each formed unitarily in place of the groups of columnar portions each formed of the plurality of minute columnar portions.

Figure 9A:
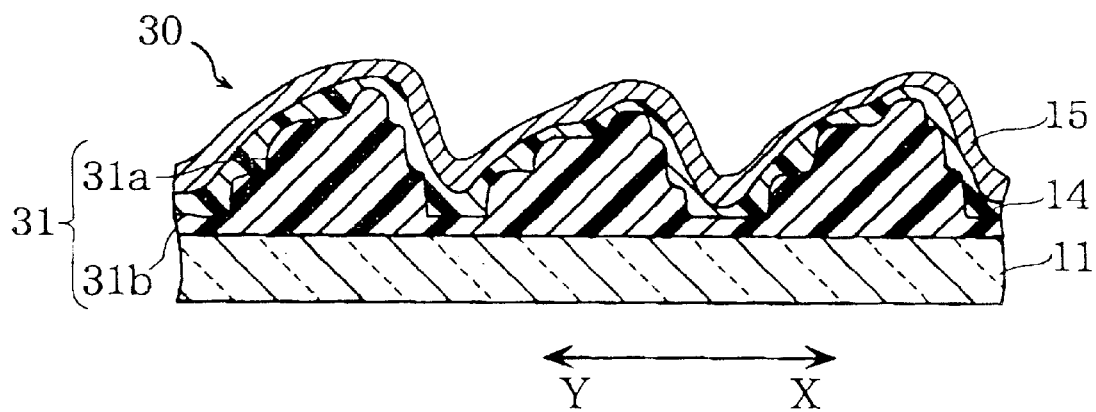
FIG. 9A is a cross-sectional view showing a structure of a reflector according to EMBODIMENT 2 of the present invention and FIG. 9B is a plan view showing a staircase structure in the reflector.
Figure 9B:
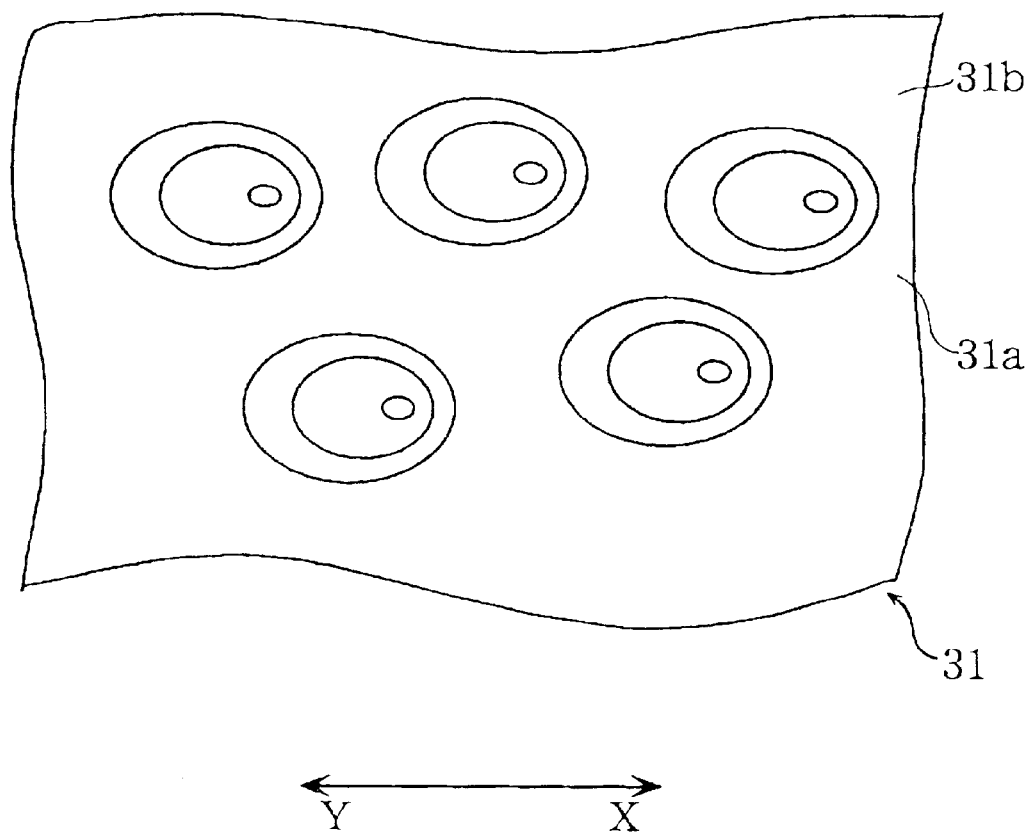

FIG. 9 illustrates a structure of the reflector according to the present embodiment. FIG. 9A shows a cross-sectional configuration of the reflector. FIG. 9B shows plan configurations of the staircase structures in the reflector. As shown in the drawings, a reflector 30 is composed of a plurality of staircase structures 31a; a polymer resin layer 14; and a light reflecting thin films 15, which are stacked successively on a substrate 11.

Each of the staircase structure 31a forms a basic unit for determining the reflective properties of the reflector 30 according to the present embodiment. As shown in FIG. 9B, the staircase structures 31a are positioned irregularly on the substrate 11 in parallel relation to each other. What results is a structure with reduced regularity in which the staircase structures 31a as the basic units are not observed repetitively with a given period. This suppresses interference of light which occurs due to the repetitive pattern of the staircase structures 31a and suppresses a phenomenon of, e.g., colored reflected light. The staircase structures 31a may also be contiguous to each other without having clearance therebetween in a portion or in a plurality of portions. If the clearance is excessively large, on the other hand, a flat surface parallel to a substrate surface is formed undesirably to increase reflected light in the regular reflection direction.

In cross section, each of the staircase structures 31a is configured as a staircase having a plurality of stepped portions. The height of the staircase structure 31a has a peak deviated in a direction indicated by the arrow X from the center portion thereof and tends to decrease with distance from the peak toward the periphery. By controlling the height of each of the stepped portions measured from the bottom portion of the staircase structure 31a, the height distribution of the staircase structure 31a can be varied finely. This enables precise control of the slope angle distribution of the light reflecting thin film 15 formed over the staircase structures 31a. The stepped portions and top portion of the staircase structure 31a have a roundly curved configuration. This imparts a more smoothly curved surface configuration to the light reflecting thin film 15 provided over the staircase structures 31a.

The peak height of the staircase structure 31a is preferably in the range of 1 $\mu$m to 5 $\mu$m. If the height is smaller than 1 $\mu$m, the level difference between the projecting and depressed portions at the surface of the light reflecting thin film 15 is reduced so that light reflected in the regular reflection direction is increased undesirably. If the height is larger than 5 $\mu$m, on the other hand, the nonuniformity of the cell gap is aggravated and uneven display is visually recognized, which degrades the display quality.

The peak heights of the individual staircase structures 31a may be equal to or different from each other.

Each of the staircase structures 31a has, e.g., an elliptical plan configuration. In the present invention, the plan configuration of the staircase structure 31a is not limited to an ellipse described above and may be a polygon.

The staircase structure 31a is composed of, e.g., a photosensitive resin, example of which are a positive resist, an electron beam resist, and the like. The present embodiment has used a low-$\gamma$ positive resist (under the trade name PC409, which is commercially available from JSR Corporation).

A residual film 31b is composed of the same material as composing the staircase structures 31a. The residual film 31b is a film undeveloped and left in forming the staircase structures 31a by the developing step in the photolithographic process.

The reflector 30 according to the present embodiment thus structured is disposed to have a curved surface with a low curvature facing upward such that it has a high reflectance in a wide range and reflecting and scattering properties including an excellent paper-white property.

A description will be given below to a method of fabricating the reflector 30 according to the present embodiment. FIGS. 10 are cross-sectional views illustrating the process of fabricating the reflector 30.

First, the low-$\gamma$ positive resist PC409 as the photosensitive resin material is coated by spin coating on the substrate 11, similarly to EMBODIMENT 1. The thickness of the coated film is adjusted to 3.6 $\mu$m. The substrate 11 having a coating of the photosensitive resist material is then pre-baked at 105° C. for 90 seconds such that a solvent in the coated film is evaporated, whereby a photosensitive resin layer 16 is formed (see FIG. 10A).

Figure 10A:
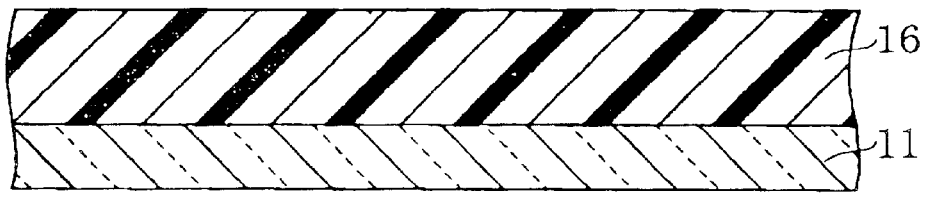
FIGS. 10A–10D are cross-sectional views illustrating a method of fabricating the reflector according to EMBODIMENT 2.
Figure 10B:
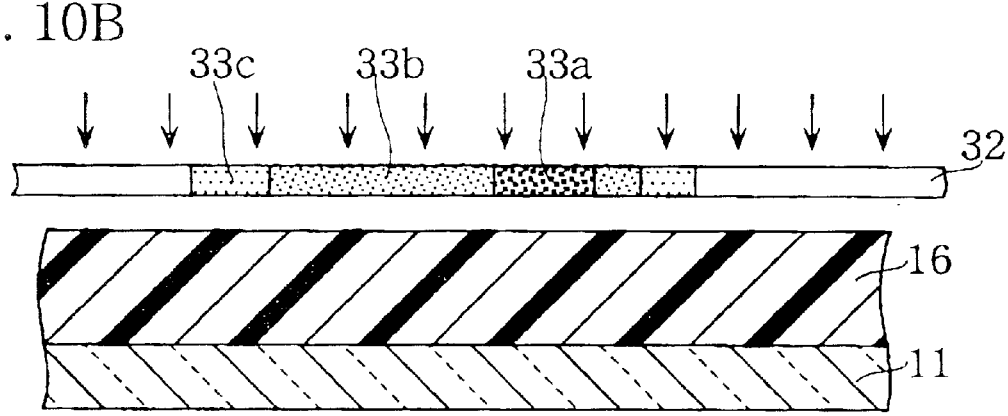
Figure 11:
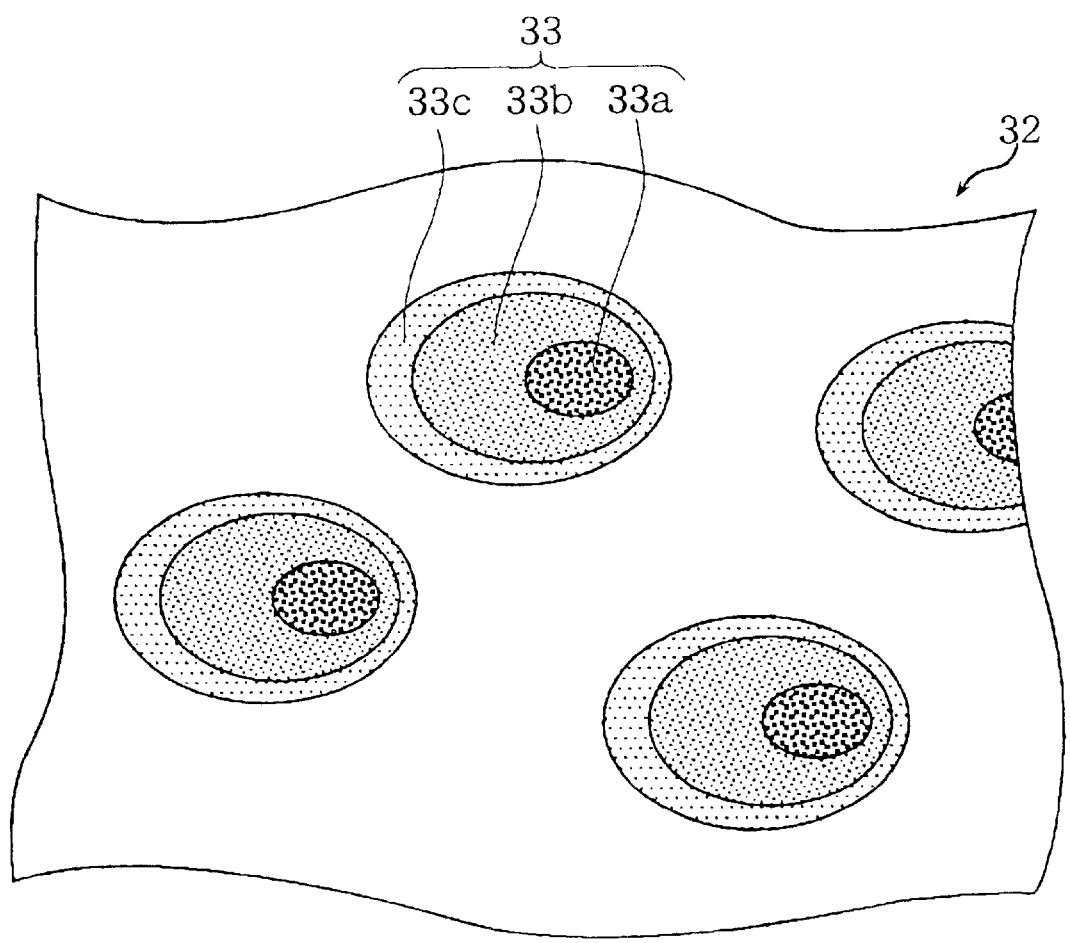
FIG. 11 is a plan view schematically showing a pattern configuration of a shielding portion of a photomask used in the process of fabricating the reflector.

Next, as shown in FIG. 10B, a photomask 32 is positioned above the photosensitive resin layer 16 such that the photosensitive resin layer 16 is exposed to UV light via the photomask 32 (exposing step). As shown in FIG. 11, the photomask 32 is formed to have different light shielding rates in the respective regions of each of light shielding portions 33. Specifically, the shielding rate is highest in the region 33a and decreases gradually in the regions 33b and 33c in this order. Since the respective regions have different light shielding rates, the regions of the photosensitive resin layer 16 corresponding to the respective regions 33a to 33c are exposed with different cumulative exposure doses even if they are irradiated with UV light at an equal intensity. As for pattern data for implementing the pattern configuration of the shielding portion composed of the regions 33a to 33c, it has been predetermined by simulation or the like.

Figure 10C:
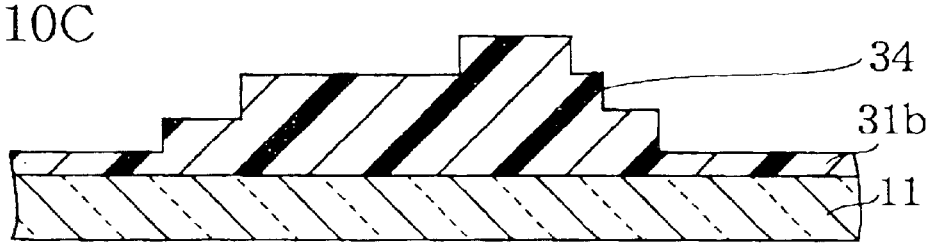

Subsequently, development is performed by using a developing solution, whereby an unwanted portion is removed (developing step). As a consequence, the residual film 31b and the resist columns 34 are formed on the substrate 11, as shown in FIG. 10C.

Figure 10D:
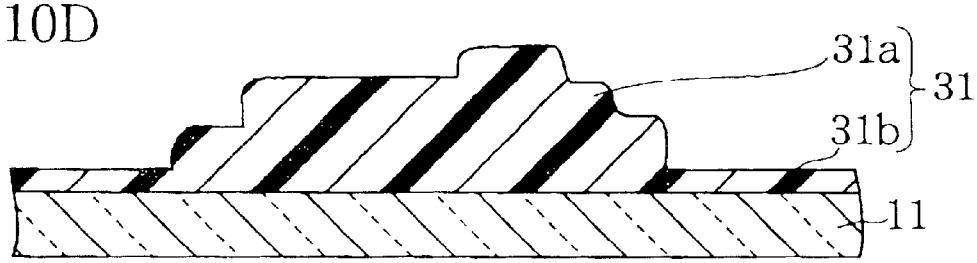

Next, a heat treatment is performed by heating the substrate 11 formed with the resist columns 34 or the like at a temperature of, e.g., 120° C. for 5 minutes (heat treatment step). As a consequence, the respective angular edges of the resist columns 34 are heat-melted to have smoothly curved configurations, as shown in FIG. 10D.

The heights of the stepped portions of the staircase structure 31a can be controlled by varying the light shielding rates in the photomask 32. The heights of the staircase structures 31a and the thickness of the remaining film 31b can be controlled by adjusting the thickness and material of the photosensitive resin layer 16, the cumulative exposure dose, the exposure time, and the development time. Specifically, a larger thickness increases the heights of the staircase structures 31a. The height of the staircase structure 31a can also be controlled by varying the exposure time since the cumulative exposure dose is varied thereby. For example, the cumulative exposure dose is increased by increasing the exposure time so that the residual film 31b is thinned. As a result, the heights of the staircase structures 31a can be increased. On the other hand, the heights of the staircase structures 31 can be reduced by increasing the development time.

Further, the low-γ positive resist PC409 as the photosensitive resin material is coated by spin coating over the staircase structure 31a and the residual film 31b. The coating may be performed under the same conditions as in EMBODIMENT 1.

Next, the coated film is cured by, e.g., applying heat at a specified temperature for a given time by the same step as performed in EMBODIMENT 1, thereby forming the polymer resin layer 14. Further, aluminum is vapor-deposited on the polymer resin layer 14, whereby the light reflecting thin film 15 is formed (light-reflecting-thin-film forming step).

By the foregoing process, the reflector 30 according to the present embodiment can be formed.

The staircase structures 31a may also be formed by performing a plurality of exposing steps in another method of fabricating the reflector 30 according to the present embodiment, which will be described in greater detail as follows. FIGS. 12 are cross-sectional views illustrating another process of fabricating the reflector 30.

Figure 12A:
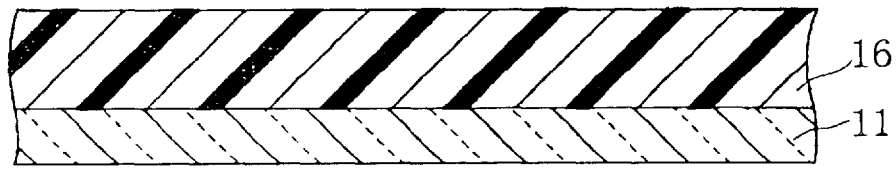
FIGS. 12A–12F are cross-sectional views illustrating another method of fabricating the reflector according to EMBODIMENT 2.

First, similarly to the process mentioned above, the low-γ positive resist PC409 as the photosensitive resin material is coated on the substrate 11 (coating step), which is then pre-baked at a specified temperature for a given time to form the photosensitive resin layer 16 (see FIG. 12A).

Figure 12B:
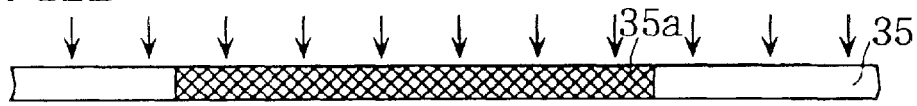
Figure 13A:
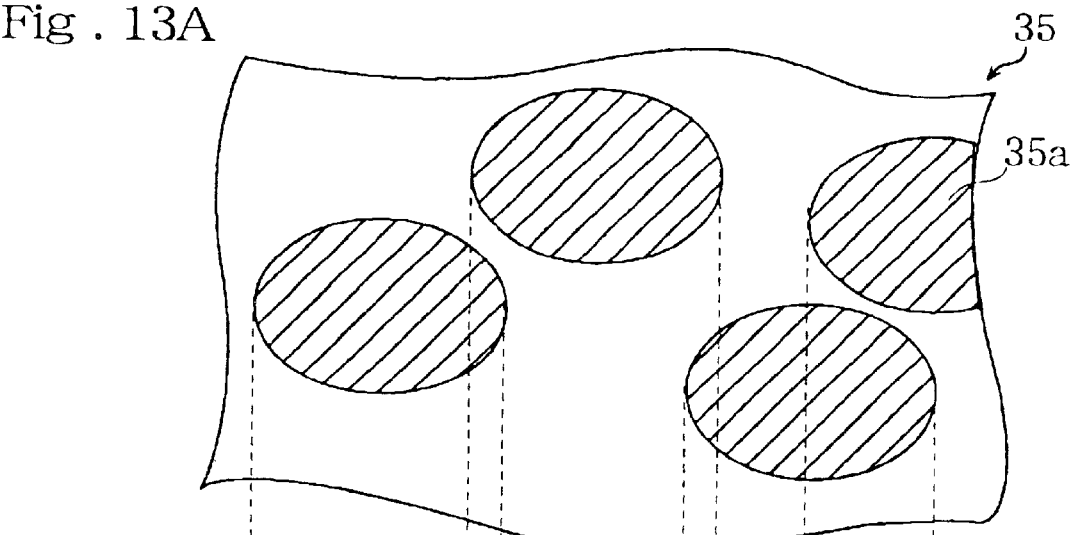
FIG. 13A shows the photomask used in a first exposing step.

Next, as shown in FIG. 12B, a first photomask 35 is positioned above the photosensitive resin layer 16 so that the photosensitive resin layer 16 is exposed to UV light via the first photomask 35 (first exposing step). The first photomask 35 is formed such that elliptical first light shielding portions 35a are in a specified pattern, as shown in FIG. 13A.

Figure 12C:
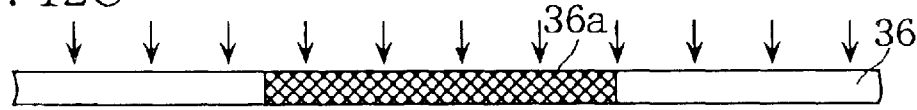
Figure 13B:
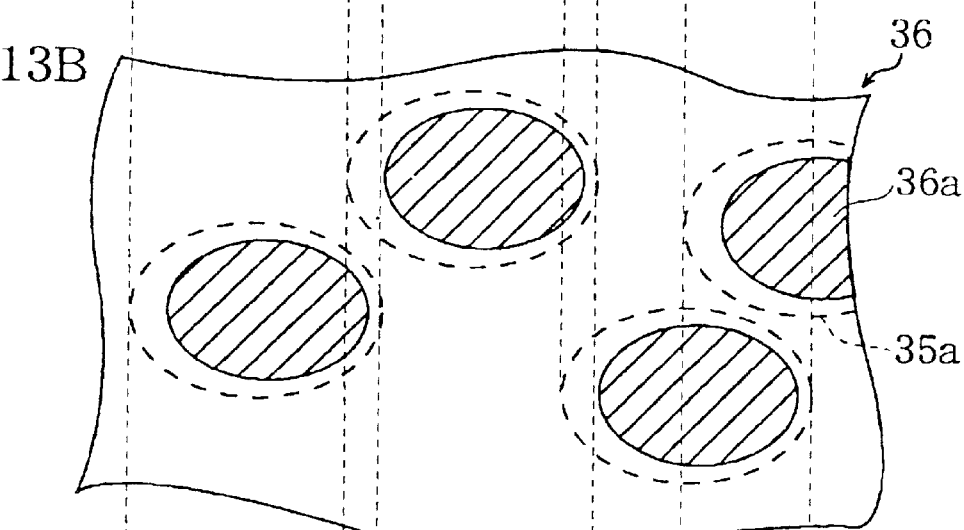
FIG. 13B shows the photomask used in a second exposing step.

Further, as shown in FIG. 12C, a second photomask 36 is positioned above the photosensitive resin layer 16 so that the photosensitive resin layer 16 is exposed to UV light in the same manner as described above (second exposing step). The second photomask 36 is formed such that elliptical second light shielding portions 36a are located within the respective light shielding ranges of the first shielding portions 35a, as shown in FIG. 13B.

Figure 12D:
Figure 13C:
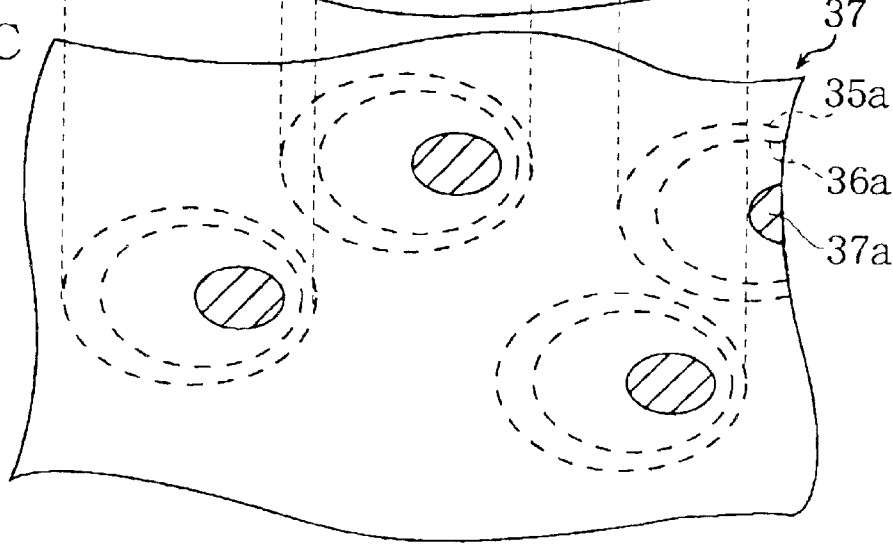
FIG. 13C shows the photomask used in a third exposing step.

Subsequently, as shown in FIG. 12D, a third photomask 37 is positioned above the photosensitive resin layer 16 such that the photosensitive resin layer 16 is exposed to UV light in the same manner as described above (third exposing step). The third photomask 37 is formed such that elliptical third shielding portions 37a are located within the respective light shielding ranges of the second shielding portions 36a, as shown in FIG. 13C.

As stated previously, the first to third exposing steps provide different cumulative exposure doses in the specified regions of the photosensitive resin layer 16. In positioning the first to third photomasks 35 to 37 above the substrate 11, the two-dimensional positions of the first to third photomasks 35 to 37 relative to the substrate 11 are determined with accuracy in a specified range. As for pattern data for implementing the pattern configuration of the first to third light shielding portions 35a to 37a, it has been predetermined by simulation or the like.

Figure 12E:
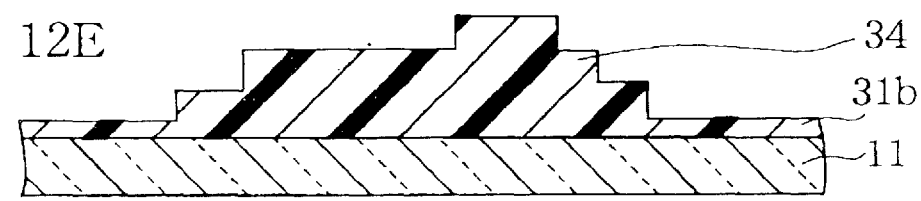

Subsequently, development is performed by using a developing solution, whereby an unwanted portion is removed (developing step). The development was performed under the same conditions as described above. As a consequence, the residual film 31b and staircase resist columns 34 are formed on the substrate 11, as shown in FIG. 12E. The formation of the stepped portions in the resist columns 34 is attributable to the different cumulative exposure doses achieved in the respective regions by the first to third exposing steps. The heights of the resist columns 34 and the thickness of the residual film 31b can be controlled by adjusting the thickness and material of the photosensitive resin layer 16, the cumulative exposure dose, the exposure time, and the development time, similarly to the foregoing method.

Figure 12F:
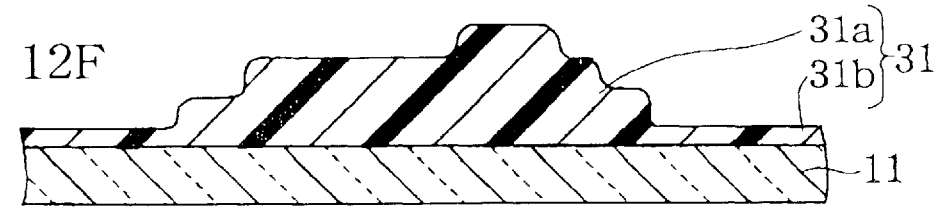

Next, a heat treatment is performed by heating the substrate 11 formed with the resist columns 34 and the like at a temperature of, e.g., 120° C. for 5 minutes (heat treatment step). As a consequence, the respective angular edges of the resist columns 34 are heat-melted to have smoothly curved configurations, as shown in FIG. 12F, whereby the staircase structures 31a are formed.

Further, the low-γ positive resist PC409 is coated by spin coating over the staircase structures 31a and the residual film 31b in the same manner as described above and the coated film is cured with the application of heat, thereby forming the polymer resin layer 14. Subsequently, aluminum is vapor-deposited on the polymer resin layer 14, whereby the light reflecting thin film 15 is formed.

By the foregoing process, the reflector 30 according to the present embodiment can be formed.

EMBODIMENT 3

The present embodiment fabricates a reflector comprising projecting and depressed structures each having an asymmetric cross-sectional configuration in accordance with a deep UV method. FIGS. 14 are cross-sectional views illustrating the fabrication method.

Figure 14A:
FIGS. 14A–14F are cross-sectional views illustrating a method of fabricating a reflector according to EMBODIMENT 3 of the present invention.
Figure 14B:
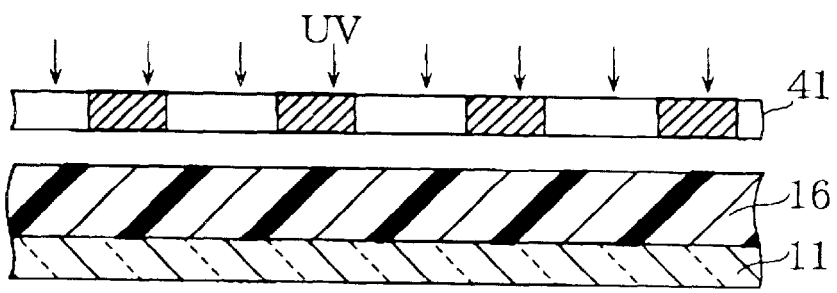
Figure 15A:
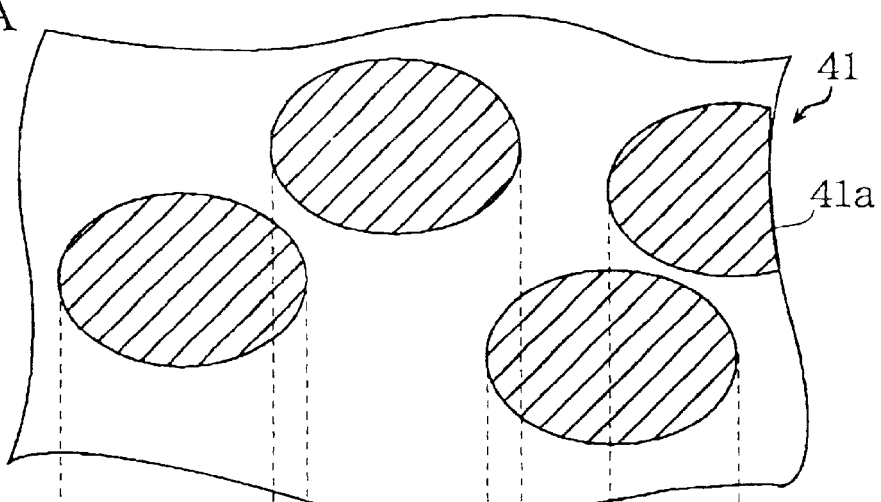
FIG. 15A shows the photomask used in an exposing step and FIG. 15B shows the photomask used in a deep UV irradiating step.

As shown in FIG. 14A, a photosensitive resin material is coated on a substrate 11 by spin coating. The thickness of the coated film is adjusted to 3.6 µm. The substrate 11 having a coating of the photosensitive resist material is then pre-baked at 105° C. for 90 seconds such that a solvent in the coated film is evaporated, whereby a photosensitive resin layer 16 is formed. Further, as shown in FIG. 14B, a photomask 41 is positioned above the photosensitive resin layer 16 such that the photosensitive resin layer 16 is exposed to UV light via the photomask 41 (exposing step). As shown in FIG. 15A, the photomask 41 has a plurality of elliptical light shielding portions 41a which are equal-sized and formed irregularly.

Figure 14C:

Subsequently, development is performed by using a developing solution, whereby an unwanted portion is removed (developing step). As a consequence, resist columns 42 each having an elliptical plan configuration are formed on the substrate 11, as shown in FIG. 14C.

Figure 14D:
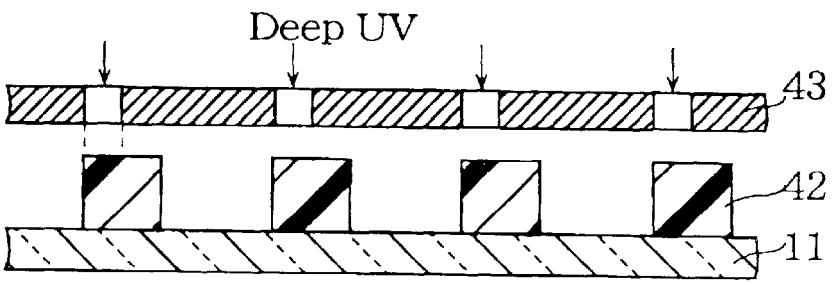
Figure 15B:
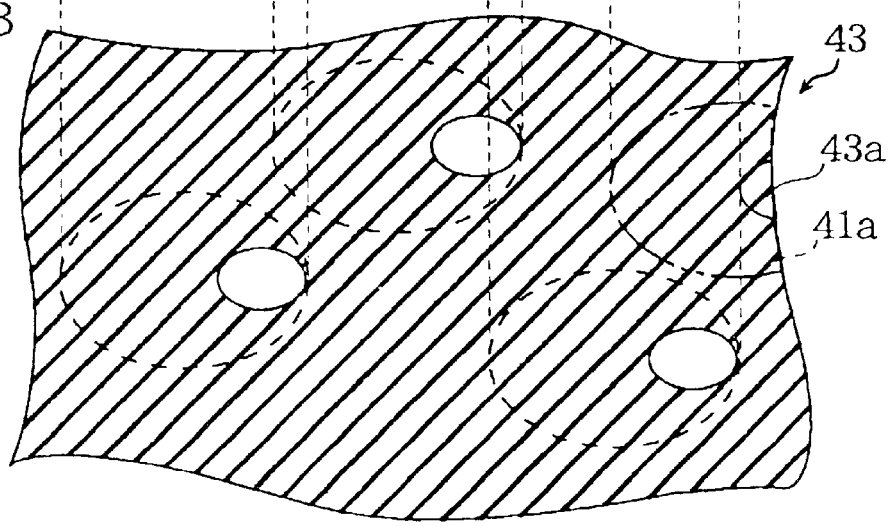

Next, as shown in FIG. 14D, a photomask 43 is positioned above the substrate 11 provided with the resist columns 42 and the substrate 11 is irradiated with UV (deep UV) light at a shorter wavelength (in the range of 250 nm to 365 nm (i-line)) via the photomask 43 (irradiating step). As a consequence, cross-linking further proceeds in the portions of the resist columns 42 irradiated with deep UV so that they are cured to a higher degree than the other portions. As shown in FIG. 15B, the photomask 43 has a plurality of elliptical openings 43a which are equal-sized and formed irregularly. The opening 43a and the light shielding portion 41a are geometrically similar to each other and have a dimensional ordering relationship therebetween such that the long axis of the opening 43a corresponds to half the long axis of the light shielding portion 41a. The two-dimensional position of the substrate 11 relative to the position of the photomask 43 have been determined such that one end on the long axis of the shielding portion 41 coincides with one end on the long axis of the opening portion 43a. In the irradiating step, an electron beam at a shorter wavelength may also be used for irradiation instead of the UV light at a shorter wavelength.

Figure 14E:
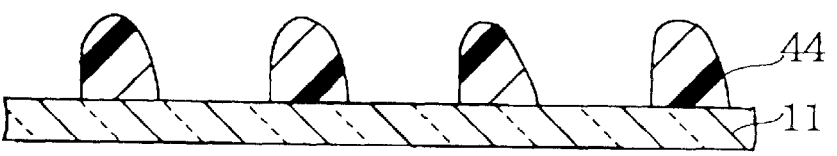
Figure 14F:
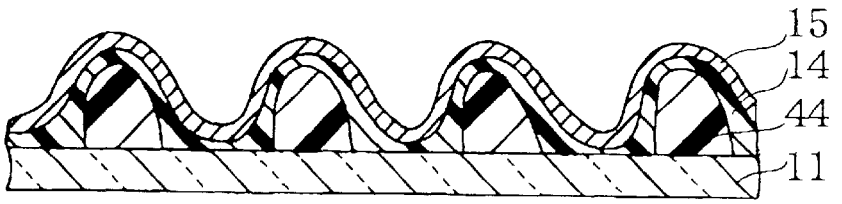

Next, a heat treatment is performed by heating the substrate 11 formed with the resist columns 42 at a temperature of, e.g., 120° C. for 5 minutes (heat treatment step). As a consequence, projecting portions 44 composing the projecting and depressed structures each having an asymmetric cross-sectional configuration are formed, as shown in FIG. 14E. In this case, since the portions irradiated with the deep UV have been cured to a higher degree than the other portions, as described above, the irradiated portions undergo a lower degree of thermal deformation so that the edge portions of the irradiated portions are slightly rounded. By contrast, the regions unirradiated with deep UV undergo a higher degree of thermal deformation so that inclined surfaces having smoothly curved configurations are formed.

Subsequently, the reaction of an unreacted substance contained in the projecting portions 44 is completed and a post-baking step is performed to suppress the production of an impurity or a contaminant in the step of forming the light reflecting thin film 15, which will be described later. Further, a photosensitive resin material is coated over the projecting portions 44 and the substrate 11 by spin coating and the coated film is cured with the application of heat, thereby forming a polymer resin layer 14. Subsequently, aluminum is vapor-deposited on the polymer resin layer 14 to form the light reflecting thin film 15, whereby the reflector according to the present embodiment is formed.

Thus, the method of fabricating the reflector according to the present embodiment allows easy formation of the projecting portions composing the projecting and depressed structures each having an asymmetric cross-sectional configuration.

For reference purposes, there may also be considered a method in which the projecting and depressed structures each having an asymmetric cross-sectional configuration are formed by performing a heat treatment with respect to the substrate which is held inclined to cause a heat sag, instead of irradiating the substrate with deep UV. In such a method, however, it is difficult to properly cause the heat sag for a desired slope angle so that the method has a room for improvement in terms of controllability. By contrast, if the exposure dose and the like are set properly for irradiation with deep UV in the method of fabricating the reflector according to the present embodiment, the projecting and depressed structures each having an asymmetric cross-sectional configuration and a desired slope angle can be formed easily with excellent controllability.

In accordance with the method of fabricating the reflector according to the present embodiment, it is also possible to improve controllability over the slope angle distribution by performing a plurality of irradiating steps using UV light at a shorter wavelength or an electron beam at a shorter wavelength and varying the exposure dose in each of the irradiating steps.

In the present embodiment, it is also possible to perform a deep UV irradiating step for further curing the projecting portions 44 after the heat treatment step. Specifically, the projecting portions 44 are irradiated with UV light at a shorter wavelength (in the range of 250 nm to 365 nm (i-line)) or an electron beam at a shorter wavelength by using a mask having openings corresponding to the projecting portions 44. As a result, cross-linking further proceeds in the portions irradiated with UV light or the like so that the degree of cure is increased. Even if a post-baking step for heating the projecting portions 44 is performed, therefore, the thermal deformation of the projecting portions 44 is prevented and the controlled slope angle distribution is retained.

EMBODIMENT 4

Figure 16:
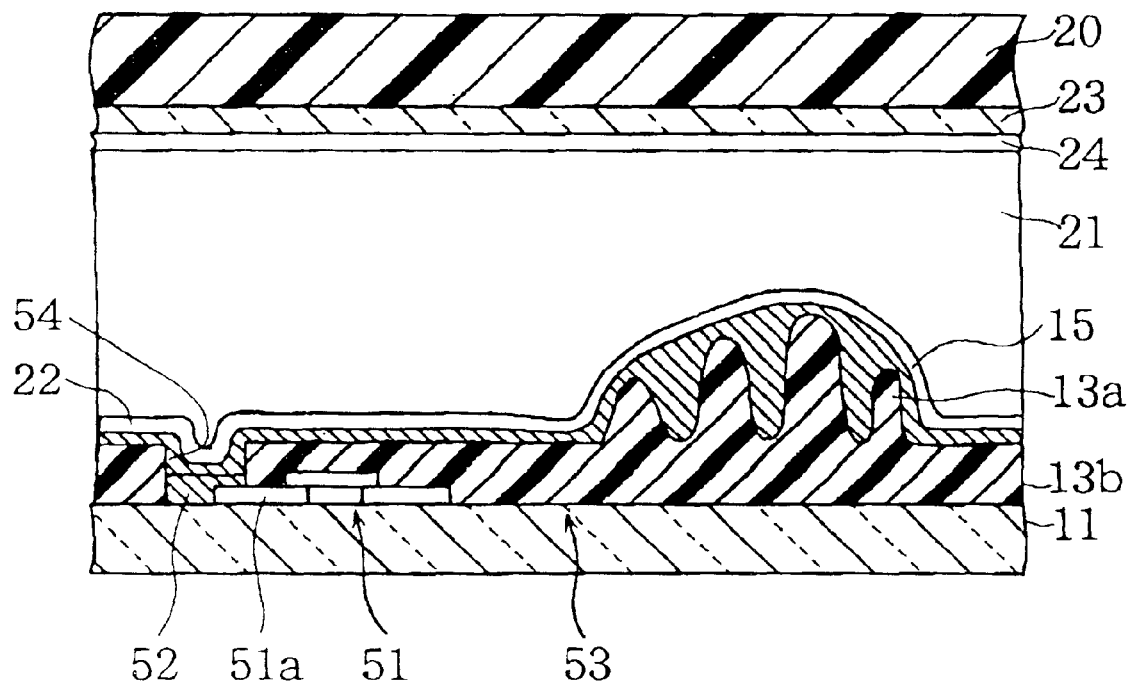
FIG. 16 is a cross-sectional view showing a structure of a reflective liquid crystal display device according to EMBODIMENT 4 of the present invention.

A reflective liquid crystal display device according to EMBODIMENT 4 is structurally different from the liquid crystal display device according to EMBODIMENT 1 in that a switching element (nonlinear element) is provided on the reflector side and a light reflecting thin film is formed on the bottom portion of a contact hole for providing an electrical connection between the switching element and the light reflecting thin film. Referring to FIG. 16, a detailed description will be given to specific components. FIG. 16 is a cross-sectional view schematically showing a principal portion of the reflector in the liquid crystal display device.

As shown in the drawing, the liquid crystal display device has: a substrate 11; a counter substrate 20 (display surface side); and a liquid crystal layer 21 held between the substrate 11 and the counter substrate 20.

On the substrate 11, a thin-film transistor (hereinafter referred to as TFT) 51 as the switching element, a source line (not shown), a gate line (not shown), and the like are formed. A metal film (light reflecting film) 52 and a photosensitive resin layer 53 are formed thereover. A light reflecting thin film 15 is further formed over the photosensitive resin layer 53 and the metal film 52. An alignment film 22 is provided on the light reflecting thin film 15. The light reflecting thin film 15 is electrically connected to a drain electrode 51a via a contact hole 54 provided in the photosensitive resin layer 53 and the metal film 52.

On the TFT 51, the photosensitive resin layer 53 functions as a planarizing film for planarizing a rough configuration resulting from the provision of the TFT 51 and also functions as a protective film. In the region other than the portion formed with the TFT 51, plural groups 12 of columnar portions are provided to function as a part of the reflector. It will easily be appreciated that each of the groups 12 of columnar portions is composed of a plurality of minute columnar portions 13a which are collectively placed, as described in EMBODIMENT 1. Although the TFT 51 and the photosensitive resin layer 53 have been described separately for convenience, the photosensitive resin layer 53 usually composes the TFT 51.

The light reflecting thin film 15 functions as a part of the reflector, while functioning as a pixel electrode in the region provided with the groups 12 of columnar portions.

The metal film 52 has a light reflecting property and is made of Al, Ag, Cr, Ni, or an alloy thereof (e.g., an Ag—Cu alloy or the like).

A description will be given below to a method of fabricating the liquid crystal display device according to the present embodiment. FIGS. 17 are cross-sectional views illustrating the process of fabricating the reflector associated with the liquid crystal display device.

Figure 17A:
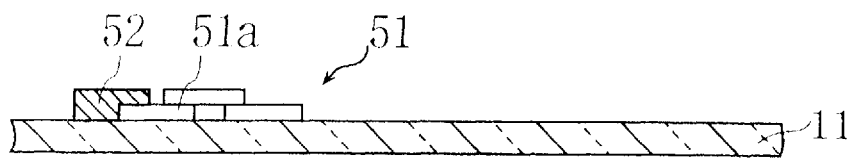
FIGS. 17A–17F are cross-sectional views illustrating a method of fabricating a reflector in the reflective liquid crystal display device.
Figure 17B:

First, the TFT 51, a metal interconnect, and the like are formed on the substrate 11 by a conventionally known method. Then, as shown in FIG. 17A, the metal film 52 is formed to have at least one part thereof overlapping the drain electrode 51a of the TFT 51 by a conventionally known method.

Next, a photosensitive resin material is coated on the substrate 11 by spin coating (coating step) and the substrate 11 having a coating of the photosensitive resist material is then pre-baked at 105° C. for 90 seconds such that a solvent in the coated film is evaporated, whereby the photosensitive resin layer 16 is formed (see FIG. 17B), similarly to EMBODIMENT 1.

Figure 17C:
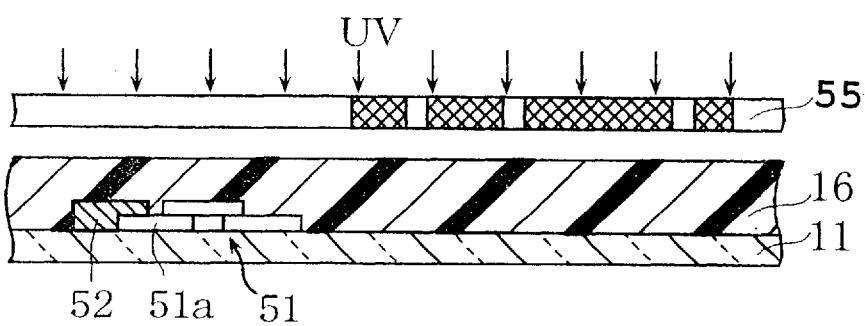

Next, as shown in FIG. 17C, a photomask 55 is positioned above the photosensitive resin layer 16 and the photosensitive resin layer 16 is exposed to UV light via the photomask 55 (exposing step). In the case where a residual film 13b is to be formed, a region in which a contact hole is to be formed should be formed at a position deeper than the residual film 13b. Therefore, the cumulative exposure dose should be higher at the position at which the contact hole is to be formed than in the other region. Since the radiated UV light is reflected by the metal film 52 in the vicinity of the metal film 52, the cumulative exposure dose is higher than in the other exposed region. The photomask 55 has circular or elliptical light shielding portions which are formed to occupy specified areas. The photomask 55 also has an opening for forming the contact hole 54 which is formed in a region of the photosensitive resin layer 16 corresponding to the metal film 52.

Figure 17D:
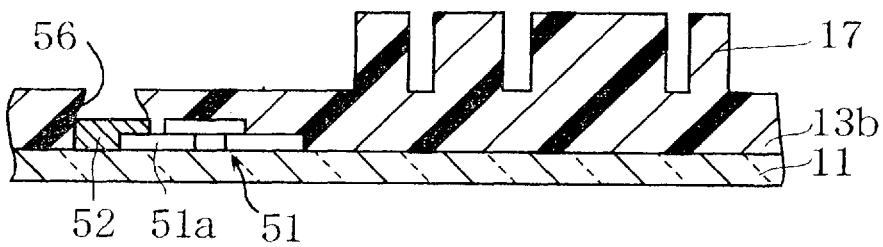

Subsequently, development is performed by using, as a developing solution, an aqueous solution containing 0.4% of NMD-3™ (commercially available from Thkyo Ohka Kogyo Co., Ltd.) and an unwanted portion is dissolved away (developing step). By the step, resist columns 17 and the residual film 13b are formed on the substrate 11, while a cavity portion 56 is formed therein, as shown in FIG. 17D.

The cavity portion 56 has a trapezoidal cross section which diverges with approach toward the bottom portion thereof In other words, the size of the void portion 56 increases gradually with approach toward the bottom portion thereof, compared with the size of the light shielding portion, though the configuration and size of the opening portion of the cavity portion 56 correspond to those of the photomask 55. This is because the cumulative exposure dose is increased in the vicinity of the metal film 52 due to the reflection of the UV light by the metal film 52, so that optical decomposition occurs in a wider range, as mentioned above in the description of the exposing step.

Figure 17E:
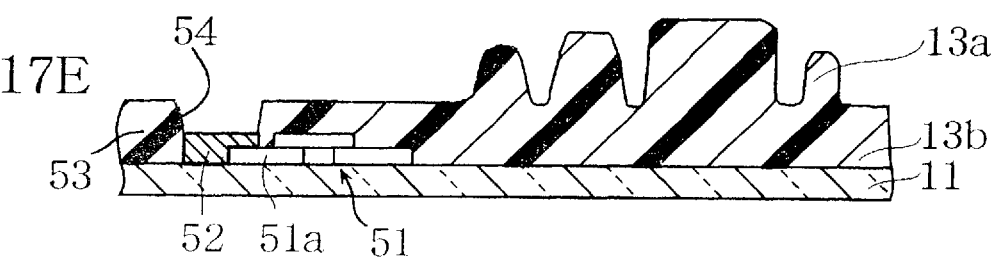

Next, a heat treatment is performed by heating the substrate 11 formed with the resist columns 17 and the like at 120° C. for 5 minutes, thereby forming the photosensitive resin layer 53, as shown in FIG. 17E. More specifically, the groups 12 of columnar portions composed of the plurality of columnar portions 13a are provided in the region other than the portion formed with the TFT 51. In the cavity portion 56 also, the opening portion and inner wall surface thereof are melted and thermally deformed but the bottom portion thereof is prevented from being clogged since the cavity portion 56 is formed inherently to have a trapezoidal cross section. What results is the contact hole 54 having a generally rectangular cross section and a sufficient diameter to provide an electric connection between the TFT 51 and the light reflecting thin film 15. This suppresses a faulty operation and an increase in contact resistance.

Further, the reaction of an unreacted substance contained in the photosensitive resin layer 53 is completed and a post-baking step is performed to suppress the production of an impurity and a contaminant under constant pressure in the step of forming the light reflecting thin film 15 or in the step of injecting a liquid crystal. The processing temperature, time, and the like in the step are set appropriately as required.

Figure 17F:
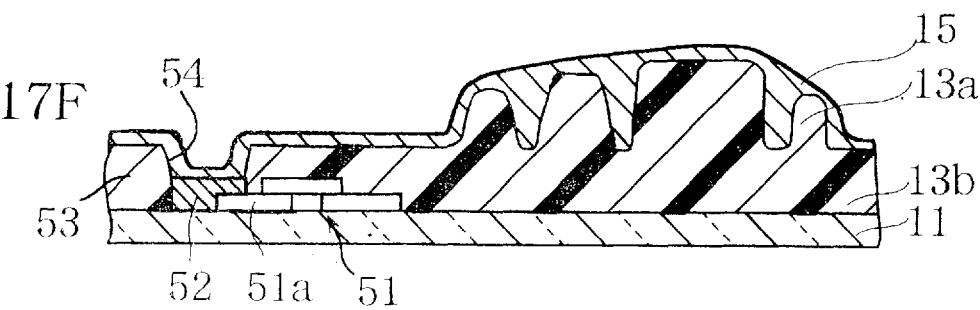

Next, as shown in FIG. 17F, aluminum is vapor-deposited on the photosensitive resin layer 53 to form the light reflecting thin film 15 (light-reflecting-thin-film forming step).

Next, a polyimide resin is coated on the light reflecting thin film 15 and a rubbing process is performed with respect thereto, thereby forming the alignment film 22. On the other hand, a transparent electrode 23 is formed on the counter substrate 20 by a conventionally known method and the alignment film 24 is formed on the transparent electrode 23 in the same manner as described above. Subsequently, the substrate 11 and the counter substrate 20 are bonded to each other and a guest-host liquid crystal composed of a chiral nematic liquid crystal containing a black dichroic dye dissolved therein is injected from a liquid crystal injection port to form the liquid crystal layer 21. By the foregoing process, the reflective liquid crystal display device according to the present embodiment can be fabricated.

Thus, since the method of fabricating the reflective liquid crystal display device according to the present embodiment can suppress an increase in the contact resistance between the light reflecting thin film 15 and the TFT 51, there can be fabricated a reflective liquid crystal display device having a particularly high display quality in a motion picture display.

In the present embodiment, a deep UV irradiating step for further advancing the curing of a surrounding portion of the inner wall surface of the contact hole 54 may also be performed after the heat treatment step. Specifically, the contact hole 54 is irradiated with UV light at a shorter wavelength (in the range of 200 to 400 nm) via a mask having an opening corresponding to the contact hole 54. As a result, cross-linking further proceeds to increase the degree of cure in the portions irradiated with the UV light. If the post-baking steps for heating the photosensitive resin layer 53 is performed, therefore, the thermal deformation of the contact hole 54 is prevented and a more satisfactory electric connection is provided between the TFT 51 and the light reflecting thin film 15.

EMBODIMENT 5

Figure 18:
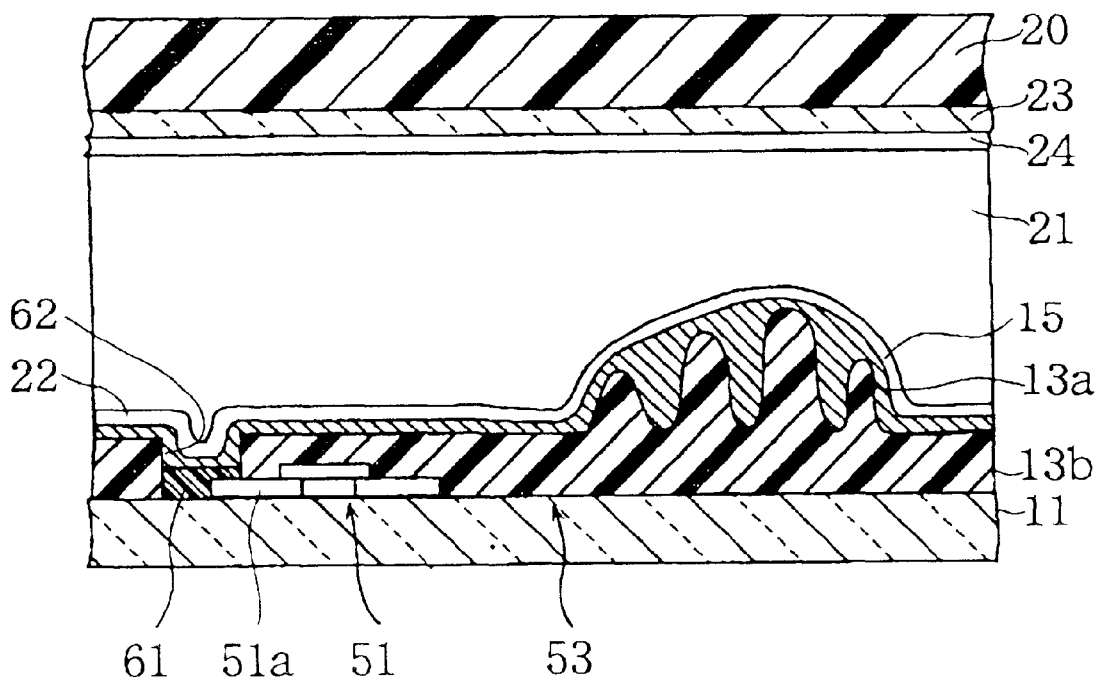
FIG. 18 is a cross-sectional view showing a structure of a reflective liquid crystal display device according to EMBODIMENT 5 of the present invention.

As shown in FIG. 18, a liquid crystal display device according to EMBODIMENT 5 is structurally different from the reflective liquid crystal display device according to EMBODIMENT 4 in that a thin film having a surface energy higher than that of the photosensitive resin in the photosensitive resin layer 53 (hereinafter referred to as a thin film) 61 is used in place of the metal film.

Figure 19A:
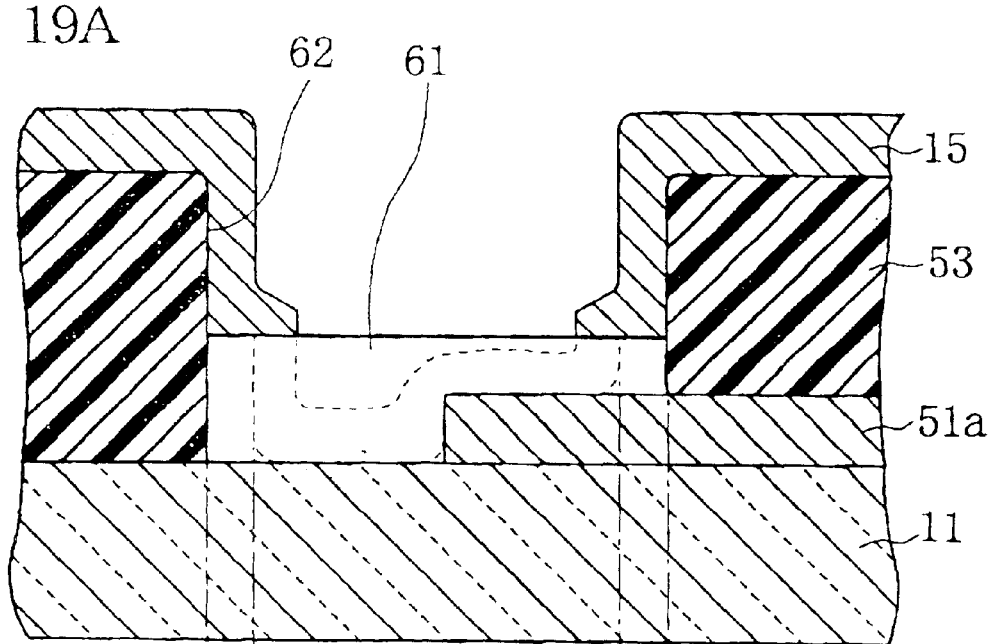
FIG. 19A is a cross-sectional view illustrating a principal portion of a reflector in the reflective liquid crystal display device and FIG. 19B is a plan view showing a thin film and a pixel electrode in the reflector.
Figure 19B:
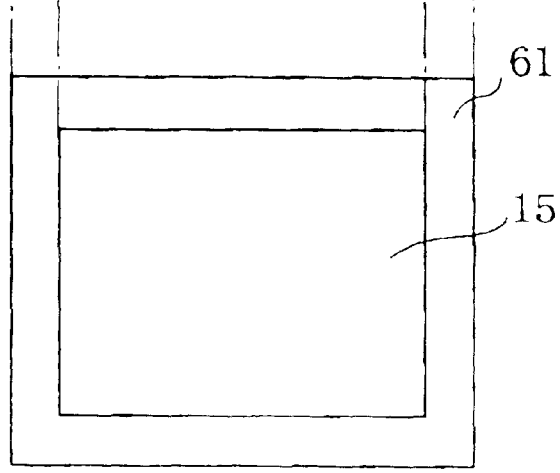

As shown in FIG. 19, the thin film 61 is configured as a rectangular frame in plan view and has a surface energy higher than that of the photosensitive resin layer 53. The thin film 61 is configured as the rectangular frame such that a cavity formed in a center portion thereof provides an electric connection between the light reflecting thin film 15 and the drain electrode 51a. Accordingly, the plan configuration of the thin film 61 is not limited to the rectangular frame and may be a circle or an ellipse. The reason that the thin film 61 has a surface energy higher than that of the photosensitive resin layer 53 will be described later.

As an example of the material of the thin film 61, a polymer resin having a functional group containing a fluorine atom may be listed.

A description will be given below to a method of fabricating the liquid crystal device according to the present embodiment. FIGS. 20 are cross-sectional views illustrating the process of fabricating a reflector associated with the liquid crystal display device.

Figure 20A:
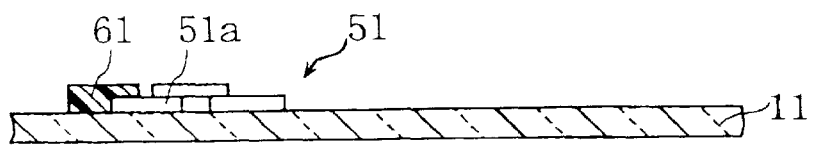
FIGS. 20A–20F are cross-sectional views illustrating a method of fabricating the reflector.
Figure 20B:
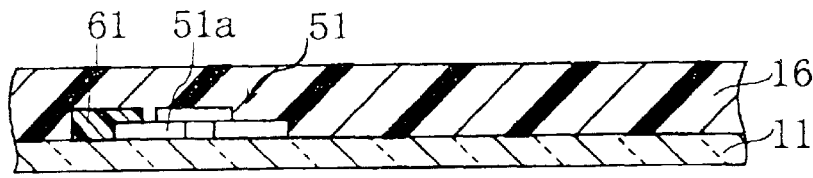

First, a TFT 51, a metal interconnect, and the like are formed on a substrate 11 by a conventionally known method. Then, as shown in FIG. 20A, the thin film configured as a rectangular frame is formed to have at least one part thereof overlapping a drain electrode 51a of the TFT 51.

Next, a photosensitive resin material is coated on the substrate 11 by spin coating (coating step) and the substrate 11 having a coating of the photosensitive resist material is then pre-baked at 105° C. for 90 seconds such that a solvent in the coated film is evaporated, whereby the photosensitive resin layer 16 is formed (see FIG. 20B), similarly to EMBODIMENT 1.

Figure 20C:
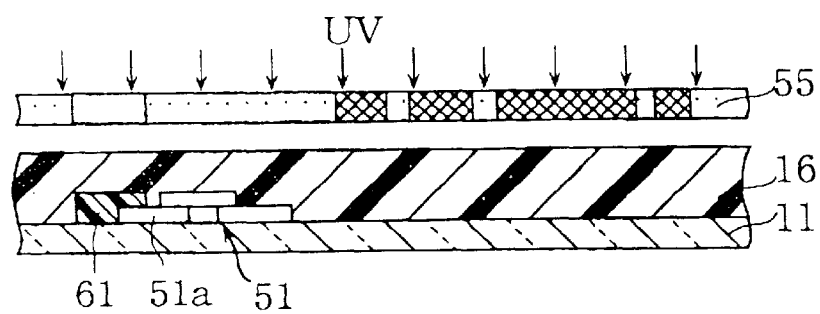

Next, as shown in FIG. 20C, a photomask 55 is positioned above the photosensitive resin layer 16 and the photosensitive resin layer 16 is exposed to UV light via the photomask 55 (exposing step).

Figure 20D:
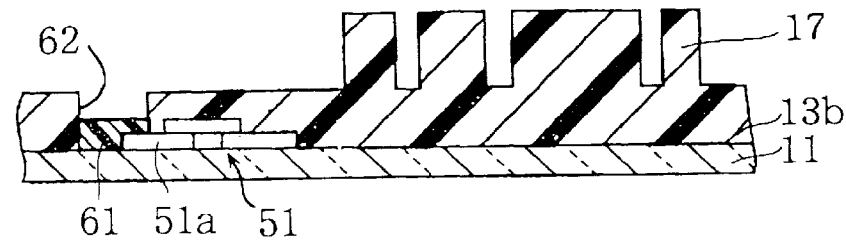

Subsequently, development is performed by using, as a developing solution, an aqueous solution containing 0.4% of NMD-3™ (commercially available from Tokyo Ohka Kogyo Co., Ltd.) (developing step). By the step, resist columns 17 and the residual film 13b are formed on the substrate 11, while a contact hole 62 is formed therein, as shown in FIG. 20D.

Figure 20E:
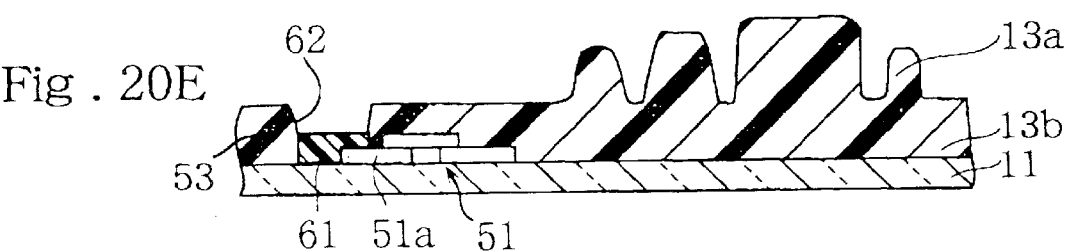

Next, a heat treatment is performed by heating the substrate 11 formed with the resist columns 17 and the like at 120° C. for 5 minutes (heat treatment step), thereby forming the photosensitive resin layer 53, as shown in FIG. 20E. During the heat treatment, the inner walls of the contact hole 62 are also thermally deformed and tend to clog the contact hole 62. However, since the thin film 61 has a surface energy higher than that of the photosensitive resin material, the inner walls are prevented from flowing over to the thin film 61. This suppresses the clogging of the contact hole 62 and a reduction in the opening portion of the contact hole 62 and allows the formation of the contact hole 62 having a sufficient diameter to provide an electric connection between the TFT 51 and the light reflecting thin film 15. As a result, an increase in the contact resistance between the light reflecting thin film 15 and the TFT 51 is suppressed.

Figure 20F:
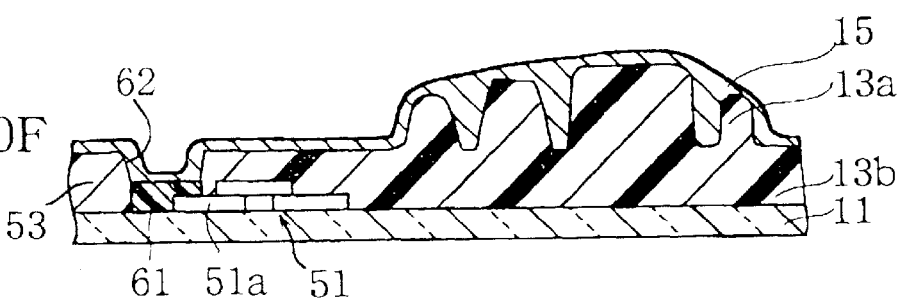

Next, as shown in FIG. 20F, a post-baking step is performed and aluminum is vapor-deposited on the photosensitive resin layer 53, whereby the light reflecting thin film 15 is formed (Light-reflecting-thin-film forming step).

Next, an alignment film 22 is formed on the light reflecting thin film 15, similarly to EMBODIMENT 4. On the other hand, a transparent electrode 23 is formed on a counter substrate 20 by a conventionally known method and an alignment film 24 is formed on the transparent electrode 23 in the same manner as described above. Subsequently, the substrate 11 and the counter substrate 20 are bonded to each other and a liquid crystal material or the like is injected from a liquid crystal injection port to form a liquid crystal layer 20. By the foregoing process, the reflective liquid crystal display device according to the present embodiment can be fabricated.

Thus, since the method of fabricating the reflective liquid crystal display device according to the present embodiment can suppress an increase in the contact resistance between the light reflecting thin film 15 and the TFT 51, there can be fabricated a reflective liquid crystal display device having a particularly high display quality in a motion picture display.

In the present embodiment, a deep UV irradiating step for further advancing the curing of the surrounding portion of the inner wall surface of the contact hole 54 may also be performed after the heat treatment step, similarly to EMBODIMENT 4. If the post-baking step for heating the photosensitive resin layer 53 is performed, therefore, the thermal deformation of the contact hole 54 is prevented and a more satisfactory electric connection is provided between the TFT 51 and the light reflecting thin film 15.

Although the present embodiment has described the case where the thin film 61 has a frame-like configuration, it is possible to prevent the thermal deformation of the contact hole and provide an electric connection between the drain electrode 51a and the light reflecting thin film 15 even if a normal thin film which does not have a frame-like configuration is used. Specifically, after the photosensitive resin layer 53 is formed by the heat treatment step, the thin film is decomposed and ashed by performing ashing using an $O_2$ asher or the like so that the thin film 61 is removed appropriately. This further reduces the contact resistance and allows fabrication of a reflective liquid crystal display device having a remarkably high display quality.

EMBODIMENT 6

Figure 21:
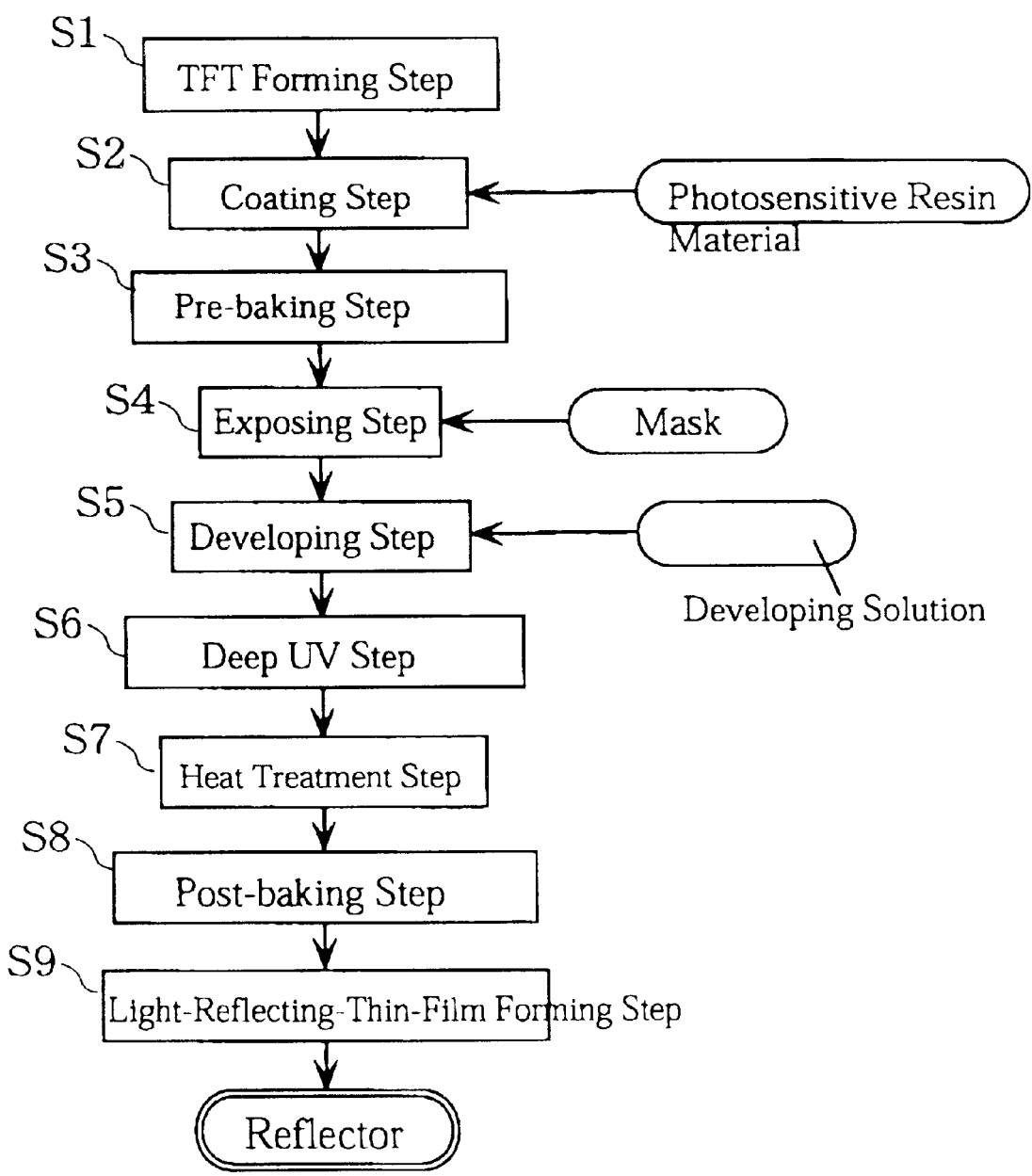
FIG. 21 is a flow chart illustrating a method of fabricating a reflector according to EMBODIMENT 6 of the present invention.
Figure 22:
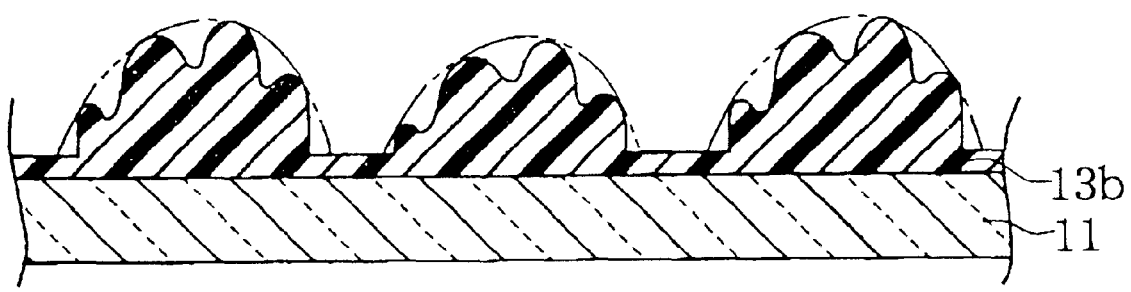
FIG. 22 is a cross-sectional view schematically showing projecting and depressed structures on another reflector of the present invention.

A method of fabricating a reflective liquid crystal display device according to EMBODIMENT 6 is for fabricating a reflective liquid crystal display device having a contact hole formed into a desired configuration by a deep UV method. FIG. 21 is a flow chart illustrating the fabrication method.

First, a TFT 51, a metal interconnect, and the like are formed on a substrate 11 (TFT forming step Si), similarly to EMBODIMENT 4. Then, a photosensitive resin material is coated on the substrate 11 (coating step S2) and the substrate 11 having a coating of the photosensitive resin material is pre-baked at 105° C. for 90 seconds (pre-baking step S3) such that a solvent in the coated film is evaporated, whereby a photosensitive resin layer 16 is formed.

Next, a photomask 55 is positioned above the photosensitive resin layer 16 and the photosensitive resin layer 16 is exposed to UV light via the photomask (exposing step S4).

Subsequently, development is performed by using, as a developing solution, an aqueous solution containing 0.4% of NMD-3™ (commercially available from Tokyo Ohka Kogyo Co., Ltd.) (developing step S5). By the step, resist columns 17 and a residual film 13b are formed on the substrate 11, while a contact hole 62 is formed therein.

At this stage, a deep UV irradiating step (S6) is performed to further advance the curing of the surrounding portion of the inner wall surface of the contact hole 54. Specifically, the contact hole 62 is irradiated with UV light at a shorter wavelength (in the range of 200 to 365 nm (i-line)) via a mask having an opening corresponding to the contact hole 62. As a result, cross-linking further proceeds to increase the degree of cure in the portions irradiated with the UV light. In the irradiating step, an electron beam at a shorter wavelength can also be used instead of the UV light at a shorter wavelength.

Next, a heat treatment is performed by heating the substrate 11 formed with the resist columns 17 and the like at 120° C. for 5 minutes (heat treatment step S7), thereby forming the photosensitive resin layer 53, as shown in FIG. 20E. Since cross-linking has proceeded to a higher degree in the inner wall surface of the contact hole 62 than in the other portion, the degree of cure is higher so that the thermal deformation is less likely to occur even in the heat treatment step. As a consequence, the contact hole 62 has a sufficient diameter to provide an electric connection between the TFT 51 and the light reflecting thin film 15.

Further, a post-baking step (S8) is performed and aluminum is vapor-deposited on the photosensitive resin layer 53, whereby the light reflecting thin film 15 is formed (light-reflecting-thin-film forming step S9).

Next, an alignment film 22 is formed on the light reflecting thin film 15, similarly to EMBODIMENT 4. On the other hand, a transparent electrode 23 is formed on a counter substrate 20 by a conventionally known method and an alignment film 24 is formed on the transparent electrode 23 in the same manner as described above.

Subsequently, the substrate 11 and the counter substrate 20 are bonded to each other and a liquid crystal material or the like is injected from a liquid crystal injection port to form a liquid crystal layer 20. By the foregoing process, the reflective liquid crystal display device according to the present embodiment can be fabricated.

Thus, since the method of fabricating the reflective liquid crystal display device according to the present embodiment can suppress an increase in the contact resistance between the light reflecting thin film 15 and the TFT 51, there can be fabricated a reflective liquid crystal display device having a particularly high display quality in a motion picture display.

In the present embodiment, a deep UV irradiating step for further advancing the curing of the surrounding portion of the inner wall surface of the contact hole 54 may also be performed after the heat treatment step and prior to the post-baking step. As a result, cross-linking further advances in the portions irradiated with the UV light so that the degree of cure becomes higher than in the other portion. By performing the post-baking step, therefore, the thermal deformation of the contact hole 54 can be prevented.

OTHERS

Although the projecting and depressed structures (groups of columnar portions or staircase structures) as the principal part of the present invention has been described in each of the foregoing embodiments, the size, material, shape, and relative arrangement thereof are only for illustrative purposes and are not for the purpose of limiting the scope of the invention thereto unless otherwise specified.

For example, the form in which the groups of columnar portions exist is not limited to those described in the individual embodiments. The groups of columnar portions may also be embodied in a form such that the individual columnar portions 13a are separate from each other in the absence of the residual film 13b. The group of columnar portions may also be embodied in a form such that the columnar portion 13a are connected to each other with a reduced level difference between the projecting and depressed portions by adjusting the heating temperature higher in the heat treatment step. In either case, the same operations and effects as achieved in each of the embodiments are achievable.

Figure 23A:
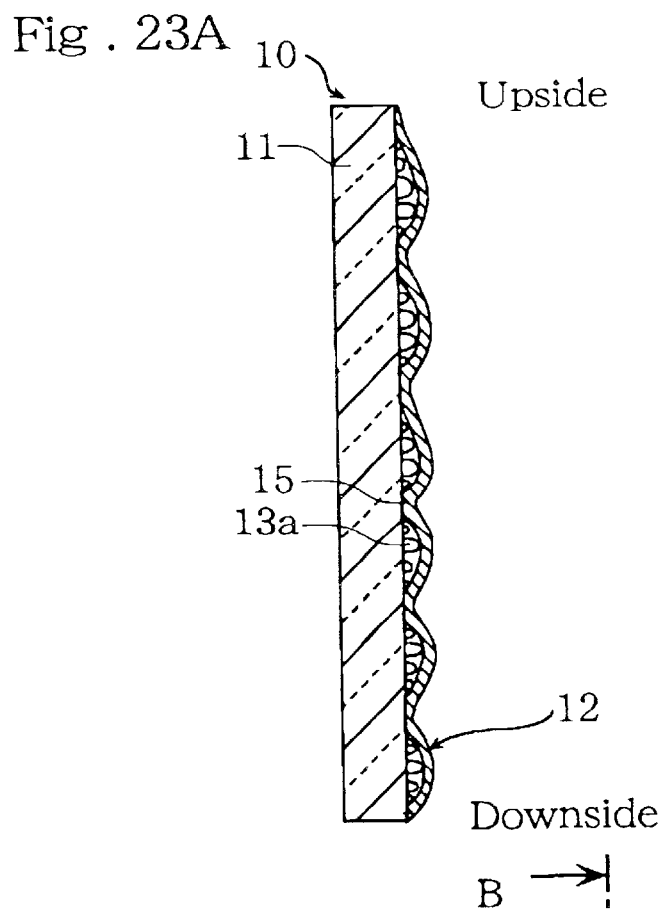
FIG. 23A is a plan view showing the arrangement of groups of columnar portions as the projecting and depressed structures on still another reflector and FIG. 23B is a cross-sectional view taken along the line B–B' of FIG. 23A.
Figure 23B:
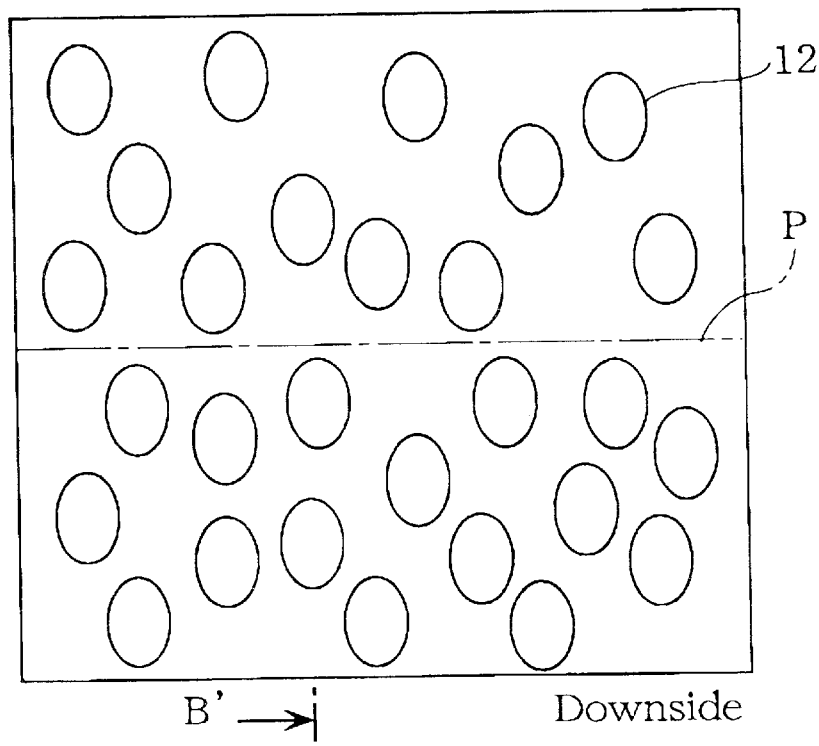
Figure 24A:
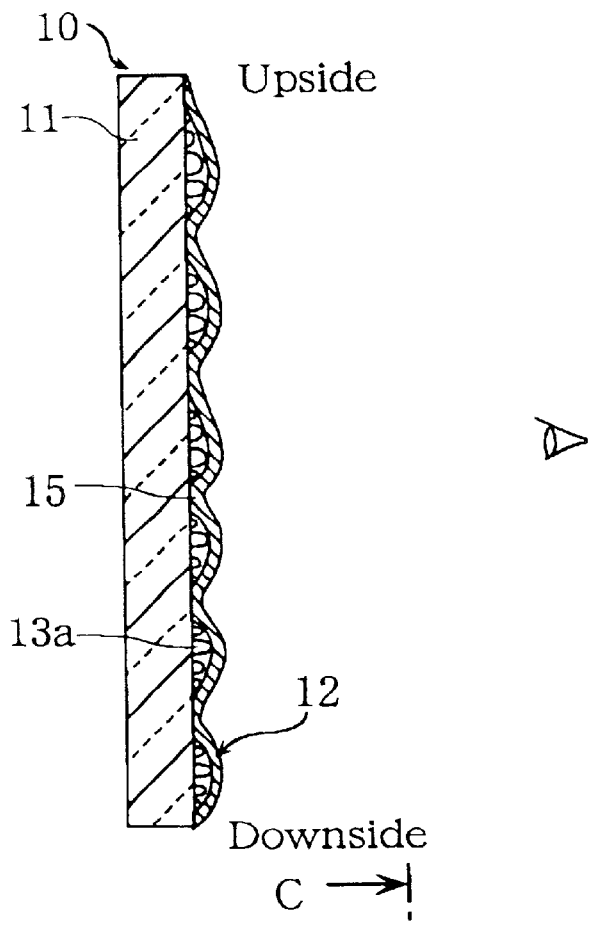
FIG. 24A is a plan view showing the arrangement of groups of columnar portions as the projecting and depressed structures on yet another reflector of the present invention and FIG. 24B is a cross-sectional view taken along the line C–C' of FIG. 24A.
Figure 24B:
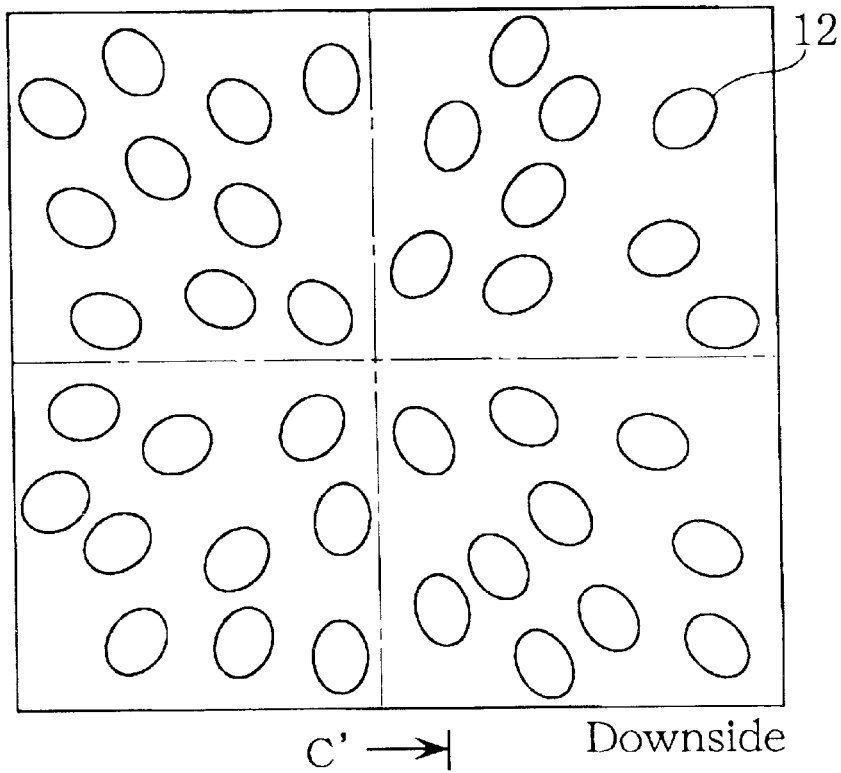

Although each of the embodiments has described the case where the plural groups of columnar portions or the plurality of staircase structures are positioned irregularly in parallel relation to each other, the present invention is not in the least limited thereto and may be embodied in the foregoing form. That is, the plural groups 12 of columnar portions may be arranged such that the light reflecting thin film 15 has a projecting and depressed surface configuration inclined toward the demarcation line P which halves the display screen into the upper and lower parts, as shown in FIG. 23. Alternatively, the plural groups 12 of columnar portions may also be arranged such that the light reflecting thin film 15 has a projecting and depressed surface configuration inclined toward the center portion of the display screen, as shown in FIG. 24.

Figure 25A:
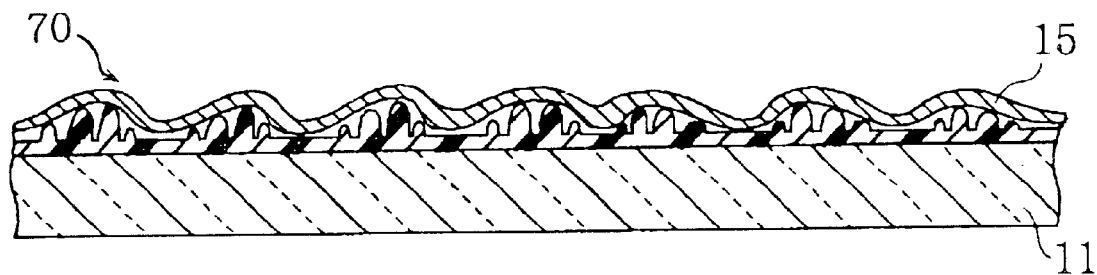
FIG. 25A is a partial cross-sectional view showing the grating reflector and FIG. 25B is a plan view showing the arrangement of projecting and depressed structures.
Figure 25B:
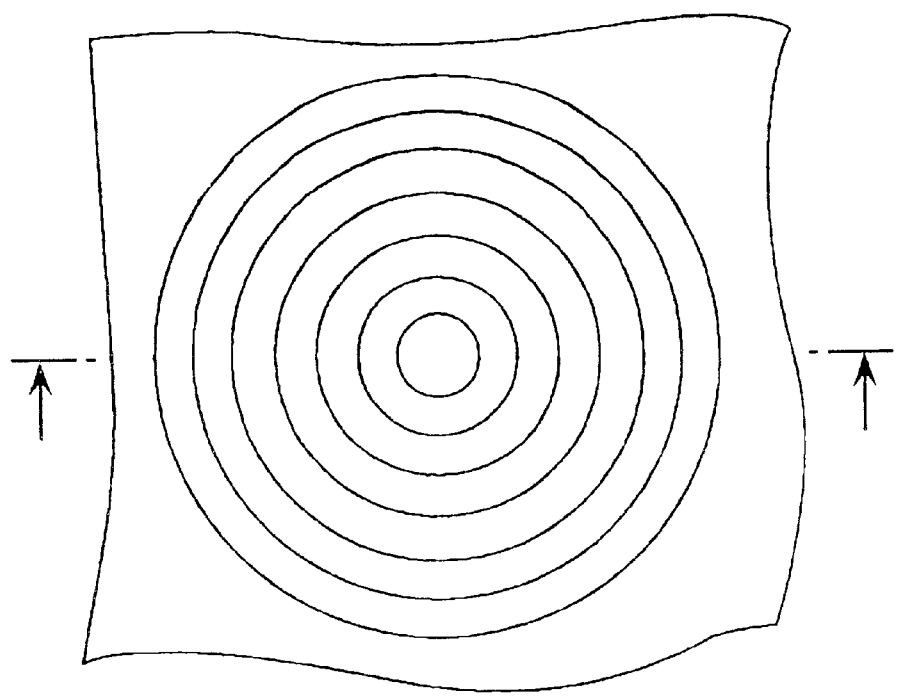

Although each of the embodiment has described the case of using the plurality of projecting and depressed structures which are arranged irregularly, the present invention is not limited thereto. For example, there may also be used a grating reflector having projecting and depressed structures regularly arranged in a concentric configuration, as shown in FIG. 25. Since the magnitude of the slope angle, the slope angle distribution, and the distribution density thereof can be controlled in accordance with the present invention, there can be produced a grating reflector in a color reproducible range.

Although each of the embodiments has described the reflector provided with only one type of projecting and depressed structures, the same operations and effects as achieved in each of the embodiments are achievable even if plural types of projecting and depressed structures in different configurations are provided.

Figure 26A:
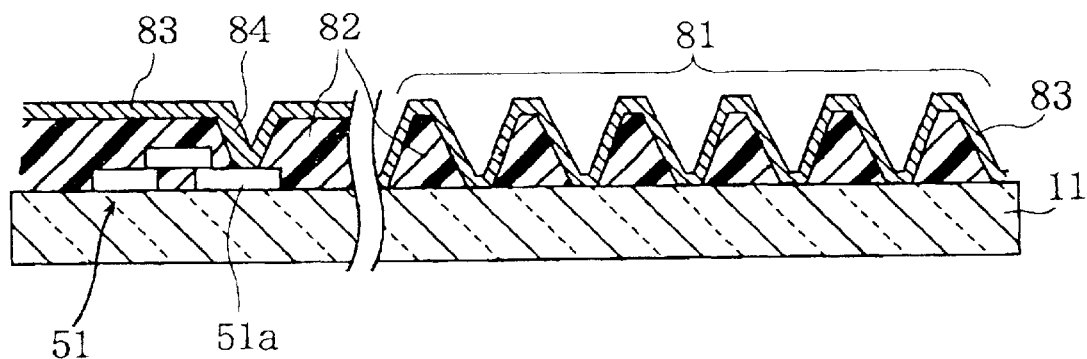
FIG. 26A is a cross-sectional view showing a cross-sectional configuration of each of projecting portions when each of the projecting and depressed structures is a diffraction grating and FIG. 26B is a plan view of the projecting and depressed structures in the form of a plurality of diffraction gratings.
Figure 26B:
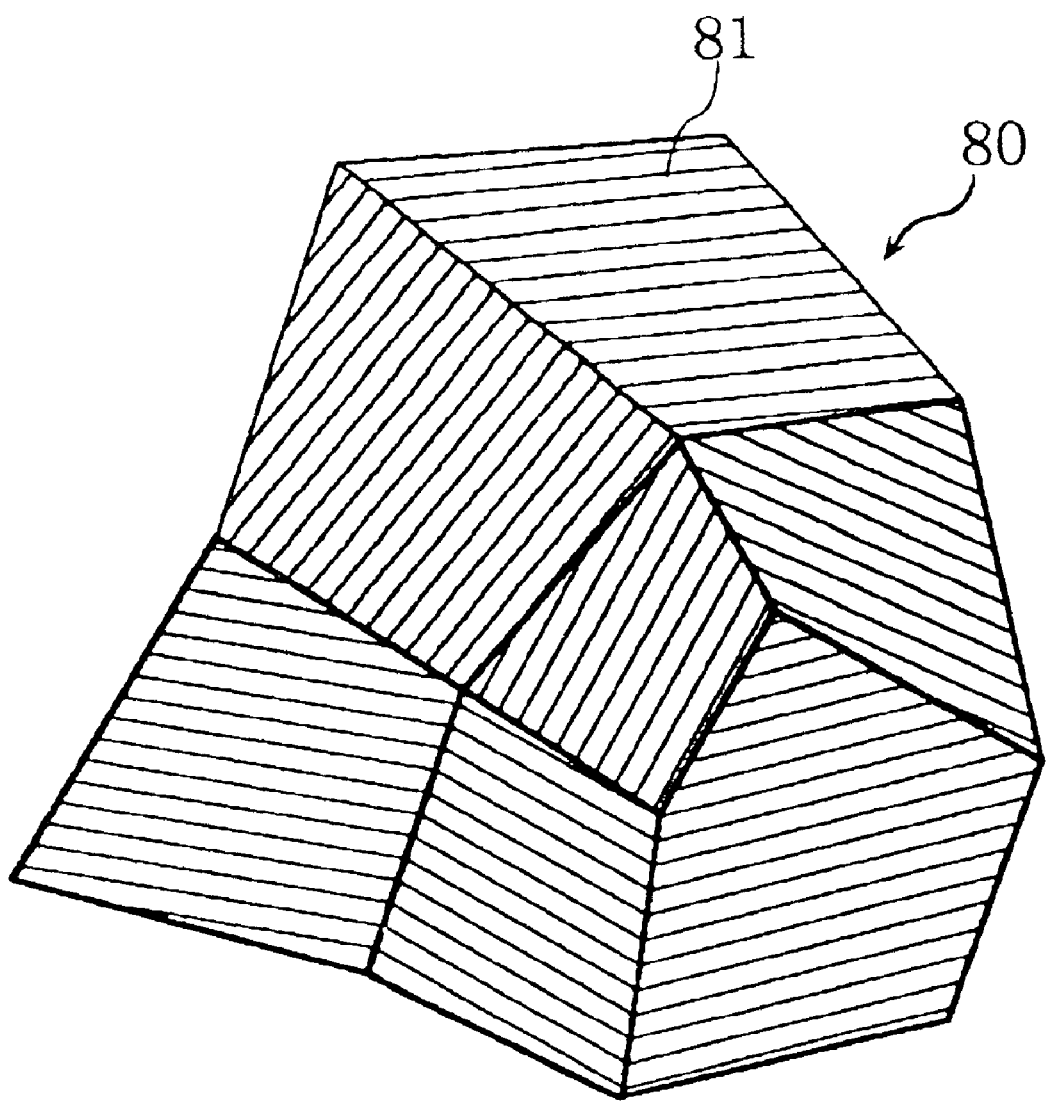

The projecting and depressed structure as a basic unit may also be configured as a diffraction grating. Specifically, the projecting portions composing the projecting and depressed structure may have, e.g., the same height measured from the substrate and the same cross-sectional configuration. FIG. 26A is a cross-sectional view showing the cross-sectional configurations of the projecting portions when the projecting and depressed structure is a diffraction grating. FIG. 26B is a plan view of a plurality of projecting and depressed structures, each configured as a diffraction grating. As shown in FIGS. 26A and 26B, projecting and depressed structures 80 as basic units are arranged in a mosaic pattern. The plan configuration and area of each of the projecting and depressed structures 80 are random and the direction in which periodicity is recognized (the direction in which the projecting portions are arranged) is also random. Each of the projecting and depressed structures 80 is a striped diffraction grating that has been formed to have a size in the range of about 20 to 50 $\mu$m. Projecting portions 81 composing the projecting and depressed structures 80 are composed of silicon nitride films 82 arranged periodically and equidistantly. The pitch of the projecting portions 81 is about 4 $\mu$m and the respective heights thereof measured from the substrate 11 are equally about 0.25 μm. A light reflecting film 83 is provided over the projecting portions 81. The light reflecting film 83 functions as a pixel electrode. By thus forming the projecting and depressed structures as diffraction gratings, it becomes possible to reduce regularly reflected light by utilizing the phenomenon of diffraction and increase scattered light even if flat portions exist between the projecting portions 81. If the number of process steps is to be reduced in the case where the basic unit is composed of one projecting or depressed portion, as in the conventional reflector, the flat portions are formed between the projecting or depressed portions so that regularly reflected light is increased. This leads to insufficient brightness in a viewing angle direction so that a satisfactory paper-white property is not obtained. In the foregoing structure, the projecting portions 81 need not necessarily be arranged with a strictly fixed period. If a disturbance in the period is smaller than an average period, the effect of reducing regularly reflected light is achievable, similarly to the above, by providing the projecting and depressed structures 80 in which a plurality of projecting portions 81 form a basic unit, though they are arranged with a certain degree of irregularity. However, since coloring is more likely to occur due to dependency on wavelength in the phenomenon of diffraction as the periodicity of the projecting portions 81 is higher, the occurrence of coloring should be suppressed by rendering both the positions at which the projecting and depressed structures 80 are scattered and the direction in which periodicity is recognized or either one of the above. The occurrence of coloring can also be suppressed by using projecting and depressed structures composed of projecting portions 81 having a different pitch in combination.

Figure 27:
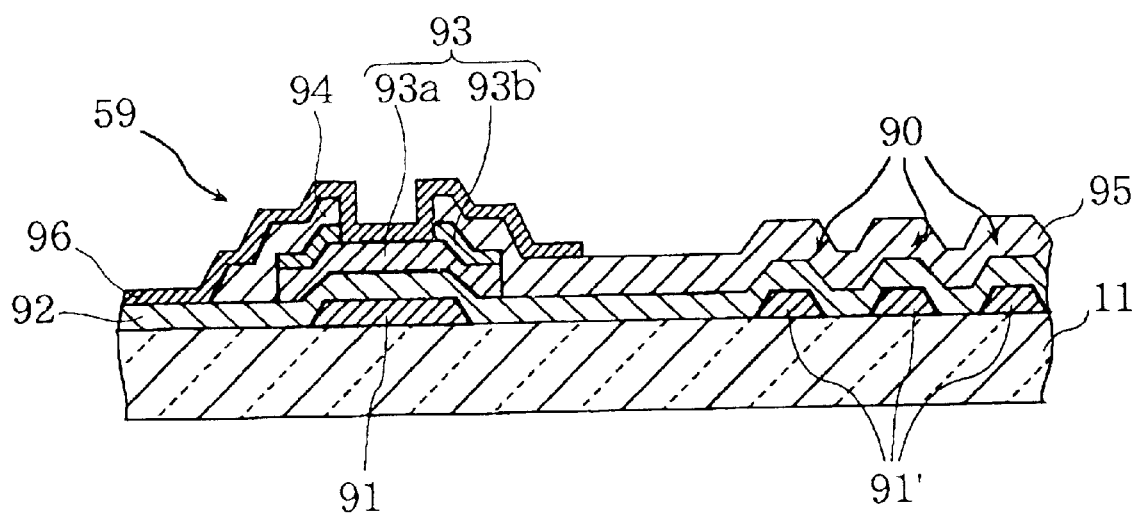
FIG. 27 is a cross-sectional view schematically showing a structure of still another reflector of the present invention.

In accordance with the present invention, the reflector may also be fabricated by forming the projecting portions composed of a layer selected appropriately from a semiconductor layer, a metal film, an insulating film, and the like, which compose a nonlinear element, simultaneously with the formation of the nonlinear element. Specifically, the reflector having a structure as shown in FIG. 27 may be listed as an example. On the substrate 11 shown in the drawing, a TFT 51 and a plurality of projecting portions 90 are formed. The TFT 51 is composed of a gate electrode 81; a gate insulating film layer 92; an amorphous silicon (a-Si) layer 93a; a semiconductor layer 93 composed of an n+a-Si layer 93b; source/drain electrodes 94; and an insulating film layer 96 (corresponding to a protective film), which are formed on the substrate 11 and are stacked in layers. The projecting portions 90 have been formed simultaneously with the formation of the TFT 51 by patterning or like method. Each of the projecting portions 90 consists of the layer of the gate electrode 91' and the gate insulating film layer 92. A plurality of pixel electrodes 95 having a light reflecting property are provided over the projecting portions 90. The pixel electrode 95 also has a flat portion at a surface thereof. Since the projecting portions 90 are formed simultaneously with the formation of the TFT 51, the reflector having the foregoing structure can be fabricated in a smaller number of process steps at lower fabrication cost.

As described above, since the reflectors in the first group of the present invention are provided with the projecting and depressed structures each composed of a plurality of projecting and depressed portions to serve as a basic unit and having, e.g., at least two projecting portions the top portions of which are at different heights, they can be formed to have asymmetric cross-sectional configurations and the slope angle distribution thereof can be controlled precisely. This allows the surface of the light reflecting thin film to scatter and reflect light in directions within an anisotropic range, not in the regular reflection direction, and provides bright reflection in directions within a specified angular range. Even if the heights of the top portions are uniform, light in the regular reflection direction can be reduced by allowing the basic unit to function as the diffraction grating, which increases scattering light in the forward direction of the panel and provides bright display. As a result, there is provided a reflector having satisfactory reflecting properties including a superior paper-while property and excellent controllability over the reflecting properties.

By providing the reflectors in the reflective liquid crystal display devices in the first group of the invention, remarkably bright display is achieved and display quality with a superior contrast property is provided. Even if active matrix driving is performed by providing a switching element, display quality particularly high in a motion picture display is provided since a contact hole for providing an electric connection between the switching element and the pixel electrode is prevented from being clogged and an increase in contact resistance is suppressed.

Second Group of the Invention
EMBODIMENT 7

Figure 28:
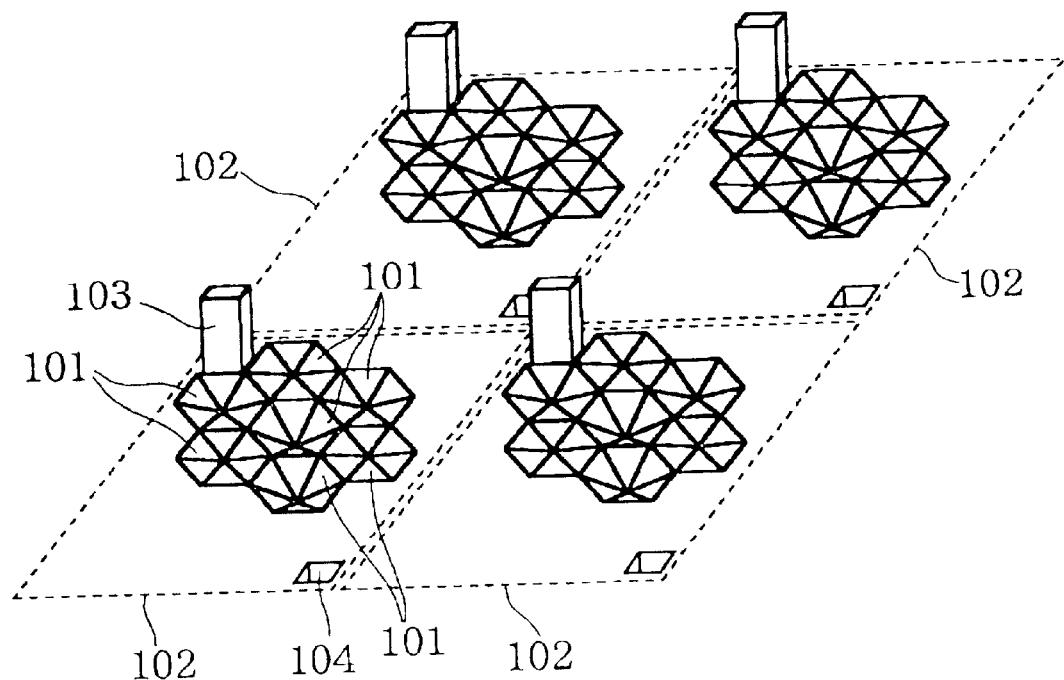
FIG. 28 is a perspective view showing a surface configuration of a platen used in a method of fabricating a reflective display device according to EMBODIMENT 7 of the present invention.
Figure 29A:
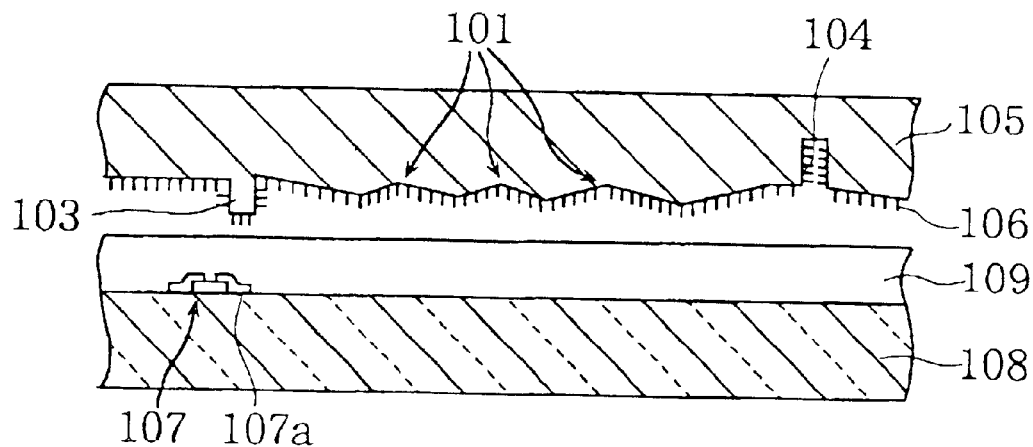
FIGS. 29A to 29C are views illustrating the process steps in accordance with the method of fabricating the display device of the present invention.
Figure 29B:
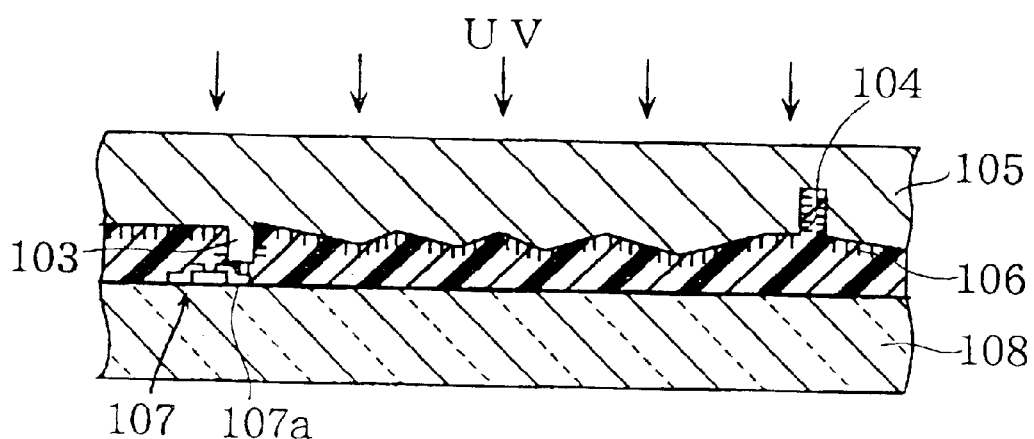

Referring to FIGS. 28 to 31, EMBODIMENT 7 of the present invention will be described. FIG. 28 is an enlarged overhead view of a platen used to fabricate a reflector in a method of fabricating a liquid crystal display device according to the present embodiment. FIGS. 29 are views illustrating the process steps in accordance with the method of fabricating the display device of the present invention.

First, a platen 105 shown in FIG. 28 was produced by cutting aluminum to form a mold, stacking a low-melting glass and the mold, and pressing the laminate. The platen 105 has a surface shaped inversely to a shape to be obtained. Specifically, a large number of depressed portions 101 each engraved in the form of a hexagonal pyramid having 10-μm sides are formed all over without clearance in each of regions 102 corresponding to one pixel. The depressed portions 101 are formed to have different depths and distributed randomly. However, the angle θ (slope angle) formed between an inclined surface of each of the depressed portions 101 and a horizontal surface had been adjusted to the range of 4 to 16 degrees. This is because, if the slope angle is smaller than 4 degrees, scattering in the regular reflection direction increases. Conversely, if the slope angle is larger than 16 degrees, the disadvantages of an excessively enhanced scattering property and insufficient brightness arise. The depressed portions having equal slope angles are formed in equal numbers.

The platen 105 is also provided with projecting portions 103 each configured as a square prism for forming a contact hole in each of pixel regions and with holes 104 for forming support portions serving spacers. The projecting portions are provided at respective corner portions of the regions 102 to correspond to the drain electrodes of TFT elements, which will be described later. The holes 104 are provided diagonally to the positions at which the projecting portions 103 are formed. Each of the projecting portions 103 has a height of 3 μm and a rectangular cross section having 8-μm sides in a horizontal direction. Each of the holes 104 has a depth of 5μm and has a rectangular opening configuration having 15-μm sides. FIG. 28A depicts only the depressed portions 101 each engraved in the form of a hexagonal pyramid in a part of each of the regions 102 corresponding to one pixel, while omitting the depiction of the depressed portions 101 in the other part thereof.

Next, a pre-mold releasing treatment was performed in such a manner that a monomolecular film 106 was formed on the surface of the platen 105 formed with the depressed portions 101 each configured as a hexagonal pyramid by chemically adsorbing a fluorine-based silane coupler, whereby the wetting property of the surface of the platen 105 was reduced.

On the other hand, an acrylic resin was coated by a roll coater method on a substrate 108 made of glass and preliminarily formed with a TFT element 107 to form a coated film 109 with a thickness of 4 $\mu$m (see FIG. 29A).

Figure 29C:
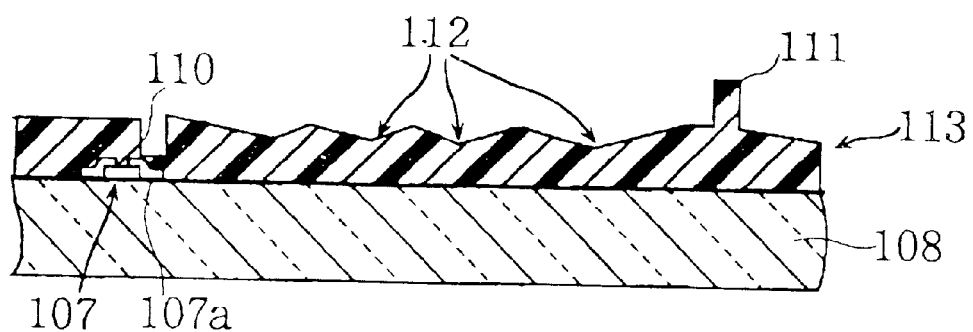

Subsequently, the platen 105 and the substrate 108 were aligned and stacked such that the surface subjected to the pre-mold releasing treatment faced the coated film 109 and then pressed under a pressure of 0.3 atmospheres. The platen 105 and the substrate 108 held under the pressure were irradiated with UV light from the platen side, whereby the coated film 109 made of the acrylic resin was cured. Thereafter, the platen 105 was peeled off so that a polymer resin layer 113 having the contact hole 110, the support portion 111 as a spacer, and the depressed portions 112 each configured as a hexagonal pyramid is formed for each pixel, as shown in FIG. 29C. To ensure exposure of a surface of the drain electrode 107a of the TFT element 107 at the bottom portion of the contact hole 110, a surface layer portion of the entire polymer resin layer 113 was scraped away by using an oxygen plasma asher by a thickness of about 0.2 $\mu$m.

Next, an aluminum film with a thickness of 0.3 $\mu$m was formed by sputtering on the substrate 108 comprising the polymer resin layer 113 having a projecting and depressed surface that had been formed by using the platen 105 as a shaper and patterned to form a pixel electrode (reflecting film) 114. An alignment film 116 was further formed over the pixel electrode 114 by a conventionally known method and subjected to a rubbing process.

On the other hand, a counter substrate 116 with transparency was prepared and a transparent electrode 117 as a counter electrode was formed on the counter substrate 116 by a conventionally known method. Then, an alignment film 115 was formed over the transparent electrode 117 by repeating the same step as described above and subjected to a rubbing process.

Subsequently, a seal resin was coated on the peripheral portion of the substrate 108 to have a frame-like configuration having a cut-away portion corresponding to a liquid crystal injection port. The counter substrate 116 and the substrate 108 were bonded to each other and pressed with the application of heat such that the seal resin was cured. A liquid crystal was injected from the liquid crystal injection port to form a liquid crystal layer 120 as a light modulating layer, whereby a liquid crystal panel was fabricated.

Since the fabrication method according to the present embodiment has thus formed the depressed portion 101 by shaping, it can be formed into a desired configuration in accordance with a desired scattering property so that the configuration is controlled with high flexibility. Moreover, the forming step is easy and simple. Since the fabrication method according to the present embodiment has formed the supporting portion 111 functioning as a spacer integrally with the polymer resin layer 113 having a projecting and depressed surface, the dispersive distribution of spacers that has been performed conventionally is no more required. This reduces the fabrication cost. In the case of controlling the cell gap by using, e.g., spherical spacers, a uniform cell gap has not necessarily been provided because of the projecting and depressed surface of the alignment film 115 on the substrate 108. However, when the spacer was formed integrally with the polymer resin layer 113 as in the foregoing structure, the liquid crystal layer 120 was formed uniformly to have a mean thickness of 5 $\mu$m for each pixel. In addition, the scattering property of the reflective film (pixel electrode 114) was such that light incident at an angle of 30 degrees was reflected to have a constant intensity within a range subtending an angle of about 25 degrees in each of forward, rearward, leftward, and rightward directions about the front side of the panel and the reflected light gave the sense of whiteness to both eyes. Moreover, brightness obtained was several-fold or more higher than the brightness of white paper so that an excellent paper-white property was recognized.

Figure 30:
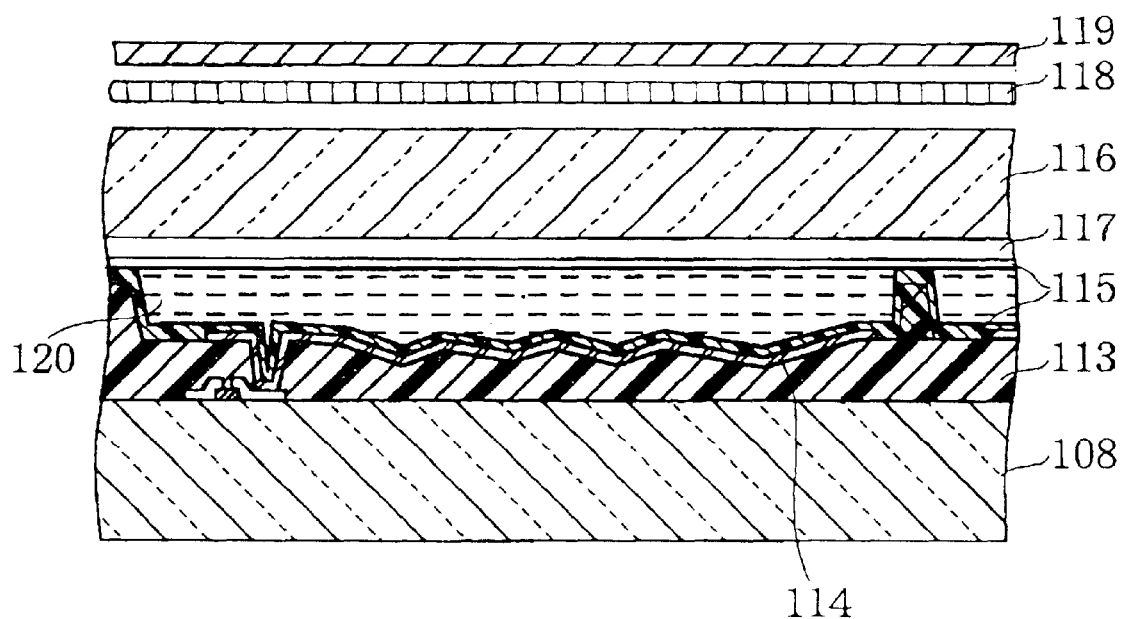
FIG. 30 is a cross-sectional view showing the reflective display device according to EMBODIMENT 7.

At this stage, a ¼ wave plate 118 was provided externally of the counter substrate 116 and a polarizer 119 was provided externally of the ¼ wave plate 118, whereby the reflective liquid crystal display device was fabricated (see FIG. 30). When the reflective liquid crystal display device was driven, a screen displayed was bright and high in whiteness. This proved that the liquid crystal display device fabricated by the fabrication method according to the present embodiment had a high display quality.

Although the present embodiment has described the case where the polymer resin layer 113 formed on the substrate 108 was molded by shaping, the present invention is not in the least limited thereto. It is also possible to provide, as spacers, projecting and depressed portions and the like by, e.g., directly molding a surface of a plastic substrate made of a resin. If a UV polymerizable acrylic resin is used to compose the plastic resin, e.g., molding can be performed in the same manner as described above. If a thermoplastic material such as polycarbonate or polyethersulfone is used, heating is performed appropriately during press molding. In the case of using the plastic substrate, the step of smoothing a surface of the substrate by pressing a platen with excellent flatness against the surface has been performed in the conventional process of producing the substrate. However, since the present invention allows the support portions as spacers and the projecting and depressed portions to be formed simultaneously with the production of the substrate, the number of steps can be reduced and lower cost is achieved.

Figure 31A:
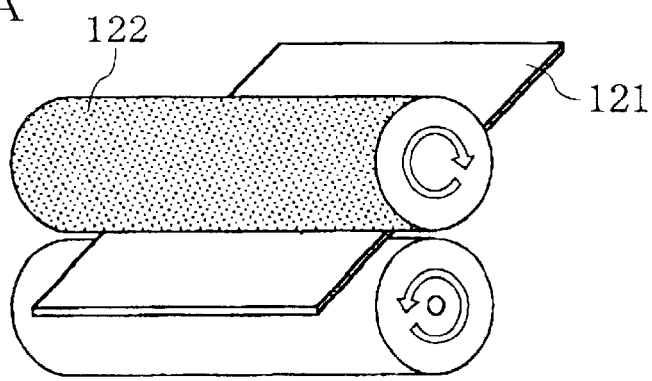
FIG. 31A is a view illustrating a molding process in which a base film is thermally pressed with a metal roll.
Figure 31B:
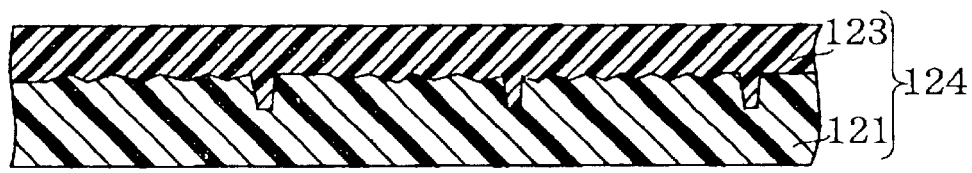
FIG. 31B is a cross-sectional view showing a laminated film resist.
Figure 31C:
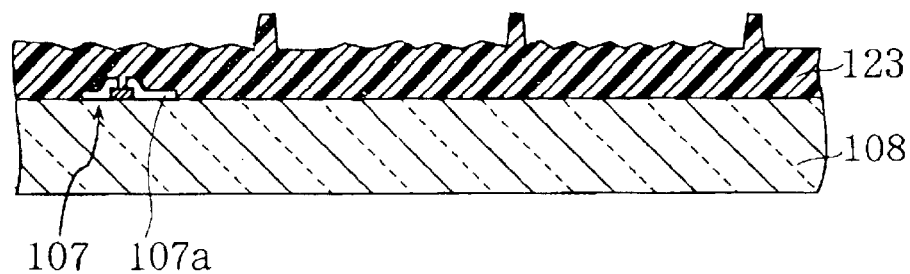
FIG. 31C is a cross-sectional view showing a resist resin film shaped by using the base film and formed on a substrate.

It is also possible to laminate a resin film preliminarily provided with support portions as spacers and projecting and depressed portions on a substrate. Specifically, a base film (mold) 121 made of PET (polyethylene terephthalate) and having a thickness of 100 $\mu$m is molded by thermally pressing, against the base film 121, a metal roll 122 engraved with projecting and depressed portions for molding the projecting and depressed portions and the support portions for spacers, so that desired projecting and depressed portions are formed in the surface of the base film 121, as shown in FIG. 31A. Subsequently, a resist resin film 123 is coated on the base film 121 by a roll coater method. The thickness of the coated film is adjusted to, e.g., about several micrometers to several tens of micrometers, whereby a laminated film resist 124 is produced (FIG. 31B). The film resist 124 is further laminated on the substrate 108 formed with the TFT element 107 and the base film 121 is peeled off. As a result, the resist resin film 123 shaped by the base film 121 is formed on the substrate 108, as shown in FIG. 31C. A contact hole for providing an electric connection between the drain electrode 107a of the TFT element 107 and the pixel electrode formed as a reflective film on the resist resin film 123 is formed by a photolithographic process. By thus forming a resin film by another process, the breakage of the substrate due to defective molding, which might occur if the projecting and depressed portions were formed above the substrate by shaping, is prevented and the production yield is improved. In addition, the process of molding the resist film can be performed in a shorter period of time than the process of performing molding above the substrate by shaping, so that lower cost is achieved.

EMBODIMENT 8

A method of fabricating a reflective display device according to the present embodiment is different from the fabrication method according to EMBODIMENT 7 in that the polymer resin layer 113 is formed by photolithography. By using a photolithographic method, the present embodiment has obviated the necessity for various manufacturing apparatus that have been necessary to perform molding in EMBODIMENT 7. Since these manufacturing apparatus are not used in the process of fabricating a normal liquid crystal display device, the present embodiment can achieve lower fabrication cost.

Figure 32:
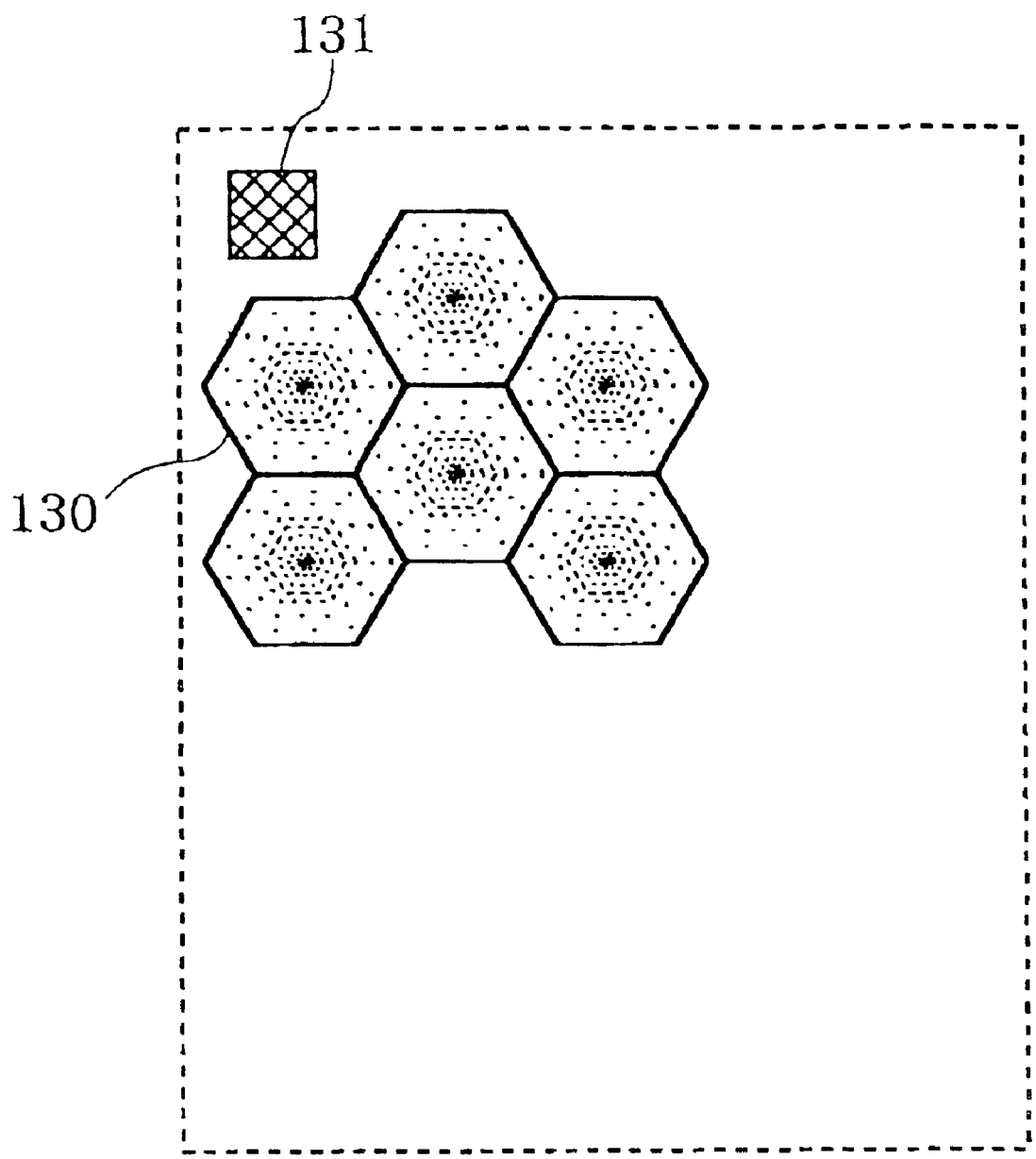
FIG. 32 is a plan view schematically showing a halftone dot pattern of a photomask used in EMBODIMENT 8 of the present invention.
Figure 33A:
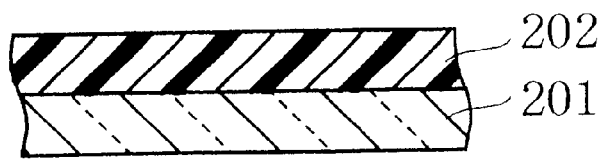
FIG. 33A is a cross-sectional view of a resist film coated on a glass substrate.
Figure 33B:
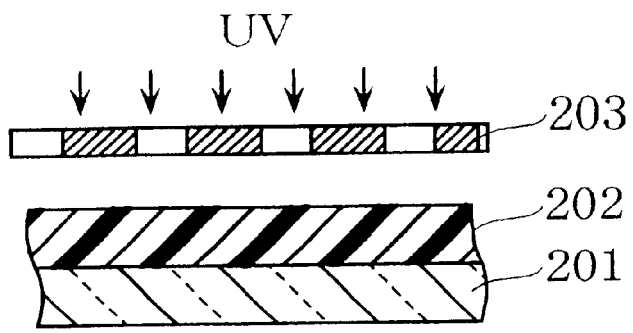
FIG. 33B is a cross-sectional view illustrating exposure of the resist film.
Figure 33C:
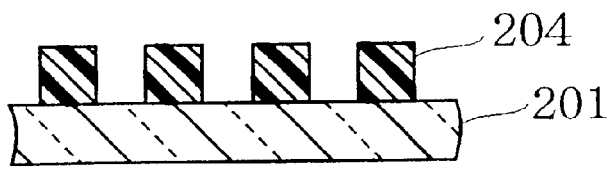
FIG. 33C is a cross-sectional view illustrating the development of the exposed resist film.
Figure 33D:
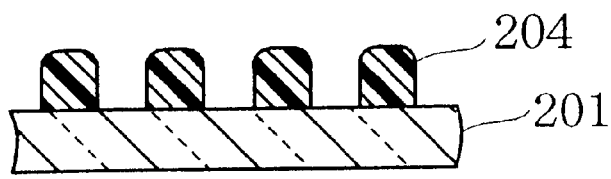
FIG. 33D is a cross-sectional view illustrating a heat treatment performed with respect to projecting portions.
Figure 33E:
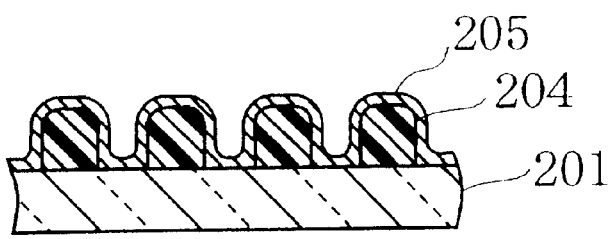
FIG. 33E is a cross-sectional view illustrating the step of forming a metal reflective film over the projecting portions after the heat treatment.
Figure 34:
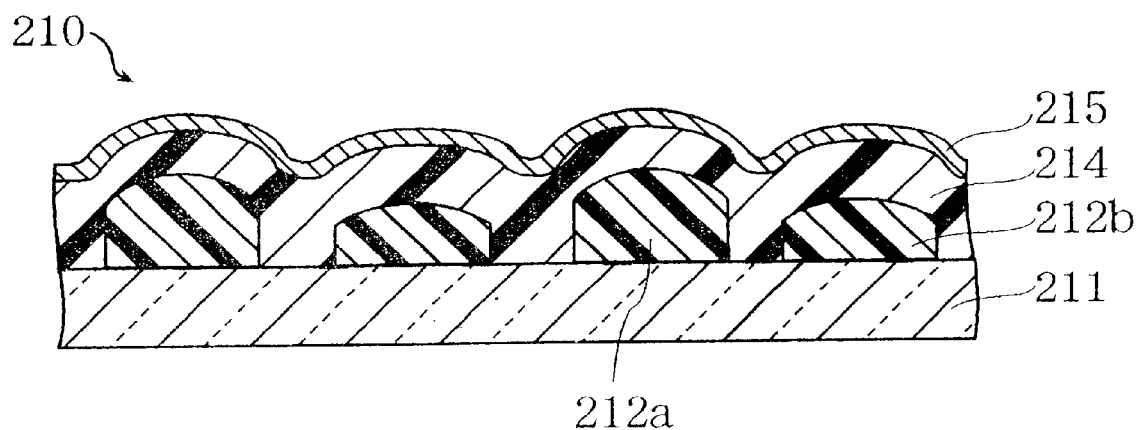
FIG. 34 is a cross-sectional diagram showing a schematic structure of a conventional reflector.
Figure 35A:
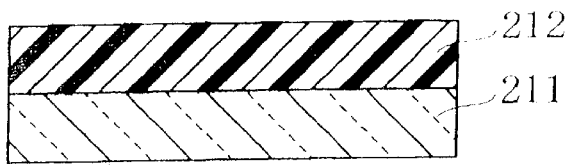
Figure 35B:
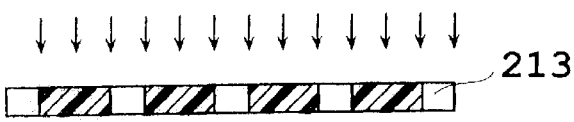
Figure 35C:
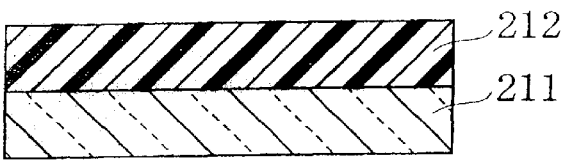
Figure 35D:
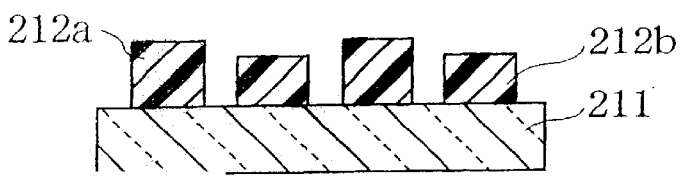
Figure 35E:
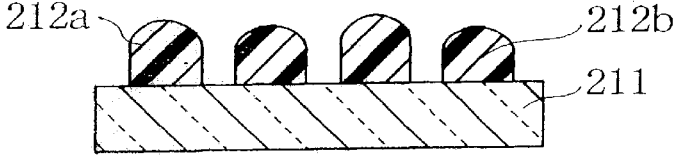
Figure 35F:
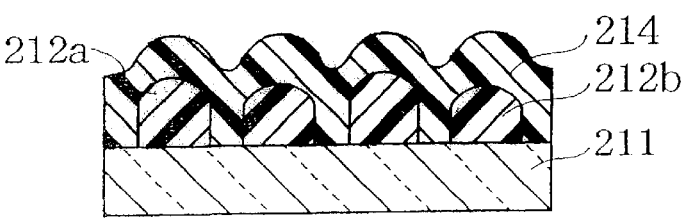
FIG. 35F is a cross-sectional view illustrating the step of forming a pixel electrode over the projecting portions after the heat treatment.
Figure 36A:
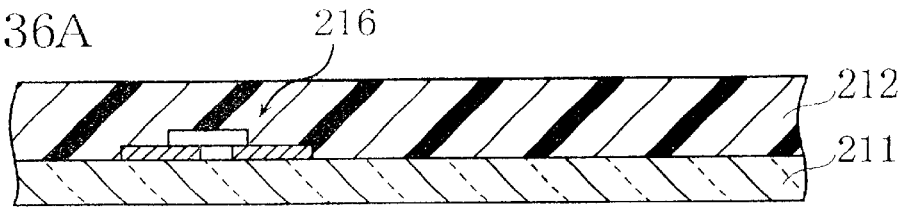
FIGS. 36A to 36E are cross-sectional views illustrating the formation of a contact hole in the conventional reflector.
Figure 36B:
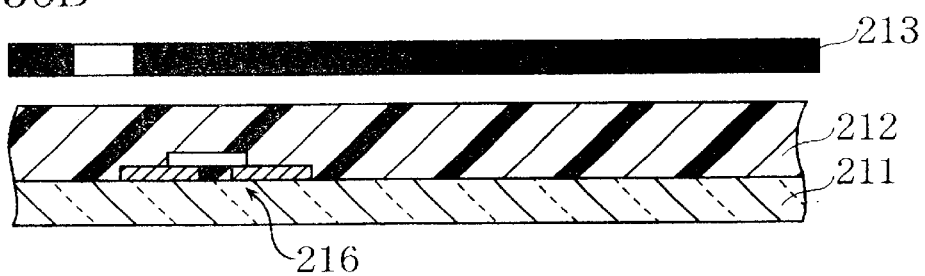
Figure 36C:
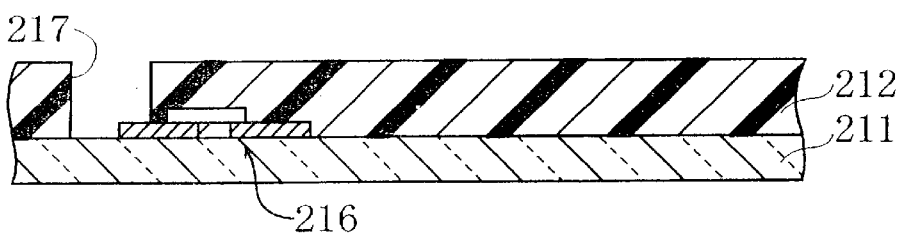
Figure 36D:
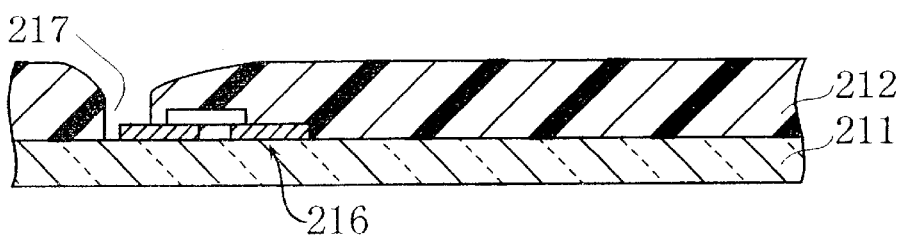
Figure 36E:
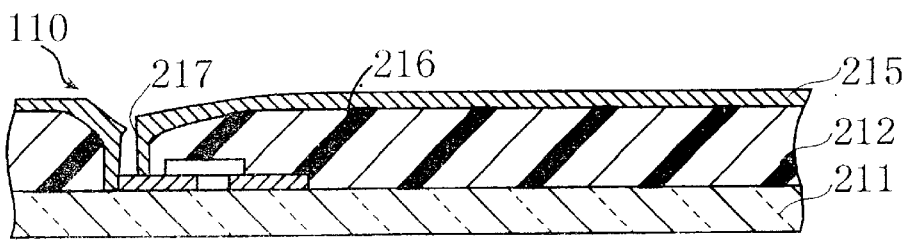

The method of fabricating the reflective display device according to the present embodiment will be described in detail. FIG. 32 is a schematic plan view of a photomask used to form the polymer resin layer 113.

First, a negative photoresist (under the trade name OMR85, which is commercially available from Thkyo Ohka Kogyo Co., Ltd.) was coated on a substrate formed with a TFT element, an interconnect, and the like by spin coating. The thickness of a resist film formed by coating was adjusted to 3.0 $\mu$m.

Next, the resist film was exposed to UV light with an exposure energy of 20 mJ/cm$^2$ via the photomask.

Since a plurality of depressed portions, each configured as a hexagonal pyramid, are formed in the individual pixel regions 102 as shown in FIG. 32, the photomask is provided with a light shielding pattern having a plurality of hexagonal halftone dot patterns formed therein. The hexagonal halftone dot patterns are such that the density of halftone dots distributed in a hexagon 130 increases gradually with approach toward the center portion thereof. Accordingly, transmittance decreases gradually with approach toward the center portion of the hexagon 130. This enables halftone representation, which cannot be implemented with a conventional mask. Each of halftone dots composing the halftone dot patterns is a 1.0-$\mu$m rectangular window. By varying the densities of the halftone dots distributed in the individual hexagons 130, transmittances at the respective center portions of the hexagons 130 are varied. The hexagon 130 has a side of, e.g., about several tens of micrometers. A rectangular light shielding window (a light shielding portion) 131 is also provided in each region corresponding to a pixel region.

The exposure was performed by using a mirror projection aligner (exposing device), thereby rending the portion exposed to UV light undissolvable. By further performing development (for a development time of 60 seconds), the plurality of depressed portions each configured as a hexagonal pyramid and the contact hole were formed.

The resolution of the negative photoresist OMR85 was about 4 $\mu$m and the resolution of the mirror projection aligner was 1 to 2 $\mu$m. It follows therefore that a resolution limit when exposure is performed by using the resist and the exposing device in combination is about 4 $\mu$m. However, since the present embodiment has used the photomask having the 1-$\mu$m halftone dot patterns, geometries smaller than the resolution limit can be defined. Accordingly, the projecting portion having a gently inclined surface can be formed. Actually, the portion other than the light shielding portion 131 is entirely filled with the hexagonal halftone dot patterns, though they are not depicted in FIG. 32.

Subsequently, the developed resist film was sintered at a specified temperature and the pixel electrode as the reflective film made of aluminum was formed on the resist film and patterned. After the alignment film was formed on the pixel electrode, a rubbing process was performed with respect to the alignment film.

On the other hand, the counter substrate 116 was prepared, similarly to EMBODIMENT 7. The transparent electrode and the alignment film were formed successively on the counter substrate 116 and a rubbing process was performed with respect to the alignment film.

Subsequently, spacers were scattered over the substrate, a seal resin was coated on the substrate, and a panel was assembled by bonding the counter substrate and the substrate to each other, similarly to EMBODIMENT 7. After injecting a liquid crystal into the panel, the ¼ wave plate and the polarizer were provided successively externally of the counter substrate, whereby the reflective liquid crystal display device according to the present embodiment was fabricated. As a result of examining the display properties of the liquid crystal display device, it was proved that the intensity of reflected light when viewed from a position adjacent the front of the panel was constant and a superior display quality with high whiteness was obtained.

Thus, since the method of fabricating the reflective display device according to the present embodiment has used the photomask having a shielding pattern composed of the minute halftone dot patterns, a minute surface configuration can be controlled, which has been impossible with a conventional chromium mask. It is also possible to easily control the projecting and depressed configuration by varying the pattern configuration of the halftone dot patterns. Since it is sufficient to use conventional equipment including an exposing device, a conventional material, and the like, there is no need to introduce new equipment and the like.

OTHERS

Although the reflective liquid crystal display devices have been described in EMBODIMENTS 7 and 8, the present invention is not in the least limited thereto. The present invention is applicable to any device provided that it is a light-receiving device which requires a scattering reflective film and uniform layer formation.

Although EMBODIMENTS 7 and 8 have described the cases where the depressed portions are configured as hexagonal pyramids, the present invention is not limited thereto. The depressed portions may have pyramidal or conical configurations. Preferably, the slope angle is in the range of 4 to 16 degrees. In the case of a pyramidal configuration, the slope angle is defined as the angle formed between a horizontal surface and an inclined surface. In the case of a conical configuration, the slope angle is defined as the angle formed between a horizontal surface and a generating line.

Thus, in the second group of the invention, the projecting and depressed portions of the reflector can be formed in a precisely controlled configuration since the projecting and depressed portions are molded by shaping. This reduces reflection in the regular reflection direction and provides a reflective display device with superior brightness and superior whiteness. Since the projecting and depressed portions and the support portions as spacers are formed integrally, there can be provided a reflective display device with a uniform cell gap and reduced uneven display and a fabrication method therefor.

In the second group of the invention, the projecting and depressed portions are formed by using the photomask having a shielding pattern composed of halftone dots smaller than the respective resolution limits of the exposing device and the photosensitive resin layer. As a result, projecting and depressed portions having gently curved configurations can be formed and the configuration can be controlled properly. This allows light incident from an arbitrary direction to be scattered and reflected in the forward direction of the reflective display device, not in the regular reflection direction, and thereby provides a reflective display device capable of displaying an image with excellent whiteness and a fabrication method therefor.

While the specific embodiments have been described in detail, such description is strictly for the purpose of clarifying the art of the present invention. It is to be understood that present invention is not construed as limited to the specific embodiments and various changes and modifications may be made in practicing the invention without departing from the spirit thereof and the scope of the following claims.

What is claimed is:

1. A reflector comprising:
    a plurality of projecting and depressed structures provided on a substrate, each structure having a plurality of projecting portions and depressed portions and having rotational asymmetry with respect to the normal to the substrate; and
    a plurality of projecting and depressed structures provided on a substrate, each structure having a plurality of projecting portions and depressed portions and having rotational asymmetry with respect to the normal to the substrate; and
    a light reflective thin film provided over the projecting and depressed structures, the shape of the light reflective thin film being controlled by the plurality of projecting and depressed structures.

2. The reflector of claim 1, wherein the projecting and depressed structures provided on the substrate are arranged randomly and dispersively in an arbitrary direction.

3. The reflector of claim 1, wherein the projecting portions of the projecting and depressed structures have top portions at different heights and the depressed portions of the projecting and depressed structures have bottom portions at different depths.

4. The reflector of claim 1, wherein the projecting and depressed structures are groups of columnar portions each composed of a plurality of minute columnar portions having different heights, the columnar portions being separate from each other or at least partially connected to each other.

5. The reflector of claim 4, wherein
    a height distribution of each of the projecting and depressed structures has a peak at a position deviated in a specified direction from a center portion of the structure and-tends to decrease with distance from the peak toward a periphery thereof and
    the light reflecting thin film covering the projecting and depressed structures has a curved surface having a curvature larger in the specified direction than in a direction opposite to the specified direction.

6. The reflector of claim 5, wherein at least one polymer resin layer is provided between the projecting and depressed structures and the light reflecting thin film.

7. The reflector of claim 1, wherein the projecting and depressed structures are staircase structures each having a plurality of stepped portions.

8. The reflector of claim 7, wherein
    a height distribution of each of the projecting and depressed structures has a peak at a position deviated in a specified direction from a center portion of the structure and tends to decrease with distance from the peak toward a periphery of the structure and
    the light reflecting thin film covering the projecting and depressed structures has a curved surface having a curvature larger in the specified direction than in a direction opposite to the specified direction.

9. The reflector of claim 8, wherein at least one polymer resin layer is provided between the projecting and depressed structures and the light reflecting thin film.

10. The reflector of claim 1, wherein the reflector is a grating reflector for reflecting and diffracting light, the grating reflector having the plurality of projecting and depressed structures provided periodically on the substrate.

11. The reflector of claim 1, wherein each of the projecting and depressed structures in plan view has a size in the range of 1 $\mu$m to 100 $\mu$m.

12. The reflector of claim 1, wherein each of the plurality of projecting and depressed structures has a periodic structure for reflecting and diffracting light, the projecting and depressed structures being provided such that positions thereof are random and/or a direction in which periodicity is recognized is random.

13. A reflector comprising:
    a substrate provided with a nonlinear element;
    a photosensitive resin layer provided on the substrate, the photosensitive resin layer having projecting and depressed structures in specified regions, the shape of each of the projecting and depressed structures having rotational asymmetry with respect to the normal to the substrate; and
    a pixel electrode with a light reflecting property provided on the photosensitive resin layer, the pixel electrode being electrically connected to the nonlinear element via a contact hole formed in the photosensitive resin layer, wherein
    a light reflecting film is provided on a bottom portion of the contact hole.

14. The reflector of claim 13, wherein a degree of crosslinking in the photosensitive resin layer is higher in a surrounding portion of an inner wall surface of the contact hole than in the other portion thereof.

15. A reflector comprising:
    a substrate provided with a nonlinear element;
    a photosensitive resin layer provided on the substrate, the photosensitive resin layer having projecting and depressed structures in specified regions, the shape of the projecting and depressed structures having rotational asymmetry with respect to the normal to the substrate; and
    a pixel electrode with a light reflecting property provided on the photosensitive resin layer, the pixel electrode being electrically connected to the nonlinear element via a contact hole formed in the photosensitive resin layer, wherein
    a thin film having a surface energy higher than that of the photosensitive resin layer is provided on a bottom portion of the contact hole.

16. A reflector comprising:
    a substrate provided with a nonlinear element;
    a photosensitive resin layer provided on the substrate, the photosensitive resin layer having projecting and depressed structures, each structure having rotational asymmetry with respect to the normal to the substrate, in specified regions; and
    a pixel electrode with a light reflecting property provided on the photosensitive resin layer, the pixel electrode being electrically connected to the nonlinear element via a contact hole formed in the photosensitive resin layer, wherein the contact hole is provided such that a degree of crosslinking is higher in a surrounding portion of an inner wall surface of the contact hole than in the other portion thereof.

17. A reflector comprising:

a substrate provided with a nonlinear element and with a plurality of projecting and depressed portions having rotational asymmetry with respect to the normal to the substrate; and a pixel electrode with a light reflecting property provided over the projecting and depressed portions, wherein the projecting and depressed portions are composed of a single layer or a plurality of layers selected arbitrarily from layers composing the nonlinear element.

18. A reflective display device comprising:

a counter substrate with transparency;

a reflector disposed in opposing relation to the counter substrate, the reflector including a substrate provided with a plurality of projecting and depressed structures each having a plurality of projecting and depressed portions having rotational asymmetry with respect to the normal to the substrate and serving as a basic unit and a light reflecting thin film provided over the projecting and depressed structures; and a liquid crystal layer held between the counter substrate and the reflector.

19. The reflective display device of claim 18, wherein the reflector is a grating reflector for reflecting and diffracting light, the grating reflector having the plurality of projecting and depressed structures provided periodically on the substrate.

20. The reflective display device of claim 18, wherein the projecting portions of the projecting and depressed structures have top portions at different heights and the depressed portions of the projecting and depressed structures have bottom portions at different depths.

21. The reflective display device of claim 18, wherein the projecting and depressed structures are groups of columnar portions each composed of a plurality of minute columnar portions having different heights, the columnar portions being separate from each other or at least partially connected to each other.

22. The reflective display device of claim 21, wherein a height distribution of each of the projecting and depressed structures has a peak at a position deviated in a specified direction from a center portion of the structure and tends to decrease with distance from the peak toward a periphery thereof and the light reflecting thin film covering the projecting and depressed structures has a curved surface having a curvature larger in the specified direction than in a direction opposite to the specified direction.

23. The reflective display device of claim 22, wherein at least one polymer resin layer is provided between the projecting and depressed structures and the light reflecting thin film.

24. The reflective display device of claim 18, wherein the projecting and depressed structures are staircase structures each having a plurality of stepped portions.

25. The reflective display device of claim 24, wherein a height distribution of each of the projecting and depressed structures has a peak at a position deviated in a specified direction from a center portion of the structure and tends to decrease with distance from the peak toward a periphery thereof and the light reflecting thin film covering the projecting and depressed structures has a curved surface having a curvature larger in the specified direction than in a direction opposite to the specified direction.

26. The reflective display device of claim 25, wherein at least one polymer resin layer is provided between the projecting and depressed structures and the light reflecting thin film.

27. The reflective display device of claim 18, wherein the reflector is a grating reflector for reflecting and diffracting light, the grating reflector having the plurality of projecting and depressed structures provided periodically on the substrate.

28. The reflective display device of claim 18, wherein each of the projecting and depressed structures in plan view has a size in the range of 1 µm to 100 µm.

29. The reflective display device of claim 18, wherein each of the plurality of projecting and depressed structures has a periodic structure for reflecting and diffracting light, the projecting and depressed structures being provided such that positions thereof are random and/or a direction in which periodicity is recognized is random.

30. A reflective display device comprising:

a substrate provided with a nonlinear element;

a photosensitive resin layer provided on the substrate, the photosensitive resin layer having projecting and depressed structures, each structure having rotational asymmetry with respect to the normal to the substrate, in specified regions; and a pixel electrode with a light reflecting property provided on the photosensitive resin layer, the pixel electrode being electrically connected to the nonlinear element via a contact hole formed in the photosensitive resin layer, wherein a light reflecting film is provided on a bottom portion of the contact hole.

31. The reflective display device of claim 30, wherein a degree of crosslinking in the photosensitive resin layer is higher in a surrounding portion of an inner wall surface of the contact hole than in the other portion thereof.

32. A reflective display device comprising:

a substrate provided with a nonlinear element;

a photosensitive resin layer provided on the substrate, the photosensitive resin layer having projecting and depressed structures, each structure having rotational asymmetry with respect to the normal to the substrate, in specified regions; and a pixel electrode with a light reflecting property provided on the photosensitive resin layer, the pixel electrode being electrically connected to the nonlinear element via a contact hole formed in the photosensitive resin layer, wherein a thin film having a surface energy higher than that of the photosensitive resin layer is provided on a bottom portion of the contact hole.

33. The reflective display device of claim 32, wherein a degree of crosslinking in the photosensitive resin layer is higher in a surrounding portion of an inner wall surface of the contact hole than in the other portion thereof.

34. A reflective display device comprising:

a substrate provided with a nonlinear element;

a photosensitive resin layer provided on the substrate, the photosensitive resin layer having projecting and depressed structures, each structure having rotational asymmetry with respect to the normal to the substrate, in specified regions; and a pixel electrode with a light reflecting property provided on the photosensitive resin layer, the pixel electrode being electrically connected to the nonlinear element via a contact hole formed in the photosensitive resin layer, wherein the contact hole is provided such that a degree of crosslinking is higher in a surrounding portion of an inner wall surface of the contact hole than in the other portion thereof.

35. A reflective display device comprising:

a substrate provided with a nonlinear element and with a plurality of projecting and depressed portions having rotational asymmetry with respect to the normal to the substrate; and a pixel electrode with a light reflecting property provided over the projecting and depressed portions, wherein the projecting and depressed portions are composed of a single layer or a plurality of layers selected arbitrarily from layers composing the nonlinear element.

36. A reflective display device having a liquid crystal layer provided between a pair of substrates, wherein one of the pair of substrates is provided with projecting and depressed portions having rotational asymmetry with respect to the normal to the substrate and covered with a metal film and with a support portion for supporting the other of the pair of substrates, the projecting and depressed portions and the support portion being molded integrally.

37. The reflective display device of claim 36, wherein the projecting and depressed portions are pyramidal or conical.

38. The reflective display device of claim 37, wherein if an angle formed between an inclined surface of the pyramidal projecting and depressed portions and a horizontal surface or an angle formed between a generating line of the conical projecting and depressed portions and a horizontal surface is assumed to be a slope angle, the projecting and depressed portions are dispersively arranged at different slope angles and the slope angles are in the range of 4° to 16°.

39. The reflective display device of claim 36, further comprising a polymer resin layer molded integrally with the projecting and depressed portions and with the support portion for supporting the other of the substrates, the polymer resin layer being provided on one of the substrates.

40. The reflective display device of claim 39, wherein a plurality of nonlinear elements are provided on one of the substrates and a contact hole for providing an electric connection between the nonlinear elements and the metal film is provided in the polymer resin layer.

41. The reflective display device of claim 36, wherein a resin film molded integrally with the projecting and depressed portions and with the support portion for supporting the other of the substrates is laminated on one of the substrates.

42. The reflective display device of claim 41, wherein the resin film is made of a photosensitive resin.

43. The reflective display device of claim 36, wherein one of the substrates is a plastic substrate molded with the projecting and depressed portions and with the support portion for supporting the other of the substrates.

* * * * *

UNITED STATES PATENT AND TRADEMARK OFFICE
CERTIFICATE OF CORRECTION

PATENT NO.     : 6,452,653 B1
DATED          : September 17, 2002
INVENTOR(S)    : Yasuhiko Yamanaka et al.

It is certified that error appears in the above-identified patent and that said Letters Patent is hereby corrected as shown below:

<u>Title page, item [54] and Column 1, lines 1-4,</u>
Title of the Invention replace with the following:
-- REFLECTOR WITH A PLURALITY OF PROJECTING PORTIONS AND DEPRESSED PORTIONS WITH ROTATIONAL ASYMMETRY AND RELATED REFLECTIVE DISPLAY DEVICE --.

Signed and Sealed this

Seventeenth Day of December, 2002

JAMES E. ROGAN
*Director of the United States Patent and Trademark Office*

UNITED STATES PATENT AND TRADEMARK OFFICE
CERTIFICATE OF CORRECTION

PATENT NO. : 6,452,653 B1
DATED : September 17, 2002
INVENTOR(S) : Yasuhiko Yamanaka et al.

It is certified that error appears in the above-identified patent and that said Letters Patent is hereby corrected as shown below:

Column 41,
Lines 20-24, delete in their entirety.
Line 51, change "and-tends" to -- and tends --.

Signed and Sealed this

Twenty-ninth Day of April, 2003

JAMES E. ROGAN
*Director of the United States Patent and Trademark Office*